US011194048B1

(12) United States Patent
Burbank et al.

(10) Patent No.: US 11,194,048 B1
(45) Date of Patent: Dec. 7, 2021

(54) LIDAR SYSTEM WITH HIGH-RESOLUTION SCAN PATTERN

(71) Applicant: Luminar, LLC, Orlando, FL (US)

(72) Inventors: Istvan Peter Burbank, Orlando, FL (US); Matthew D. Weed, Orlando, FL (US); Jason Paul Wojack, Oviedo, FL (US); Jason M. Eichenholz, Orlando, FL (US); Dmytro Trofymov, Los Altos, CA (US)

(73) Assignee: Luminar, LLC, Orlando, FL (US)

( * ) Notice: Subject to any disclaimer, the term of this patent is extended or adjusted under 35 U.S.C. 154(b) by 0 days.

(21) Appl. No.: 17/318,506

(22) Filed: May 12, 2021

Related U.S. Application Data

(60) Provisional application No. 63/023,981, filed on May 13, 2020.

(51) Int. Cl.
| | |
|---|---|
| *G01S 17/931* | (2020.01) |
| *G01S 17/89* | (2020.01) |
| *G01S 17/10* | (2020.01) |
| *B60W 60/00* | (2020.01) |
| *B60W 30/09* | (2012.01) |
| *G01S 7/481* | (2006.01) |
| *B60W 30/14* | (2006.01) |

(52) U.S. Cl.
CPC ......... *G01S 17/931* (2020.01); *B60W 60/001* (2020.02); *G01S 7/4814* (2013.01); *G01S 7/4817* (2013.01); *G01S 17/10* (2013.01); *G01S 17/89* (2013.01); *B60W 30/09* (2013.01); *B60W 30/14* (2013.01); *B60W 2420/52* (2013.01)

(58) Field of Classification Search
USPC .......................................................... 701/26
See application file for complete search history.

(56) References Cited

U.S. PATENT DOCUMENTS

| | | | |
|---|---|---|---|
| 10,345,437 B1 * | 7/2019 | Russell | ................ G01S 7/4818 |
| 10,802,120 B1 * | 10/2020 | LaChapelle | ........... G01S 7/4818 |
| 2002/0059042 A1 | 5/2002 | Kacyra et al. | |
| 2003/0043058 A1 | 3/2003 | Jamieson et al. | |
| 2005/0057741 A1 | 3/2005 | Anderson et al. | |

(Continued)

FOREIGN PATENT DOCUMENTS

| | | |
|---|---|---|
| WO | 2014/014838 | 1/2014 |
| WO | 2019/069260 | 4/2019 |

OTHER PUBLICATIONS

International Search Report and Written Opinion for PCT/US2021/031973 dated Aug. 13, 2021.

(Continued)

*Primary Examiner* — Tyler D Paige

(57) ABSTRACT

In one embodiment, a lidar system includes a light source configured to emit pulses of light and a scanner configured to scan the emitted pulses of light along a high-resolution scan pattern located within a field of regard of the lidar system. The scanner includes one or more scan mirrors configured to (i) scan the emitted pulses of light along a first scan axis to produce multiple scan lines of the high-resolution scan pattern, where each scan line is associated with multiple pixels, each pixel corresponding to one of the emitted pulses of light and (ii) distribute the scan lines of the high-resolution scan pattern along a second scan axis. The high-resolution scan pattern includes one or more of: interlaced scan lines and interlaced pixels.

26 Claims, 17 Drawing Sheets

(56) References Cited

U.S. PATENT DOCUMENTS

| | | | |
|---|---|---|---|
| 2005/0225478 A1* | 10/2005 | Nakamura | G01S 17/931 342/70 |
| 2005/0243301 A1* | 11/2005 | Takagi | G08G 1/166 356/4.07 |
| 2013/0127854 A1 | 5/2013 | Shpunt et al. | |
| 2013/0207970 A1 | 8/2013 | Shpunt et al. | |
| 2014/0043309 A1 | 2/2014 | Go et al. | |
| 2014/0063489 A1 | 3/2014 | Steffey et al. | |
| 2014/0240317 A1 | 8/2014 | Go et al. | |
| 2016/0047896 A1 | 2/2016 | Dussan | |
| 2016/0047903 A1 | 2/2016 | Dussan | |
| 2016/0274589 A1 | 9/2016 | Templeton et al. | |
| 2017/0153319 A1* | 6/2017 | Villeneuve | G01S 7/4804 |
| 2017/0328990 A1 | 11/2017 | Magee et al. | |
| 2018/0059248 A1 | 3/2018 | O'Keefe | |
| 2018/0188355 A1 | 7/2018 | Bao et al. | |
| 2018/0259645 A1* | 9/2018 | Shu | G01S 17/42 |
| 2018/0284224 A1* | 10/2018 | Weed | G01S 7/497 |
| 2018/0284234 A1* | 10/2018 | Curatu | G05D 1/024 |
| 2018/0329037 A1* | 11/2018 | Bozchalooi | G01S 17/931 |
| 2019/0107606 A1* | 4/2019 | Russell | G01S 7/4808 |
| 2019/0107607 A1* | 4/2019 | Danziger | G01S 7/4802 |
| 2019/0107623 A1* | 4/2019 | Campbell | G01S 17/931 |
| 2019/0129009 A1* | 5/2019 | Eichenholz | H03K 17/0416 |
| 2019/0180502 A1* | 6/2019 | Englard | G06T 3/4007 |
| 2019/0235083 A1* | 8/2019 | Zhang | G01S 7/4808 |
| 2019/0310368 A1* | 10/2019 | LaChapelle | G02B 27/0977 |
| 2019/0324124 A1 | 10/2019 | O'Keefe | |
| 2020/0284908 A1* | 9/2020 | Paulsen | G01S 7/4865 |

OTHER PUBLICATIONS

Non-Final Office Action dated Sep. 8, 2021 for U.S. Appl. No. 16/155,243.

* cited by examiner

LIDAR SYSTEM WITH HIGH-RESOLUTION SCAN PATTERN

REFERENCE TO RELATED APPLICATIONS

This application claims the benefit, under 35 U.S.C. § 119(e), of U.S. Provisional Patent Application No. 63/023,981, filed 13 May 2020, which is incorporated herein by reference.

TECHNICAL FIELD

This disclosure generally relates to lidar systems.

BACKGROUND

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

DESCRIPTION OF EXAMPLE EMBODIMENTS

Figure 1:
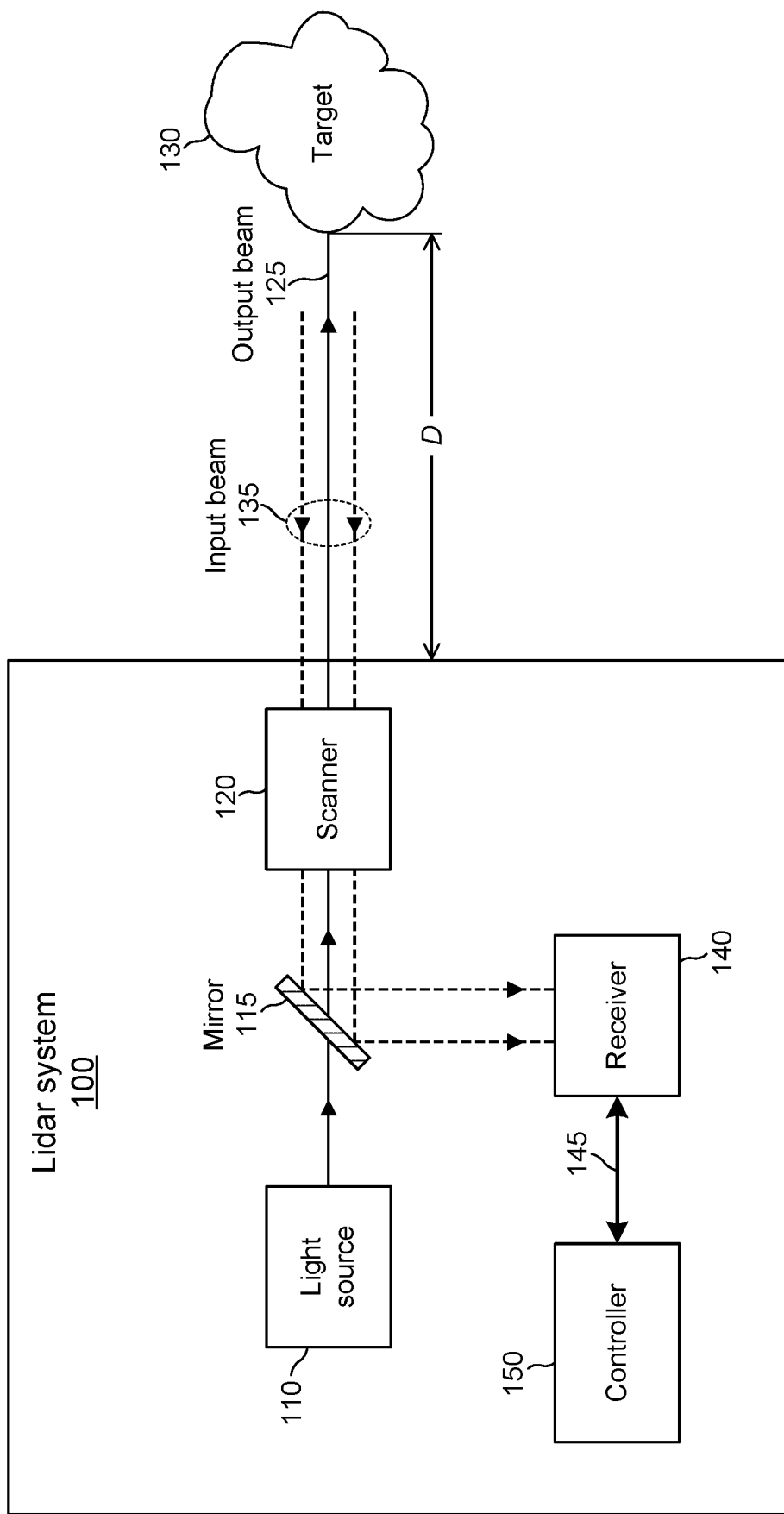
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may include, for example, a laser which emits light having a particular operating wavelength in the infrared, visible, or ultraviolet portions of the electromagnetic spectrum. As an example, light source 110 may include a laser with one or more operating wavelengths between approximately 900 nanometers (nm) and 2000 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the portion of scattered or reflected light is represented by input beam 135, which passes through scanner 120 and is reflected by mirror 115 and directed to receiver 140. In particular embodiments, a relatively small fraction or portion of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (µJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ.

In particular embodiments, output beam 125 may include or may be referred to as an optical signal, output optical signal, emitted optical signal, emitted pulse of light, laser beam, light beam, optical beam, emitted beam, emitted light, or beam. In particular embodiments, input beam 135 may include or may be referred to as a received optical signal, received pulse of light, input pulse of light, input optical signal, return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and produce one or more representative signals. For example, the receiver 140 may produce an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This may be done, for example, by analyzing a time of flight or a frequency or phase of a transmitted beam of light 125 or a received beam of light 135. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as D=c·T/2, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 μs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed or CW laser. For example, the light source 110 may be a pulsed laser that emits an output beam 125 with pulses of light having one or more of the following optical characteristics: a wavelength between 900 nm and 1700 nm; a pulse energy between 0.1 μJ and 100 μJ; a pulse repetition frequency between 80 kHz and 10 MHz; and a pulse duration between 1 ns and 100 ns. As another example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 80 kHz to 10 MHz or a pulse period (e.g., a time between consecutive pulses) of approximately 100 ns to 12.5 μs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 μs. As another example, light source 110 may have a pulse repetition frequency (which may be referred to as a repetition rate) that can be varied from approximately 200 kHz to 3 MHz. As used herein, a pulse of light may be referred to as an optical pulse, a light pulse, or a pulse.

In particular embodiments, light source 110 may include a pulsed or CW laser that produces a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 μJ, 0.1 μJ, 0.5 μJ, 1 μJ, 2 μJ, 10 μJ, 100 μJ, 1 mJ, or any other suitable pulse energy. As another example, output beam 125 may include pulses with a peak power of approximately 10 W, 100 W, 1 kW, 5 kW, 10 kW, or any other suitable peak power. The peak power ($P_{peak}$) of a pulse of light can be related to the pulse energy (E) by the expression $E=P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 1 μJ has a peak power of approximately 1 kW. The average power ($P_{av}$) of an output beam 125 can be related to the pulse repetition frequency (PRF) and pulse energy by the expression $P_{av}=PRF \cdot E$. For example, if the pulse repetition frequency is 500 kHz, then the average power of an output beam 125 with 1-0 pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, a vertical-cavity surface-emitting laser (VCSEL), a quantum dot laser diode, a grating-coupled surface-emitting laser (GCSEL), a slab-coupled optical waveguide laser (SCOWL), a single-transverse-mode laser diode, a multi-mode broad area laser diode, a laser-diode bar, a laser-diode stack, or a tapered-stripe laser diode. As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed or CW laser diode with a peak emission wavelength between 1200 nm and 1600 nm. As an example, light source 110 may include a current-modulated InGaAsP DFB laser diode that produces optical pulses at a wavelength of approximately 1550 nm. As another example, light source 110 may include a laser diode that emits light at a wavelength between 1500 nm and 1510 nm.

In particular embodiments, light source 110 may include a pulsed or CW laser diode followed by one or more optical-amplification stages. For example, a seed laser diode may produce a seed optical signal, and an optical amplifier may amplify the seed optical signal to produce an amplified optical signal that is emitted by the light source 110. In particular embodiments, an optical amplifier may include a fiber-optic amplifier or a semiconductor optical amplifier (SOA). For example, a pulsed laser diode may produce relatively low-energy optical seed pulses which are amplified by a fiber-optic amplifier. As another example, a light source 110 may include a fiber-laser module that includes a current-modulated laser diode with an operating wavelength of approximately 1550 nm followed by a single-stage or a multi-stage erbium-doped fiber amplifier (EDFA) or erbium-ytterbium-doped fiber amplifier (EYDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to a fiber-optic amplifier or SOA. As another example, light source 110 may include a pulsed or CW seed laser diode followed by a semiconductor optical amplifier (SOA). The SOA may include an active optical waveguide configured to receive light from the seed laser diode and amplify the light as it propagates through the waveguide. For example, the seed laser diode may produce relatively low-energy seed pulses of light which are amplified by the SOA. The optical gain of the SOA may be provided by pulsed or direct-current (DC) electrical current supplied to the SOA. The SOA may be integrated on the same chip as the seed laser diode, or the SOA may be a separate device with an anti-reflection coating on its input facet or output facet. As another example, light source 110 may include a seed laser diode followed by a SOA, which in turn is followed by a fiber-optic amplifier. For example, the seed laser diode may produce relatively low-energy seed pulses which are amplified by the SOA, and the fiber-optic amplifier may further amplify the optical pulses.

In particular embodiments, light source 110 may include a direct-emitter laser diode. A direct-emitter laser diode (which may be referred to as a direct emitter) may include a laser diode which produces light that is not subsequently amplified by an optical amplifier. A light source 110 that includes a direct-emitter laser diode may not include an optical amplifier, and the output light produced by a direct emitter may not be amplified after it is emitted by the laser diode. The light produced by a direct-emitter laser diode (e.g., pulses of light, CW light, or frequency-modulated light) may be emitted directly as a free-space output beam 125 without being amplified. A direct-emitter laser diode may be driven by an electrical power source that supplies current pulses to the laser diode, and each current pulse may result in the emission of an output optical pulse.

In particular embodiments, light source 110 may include a diode-pumped solid-state (DPSS) laser. A DPSS laser (which may be referred to as a solid-state laser) may refer to a laser that includes a solid-state, glass, ceramic, or crystal-based gain medium that is pumped by one or more pump laser diodes. The gain medium may include a host material that is doped with rare-earth ions (e.g., neodymium, erbium, ytterbium, or praseodymium). For example, a gain medium may include a yttrium aluminum garnet (YAG) crystal that is doped with neodymium (Nd) ions, and the gain medium may be referred to as a Nd:YAG crystal. A DPSS laser with a Nd:YAG gain medium may produce light at a wavelength between approximately 1300 nm and approximately 1400 nm, and the Nd:YAG gain medium may be pumped by one or more pump laser diodes with an operating wavelength between approximately 730 nm and approximately 900 nm. A DPSS laser may be a passively Q-switched laser that includes a saturable absorber (e.g., a vanadium-doped crystal that acts as a saturable absorber). Alternatively, a DPSS laser may be an actively Q-switched laser that includes an active Q-switch (e.g., an acousto-optic modulator or an electro-optic modulator). A passively or actively Q-switched DPSS laser may produce output optical pulses that form an output beam 125 of a lidar system 100.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, holographic elements, isolators, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photodetector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scan mirrors configured to pivot, rotate, oscillate, or move in an angular manner about one or more rotation axes. The output beam 125 may be reflected by a scan mirror, and as the scan mirror pivots or rotates, the reflected output beam 125 may be scanned in a corresponding angular manner. As an example, a scan mirror may be configured to periodically pivot back and forth over a 30-degree range, which results in the output beam 125 scanning back and forth across a 60-degree range (e.g., a 0-degree rotation by a scan mirror results in a 20-degree angular scan of output beam 125).

In particular embodiments, a scan mirror (which may be referred to as a scanning mirror) may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism. As an example, a scanner 120 may include a scan mirror attached to a galvanometer scanner configured to pivot back and forth over a 1° to 30° angular range. As another example, a scanner 120 may include a scan mirror that is attached to or is part of a MEMS device configured to scan over a 1° to 30° angular range. As another example, a scanner 120 may include a polygon mirror configured to rotate continuously in the same direction (e.g., rather than pivoting back and forth, the polygon mirror continuously rotates 360 degrees in a clockwise or counterclockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz).

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scan mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is substantially orthogonal to the first direction. As another example, the first scan mirror may scan the output beam 125 along a substantially horizontal direction, and the second scan mirror may scan the output beam 125 along a substantially vertical direction (or vice versa). As another example, the first and second scan mirrors may each be driven by galvanometer scanners. As another example, the first or second scan mirror may include a polygon mirror driven by an electric motor. In particular embodiments, scanner 120 may be referred to as a beam scanner, optical scanner, or laser scanner.

In particular embodiments, one or more scan mirrors may be communicatively coupled to controller 150 which may control the scan mirror(s) so as to guide the output beam 125 in a desired direction downrange or along a desired scan pattern. In particular embodiments, a scan pattern may refer to a pattern or path along which the output beam 125 is directed. As an example, scanner 120 may include two scan mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a scanner 120 with a solid-state scanning device. A solid-state scanning device may refer to a scanner 120 that scans an output beam 125 without the use of moving parts (e.g., without the use of a mechanical scanner, such as a mirror that rotates or pivots). For example, a solid-state scanner 120 may include one or more of the following: an optical phased array scanning device; a liquid-crystal scanning device; or a liquid lens scanning device. A solid-state scanner 120 may be an electrically addressable device that scans an output beam 125 along one axis (e.g., horizontally) or along two axes (e.g., horizontally and vertically). In particular embodiments, a scanner 120 may include a solid-state scanner and a mechanical scanner. For example, a scanner 120 may include an optical phased array scanner configured to scan an output beam 125 in one direction and a galvanometer scanner that scans the output beam 125 in an orthogonal direction. The optical phased array scanner may scan the output beam relatively rapidly in a horizontal direction across the field of regard (e.g., at a scan rate of 50 to 1,000 scan lines per second), and the galvanometer may pivot a mirror at a rate of 1-30 Hz to scan the output beam 125 vertically.

In particular embodiments, a lidar system 100 may include a light source 110 configured to emit pulses of light and a scanner 120 configured to scan at least a portion of the emitted pulses of light across a field of regard of the lidar system 100. One or more of the emitted pulses of light may be scattered by a target 130 located downrange from the lidar system 100, and a receiver 140 may detect at least a portion of the pulses of light scattered by the target 130. A receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor, where the PN acronym refers to the structure having p-doped and n-doped regions) or one or more PIN photodiodes (e.g., a photodiode structure formed by an undoped intrinsic semiconductor region located between p-type and n-type regions, where the PIN acronym refers to the structure having p-doped, intrinsic, and n-doped regions). An APD, SPAD, PN photodiode, or PIN photodiode may each be referred to as a detector, photodetector, or photodiode. A detector may have an active region or an avalanche-multiplication region that includes silicon, germanium, InGaAs, or AlInAsSb (aluminum indium arsenide antimonide). The active region may refer to an area over which a detector may receive or detect input light. An active region may have any suitable size or diameter, such as for example, a diameter of approximately 10 µm, 25 µm, 50 µm, 80 µm, 100 µm, 200 µm, 500 µm, 1 mm, 2 mm, or 5 mm.

In particular embodiments, receiver 140 may include electronic circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more optical characteristics (e.g., rising edge, falling edge, amplitude, duration, or energy) of a received optical pulse. As an example, the pulse-detection circuitry may perform a time-to-digital conversion to produce a digital output signal 145. The output electrical signal 145 may be sent to controller 150 for processing or analysis (e.g., to determine a time-of-flight value corresponding to a received optical pulse).

In particular embodiments, a controller 150 (which may include or may be referred to as a processor, an FPGA, an ASIC, a computer, or a computing system) may be located within a lidar system 100 or outside of a lidar system 100. Alternatively, one or more parts of a controller 150 may be located within a lidar system 100, and one or more other parts of a controller 150 may be located outside a lidar system 100. In particular embodiments, one or more parts of a controller 150 may be located within a receiver 140 of a lidar system 100, and one or more other parts of a controller 150 may be located in other parts of the lidar system 100. For example, a receiver 140 may include an FPGA or ASIC configured to process an output electrical signal from the receiver 140, and the processed signal may be sent to a computing system located elsewhere within the lidar system 100 or outside the lidar system 100. In particular embodiments, a controller 150 may include any suitable arrangement or combination of logic circuitry, analog circuitry, or digital circuitry.

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to an operating range ($R_{OP}$) of the lidar system 100. In particular embodiments, an operating range (which may be referred to as an operating distance) of a lidar system 100 may refer to a distance over which the lidar system 100 is configured to sense or identify targets 130 located within a field of regard of the lidar system 100. The operating range of lidar system 100 may be any suitable distance, such as for example, 25 m, 50 m, 100 m, 200 m, 250 m, 500 m, or 1 km. As an example, a lidar system 100 with a 200-m operating range may be configured to sense or identify various targets 130 located up to 200 m away from the lidar system 100. The operating range $R_{OP}$ of a lidar system 100 may be related to the time T between the emission of successive optical signals by the expression $R_{OP}=c\cdot\tau/2$. For a lidar system 100 with a 200-m operating range ($R_{OP}$=200 m), the time $\tau$ between successive pulses (which may be referred to as a pulse period, a pulse repetition interval (PRI), or a time period between pulses) is approximately $2\cdot R_{OP}/c \cong 1.33$ µs. The pulse period $\tau$ may also correspond to the time of flight for a pulse to travel to and from a target 130 located a distance $R_{OP}$ from the lidar system 100. Additionally, the pulse period $\tau$ may be related to the pulse repetition frequency (PRF) by the expression $\tau=1/PRF$. For example, a pulse period of 1.33 µs corresponds to a PRF of approximately 752 kHz.

In particular embodiments, a lidar system 100 may be used to determine the distance to one or more downrange targets 130. By scanning the lidar system 100 across a field of regard, the system may be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5\times10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds. A frame rate of 10 Hz corresponds to a 100-ms time interval for capturing a single frame.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1:2014 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1200 nm and approximately 1400 nm or between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 900 nm and approximately 1700 nm. As another example, lidar system 100 may be a Class 1 or Class I laser product that includes a laser diode, fiber laser, or solid-state laser with an operating wavelength between approximately 1200 nm and approximately 1600 nm. As another example, lidar system 100 may have an operating wavelength between approximately 1500 nm and approximately 1510 nm.

In particular embodiments, one or more lidar systems 100 may be integrated into a vehicle. As an example, multiple lidar systems 100 may be integrated into a car to provide a complete 360-degree horizontal FOR around the car. As another example, 2-10 lidar systems 100, each system having a 45-degree to 180-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-30 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in operating the vehicle. For example, a lidar system 100 may be part of an ADAS that provides information (e.g., about the surrounding environment) or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may be configured to guide the autonomous vehicle through an environment surrounding the vehicle and toward a destination. An autonomous-vehicle driving system may include one or more computing systems that receive information from a lidar system 100 about the surrounding environment, analyze the received information, and provide control signals to the vehicle's driving systems (e.g., steering wheel, accelerator, brake, or turn signal). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, an optical signal (which may be referred to as a light signal, a light waveform, an optical waveform, an output beam, or emitted light) may include pulses of light, CW light, amplitude-modulated light, frequency-modulated light, or any suitable combination thereof. Although this disclosure describes or illustrates example embodiments of lidar systems 100 or light sources 110 that produce optical signals that include pulses of light, the embodiments described or illustrated herein may also be applied, where appropriate, to other types of optical signals, including continuous-wave (CW) light, amplitude-modulated optical signals, or frequency-modulated optical signals. For example, a lidar system 100 as described or illustrated herein may be a pulsed lidar system and may include a light source 110 configured to produce pulses of light. Alternatively, a lidar system 100 may be configured to operate as a frequency-modulated continuous-wave (FMCW) lidar system and may include a light source 110 configured to produce CW light or a frequency-modulated optical signal.

In particular embodiments, a lidar system 100 may be a FMCW lidar system where the emitted light from the light source 110 (e.g., output beam 125 in FIG. 1 or FIG. 3) includes frequency-modulated light. A pulsed lidar system is a type of lidar system 100 in which the light source 110 emits pulses of light, and the distance to a remote target 130 is determined from the time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a modulation frequency of the received light (which is scattered by the remote target) relative to the modulation frequency of the emitted light. A round-trip time for the emitted light to travel to a target 130 and back to the lidar system may correspond to a frequency difference between the received scattered light and a portion of the emitted light.

For example, for a linearly chirped light source (e.g., a frequency modulation that produces a linear change in frequency with time), the larger the frequency difference between the emitted light and the received light, the farther away the target 130 is located. The frequency difference may be determined by mixing the received light with a portion of the emitted light (e.g., by coupling the two beams onto a detector, or by mixing analog electric signals corresponding to the received light and the emitted light) and determining the resulting beat frequency. For example, an electrical signal from an APD may be analyzed using a fast Fourier transform (FFT) technique to determine the frequency difference between the emitted light and the received light. If a linear frequency modulation m (e.g., in units of Hz/s) is applied to a CW laser, then the round-trip time T may be related to the frequency difference between the received scattered light and the emitted light $\Delta f$ by the expression T=$\Delta f$/m. Additionally, the distance D from the target 130 to the lidar system 100 may be expressed as D=c·$\Delta f$/(2 m), where c is the speed of light. For example, for a light source 110 with a linear frequency modulation of $10^{12}$ Hz/s (or, 1 MHz/μs), if a frequency difference (between the received scattered light and the emitted light) of 330 kHz is measured, then the distance to the target is approximately 50 meters (which corresponds to a round-trip time of approximately 330 ns). As another example, a frequency difference of 1.33 MHz corresponds to a target located approximately 200 meters away.

The light source 110 for a FMCW lidar system may include a direct-emitter laser diode or may include a seed laser diode followed by a SOA. Alternatively, the light source 110 may include a seed laser diode followed by a fiber-optic amplifier or may include a seed laser diode followed by a SOA and then a fiber-optic amplifier. The seed laser diode or the direct-emitter laser diode may be operated in a CW manner (e.g., by driving the laser diode with a substantially constant DC current), and the frequency modulation may be provided by an external modulator (e.g., an electro-optic phase modulator). Alternatively, the frequency modulation may be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) may have any suitable frequency or shape (e.g., piecewise linear, sinusoidal, triangle-wave, or sawtooth).

Figure 2:
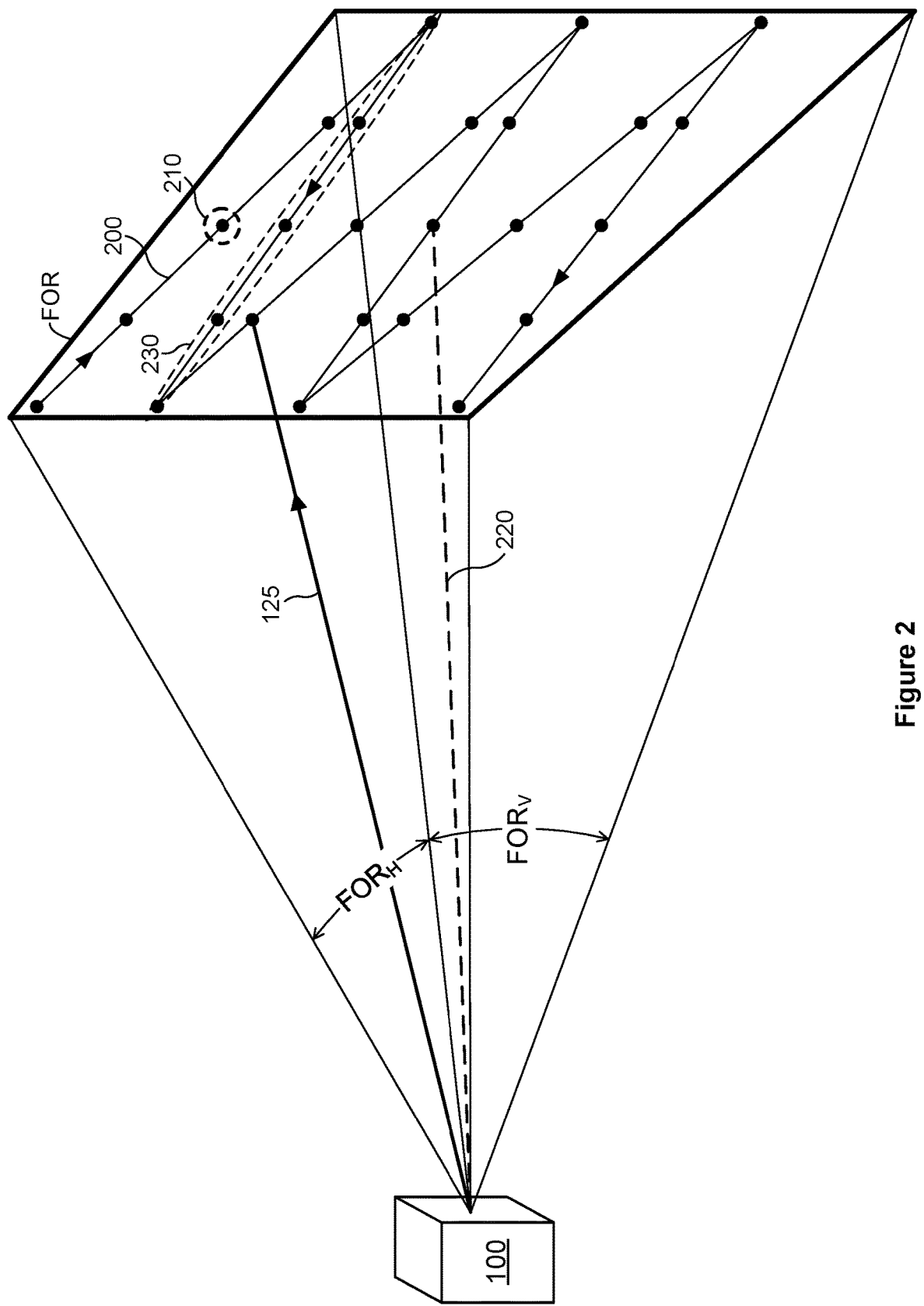
FIG. 2 illustrates an example scan pattern produced by a lidar system.

FIG. 2 illustrates an example scan pattern 200 produced by a lidar system 100. A scanner 120 of the lidar system 100 may scan the output beam 125 (which may include multiple emitted optical signals) along a scan pattern 200 that is contained within a FOR of the lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR (FOR$_H$) and any suitable vertical FOR (FOR$_V$). For example, a scan pattern 200 may have a field of regard represented by angular dimensions (e.g., FOR$_H$×FOR$_V$) 40°×30°, 90°×40°, or 60°×15°. As another example, a scan pattern 200 may have a FOR$_H$ greater than or equal to 10°, 25°, 30°, 40°, 60°, 90°, or 120°. As another example, a scan pattern 200 may have a FOR$_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°. In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses or one or more distance measurements. Additionally, a scan pattern 200 may include multiple scan lines 230, where each scan line represents one scan across at least part of a field of regard, and each scan line 230 may include multiple pixels 210. In FIG. 2, scan line 230 includes five pixels 210 and corresponds to an approximately horizontal scan across the FOR from right to left, as viewed from the lidar system 100. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scan mirrors of scanner 120.

Figure 3:
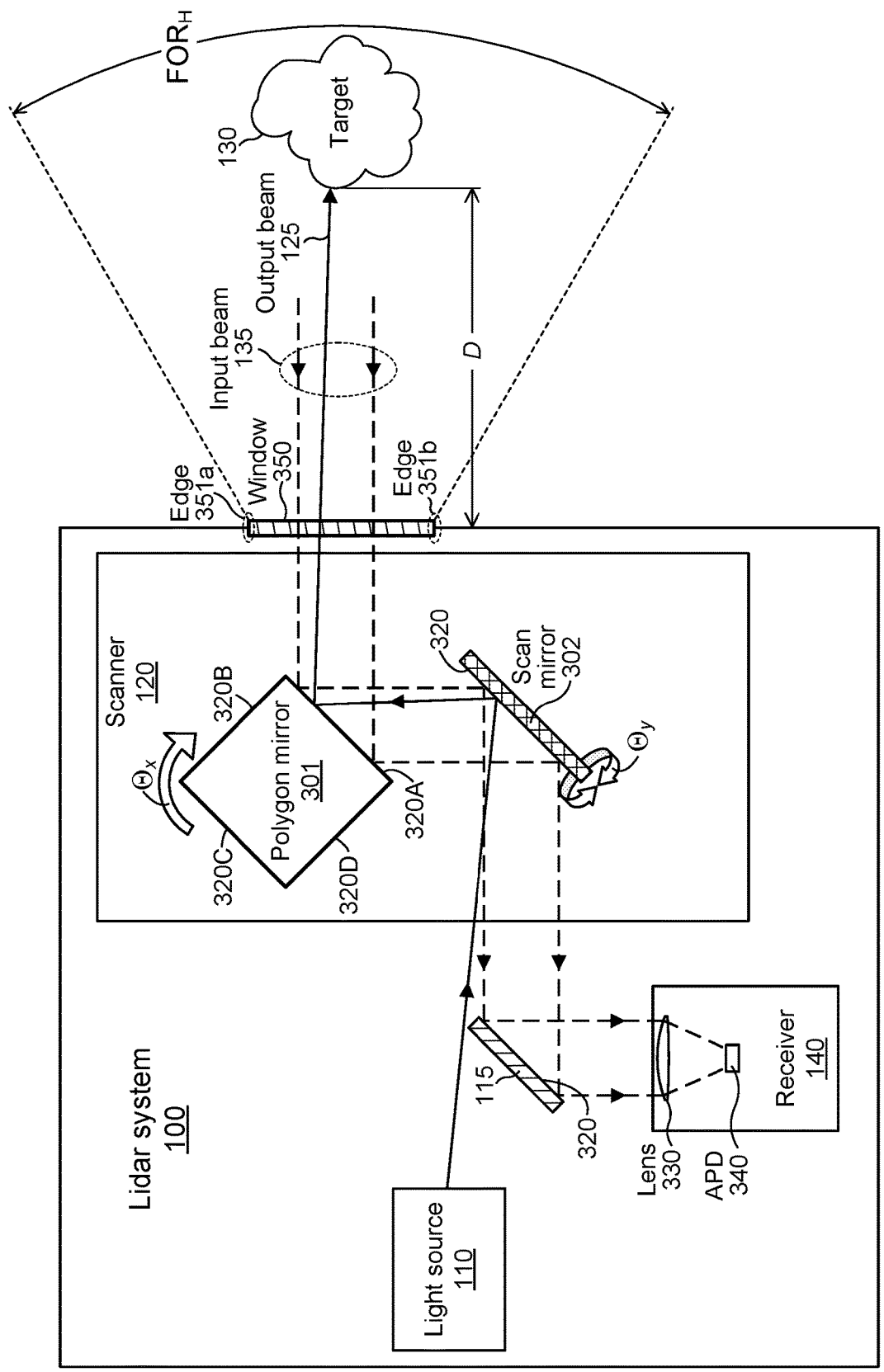
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a particular direction. In the example of FIG. 3, scanner 120 includes two scan mirrors: (1) a polygon mirror 301 that rotates along the $\Theta_x$ direction and (2) a scan mirror 302 that oscillates back and forth along the $\Theta_y$ direction. The output beam 125 from light source 110, which passes alongside mirror 115, is reflected by reflecting surface 320 of scan mirror 302 and is then reflected by a reflecting surface (e.g., surface 320A, 320B, 320C, or 320D) of polygon mirror 301. Scattered light from a target 130 returns to the lidar system 100 as input beam 135. The input beam 135 reflects from polygon mirror 301, scan mirror 302, and mirror 115, which directs input beam 135 through focusing lens 330 and to the detector 340 of receiver 140. The detector 340 may be a PN photodiode, a PIN photodiode, an APD, a SPAD, or any other suitable detector. A reflecting surface 320 (which may be referred to as a reflective surface) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, a polygon mirror 301 may be configured to rotate along a $\Theta_x$ or $\Theta_y$ direction and scan output beam 125 along a substantially horizontal or vertical direction, respectively. A rotation along a $\Theta_x$ direction may refer to a rotational motion of mirror 301 that results in output beam 125 scanning along a substantially horizontal direction. Similarly, a rotation along a $\Theta_y$ direction may refer to a rotational motion that results in output beam 125 scanning along a substantially vertical direction. In FIG. 3, mirror 301 is a polygon mirror that rotates along the $\Theta_x$ direction and scans output beam 125 along a substantially horizontal direction, and mirror 302 pivots along the $\Theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotation speed of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotation speed of approximately 160 Hz (or, 9600 revolutions per minute (RPM)).

In particular embodiments, output beam 125 may be reflected sequentially from the reflective surfaces 320A, 320B, 320C, and 320D as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG. 3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line. In particular embodiments, a lidar system 100 may be configured so that the output beam 125 is first reflected from polygon mirror 301 and then from scan mirror 302 (or vice versa). As an example, an output beam 125 from light source 110 may first be directed to polygon mirror 301, where it is reflected by a reflective surface of the polygon mirror 301, and then the output beam 125 may be directed to scan mirror 302, where it is reflected by reflective surface 320 of the scan mirror 302. In the example of FIG. 3, the output beam 125 is reflected from the polygon mirror 301 and the scan mirror 302 in the reverse order. In FIG. 3, the output beam 125 from light source 110 is first directed to the scan mirror 302, where it is reflected by reflective surface 320, and then the output beam 125 is directed to the polygon mirror 301, where it is reflected by reflective surface 320A.

In particular embodiments, a lidar system 100 may include a window 350 configured to transmit the output beam 125 and the input beam 135. The window 350 in FIG. 3 may be made from any suitable substrate material, such as for example, glass (e.g., fused silica) or plastic (e.g., polycarbonate, acrylic, cyclic-olefin polymer, or cyclic-olefin copolymer), and the window 350 may have an optical transmission of greater than or equal to 70%, 80%, 90%, 95%, or 99% at an operating wavelength of light source 110. The window 350 may include a dielectric coating configured to be substantially transmitting to light at the wavelength of the light source 110. For example, the window 350 may have an anti-reflection (AR) dielectric coating on its interior or exterior surface, and the AR coating may have a reflectivity of less than 1% at an operating wavelength of the light source 110. Additionally, the dielectric coating may have an increased reflectivity at wavelengths away from the light-source operating wavelength, which may help prevent unwanted stray light (e.g., sunlight or light from other lidar systems) from entering the lidar system 100. For example, if a light source 110 operates at 1550 nm, the window 350 may have a dielectric coating with a reflectivity of less than 0.5% from approximately 1545 nm to approximately 1555 nm. Additionally, the dielectric coating may have a reflectivity of greater than approximately 90% at one or more wavelengths from approximately 900 nm to approximately 1500 nm.

Figure 4:
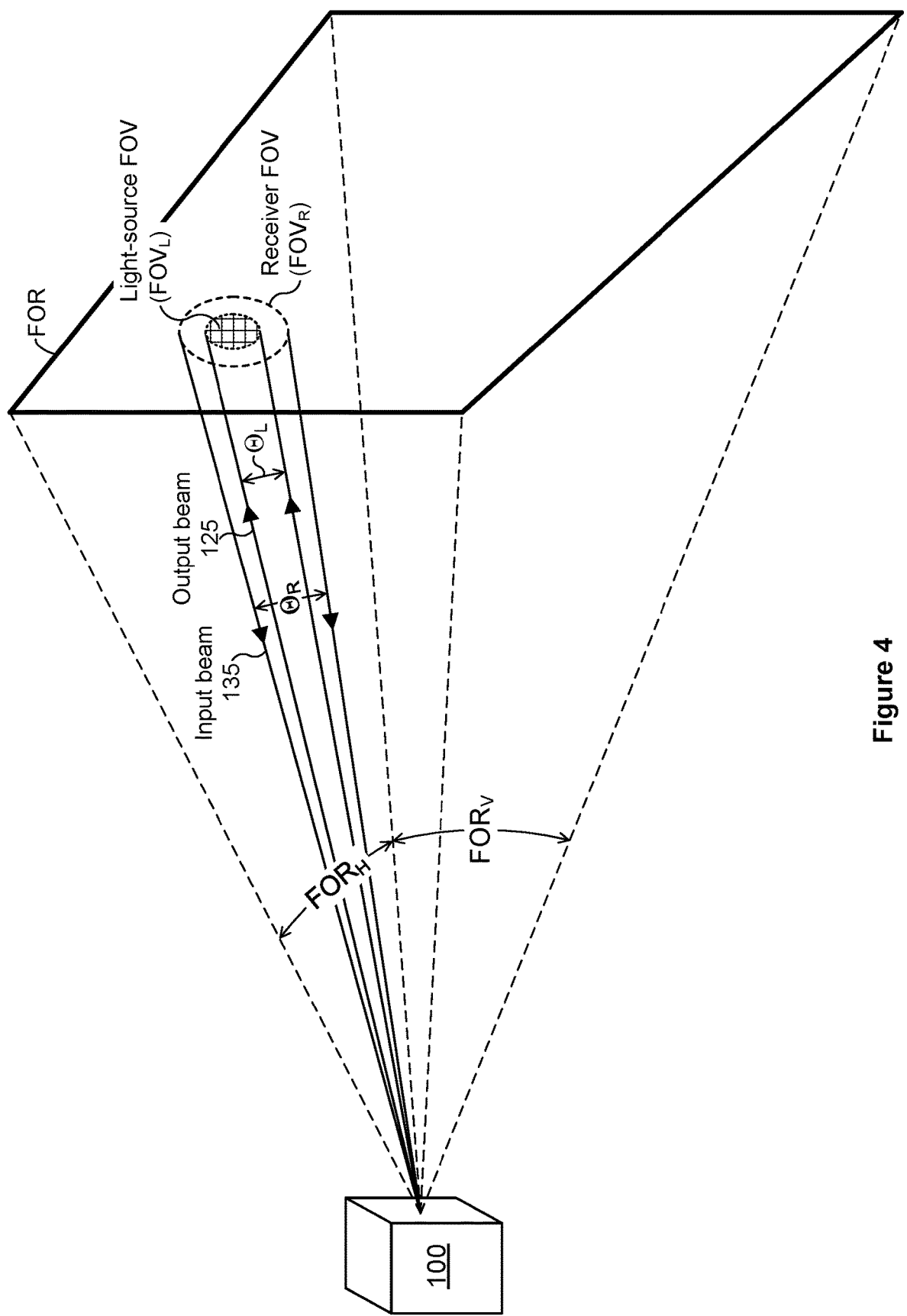
FIG. 4 illustrates an example light-source field of view ($FOV_L$) and receiver field of view ($FOV_R$) for a lidar system.

FIG. 4 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scan speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad. As another example, $\Theta_R$ may be approximately L times larger than $\Theta_L$, where L is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
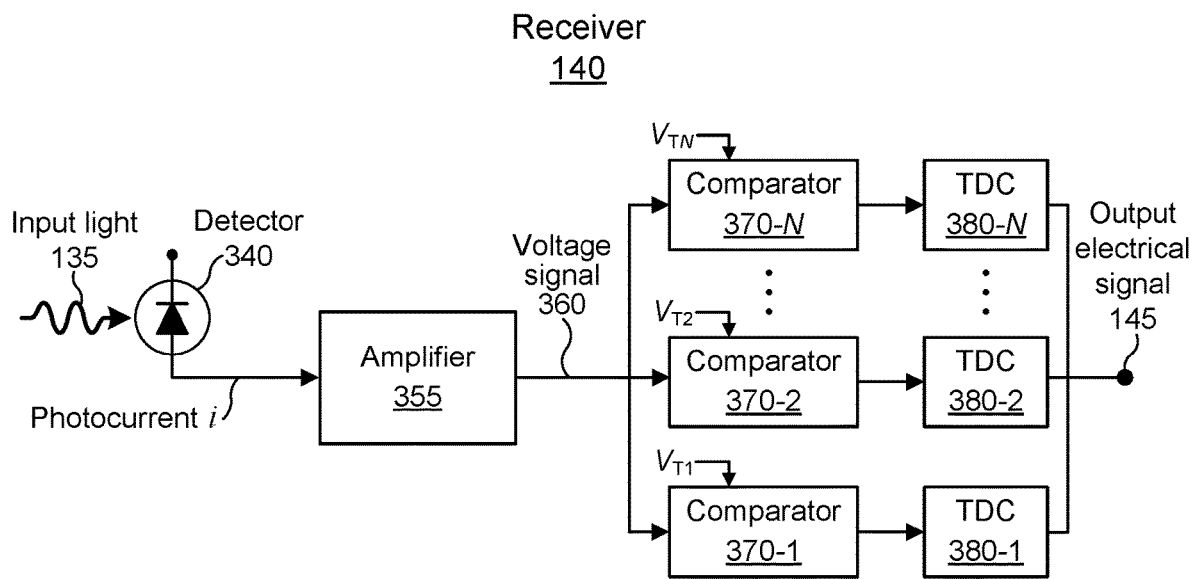
FIG. 5 illustrates an example receiver.

FIG. 5 illustrates an example receiver 140. In particular embodiments, a receiver 140 of a lidar system 100 may include one or more detectors 340, one or more electronic amplifiers 355, or one or more voltage comparators 370. Additionally, a receiver 140 may include one or more time-to-digital converters (TDCs) 380 coupled to each of the comparators 370. A light source 110 of a lidar system 100 may emit an optical signal, and a receiver 140 may be configured to detect a received optical signal (e.g., input light 135) that includes a portion of the emitted optical signal that is scattered by a remote target 130. For example, a pulse of light emitted by a light source 110 may be scattered by a target 130, and a receiver 140 may receive an input optical signal 135 that includes a portion of the scattered pulse of light.

The example receiver 140 illustrated in FIG. 5 includes a detector 340 configured to receive an input optical signal (input light 135) and produce a photocurrent i that corresponds to the received optical signal. The detector 340 may include an APD, PN photodiode, or PIN photodiode, and the photocurrent i produced by the detector 340 may be referred to as a photocurrent signal or an electrical-current signal. The detector 340 is coupled to an electronic amplifier 355 configured to receive the photocurrent i and produce a voltage signal 360 that corresponds to the received photocurrent. For example, the detector 340 may include an APD that produces a pulse of photocurrent in response to detecting an input pulse of light, and the voltage signal 360 may include an analog voltage pulse that corresponds to the pulse of photocurrent. The amplifier 355 may include a transimpedance amplifier configured to receive the photocurrent i and produce a voltage signal that corresponds to the photocurrent signal. Additionally, the amplifier 355 may include a voltage amplifier that amplifies the voltage signal or an electronic filter (e.g., a low-pass filter) that filters the photocurrent or the voltage signal.

In FIG. 5, the voltage signal 360 produced by the amplifier 355 is coupled to N voltage comparators (comparators 370-1, 370-2, ..., 370-N), and each comparator is supplied with a particular threshold or reference voltage ($V_{T1}$, $V_{T2}$, ..., $V_{TN}$). For example, receiver 140 may include N=10 comparators, and the threshold voltages may be set to 10 values between 0 volts and 1 volt (e.g., $V_{T1}$=0.1 V, $V_{T2}$=0.2 V, and $V_{T10}$=1.0 V). A comparator may produce an edge signal (e.g., a rising or falling electrical edge) when the voltage signal 360 rises above or falls below a particular threshold voltage. For example, comparator 370-2 may produce a rising edge when the voltage signal 360 rises above the threshold voltage $V_{T2}$. Additionally or alternatively, comparator 370-2 may produce a falling edge when the voltage signal 360 falls below the threshold voltage $V_{T2}$.

The receiver 140 in FIG. 5 includes N time-to-digital converters (TDCs 380-1, 380-2, ..., 380-N), and each comparator is coupled to one of the TDCs. A receiver 140 may include 1, 2, 4, 8, 10, 50, 100, 200, 500, 1,000, 5,000, or any other suitable number of comparators and TDCs, and each comparator may be provided with a particular threshold voltage (e.g., the threshold voltages may be different from one another). Each TDC may act as a timer that produces an output electrical signal (e.g., a digital signal, a digital word, or a digital value) that represents a time when an edge signal is received from a comparator. For example, if the voltage signal 360 rises above the threshold voltage $V_{T1}$, then the comparator 370-1 may produce an edge signal that is supplied to the input of TDC 380-1, and the TDC 380-1 may produce a digital value corresponding to a time when the edge signal was received by TDC 380-1. The digital time value may be referenced to the time when a pulse of light was emitted by the light source 110, and the digital time value may correspond to a round-trip time for the pulse of light to travel to a target 130 and back to the lidar system 100.

The output electrical signal 145 in FIG. 5 may include digital values from each of the TDCs that receive an edge signal from a comparator, and each digital value may represent a time interval between the emission of a pulse of light by a light source 110 and the receipt of an edge signal from a comparator. For example, a light source 110 may emit a pulse of light that is scattered by a target 130 located a distance D from the lidar system 100, and a receiver 140 may receive a portion of the scattered pulse of light as an input optical signal 135. The output electrical signal 145 (which may correspond to the input optical signal 135) may be sent to a controller 150, and the controller may determine the distance to the target 130 based at least in part on the output electrical signal 145. The distance from the lidar system 100 to the target 130 may be determined from a round-trip time of flight T for a pulse of light, and the time of light may be determined based on (i) a time when the pulse of light was emitted by the light source 110 and (ii) one or more times at which electrical-edge signals were received by one or more TDCs. For example, the controller 150 may determine, based on the one or more times associated with the electrical-edge signals, a time-of-receipt for a received pulse of light. The time-of-receipt may correspond to a peak, center, rising edge, or falling edge of the received pulse of light, and the round-trip time of flight for the pulse of light may be determined from the difference between the time-of-receipt and a time when the pulse of light was emitted.

Figure 6:
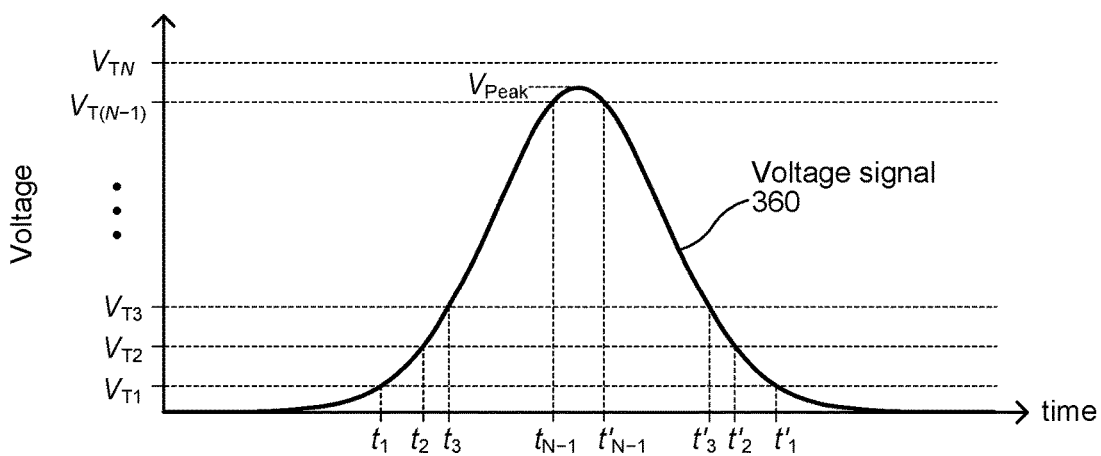
FIG. 6 illustrates an example voltage signal corresponding to a received optical signal.

FIG. 6 illustrates an example voltage signal 360 corresponding to a received optical signal 135. The voltage signal 360 illustrated in FIG. 6 may be an analog signal produced by an electronic amplifier 355 and may correspond to a pulse of light detected by the receiver 140 in FIG. 5. The voltage levels on the vertical axis correspond to the threshold voltages $V_{T1}$, $V_{T2}$, ..., $V_{TN}$ of the respective comparators 370-1, 370-2, ..., 370-N. The time values $t_1, t_2, t_3, ... t_{N-1}$ correspond to times when the voltage signal 360 exceeds the corresponding threshold voltages, and the time values $t'_1, t'_2, t'_3, ... t'_{N-1}$ correspond to times when the voltage signal 360 falls below the corresponding threshold voltages. For example, at time $t_1$ when the voltage signal 360 exceeds the threshold voltage $V_{T1}$, comparator 370-1 may produce an edge signal, and TDC 380-1 may output a digital value corresponding to the time $t_1$. Additionally, the TDC 380-1 may output a digital value corresponding to the time $t'_1$ when the voltage signal 360 falls below the threshold voltage $V_{T1}$. Alternatively, the receiver 140 may include an additional TDC (not illustrated in FIG. 5) configured to produce a digital value corresponding to time $t'_1$ when the voltage signal 360 falls below the threshold voltage $V_{T1}$. The output electrical signal 145 from receiver 140 may include one or more digital values that correspond to one or more of the time values $t_1, t_2, t_3, ... t_{N-1}$ and $t'_1, t'_2, t'_3, ..., t'_{N-1}$. Additionally, the output electrical signal 145 may also include one or more values corresponding to the threshold voltages associated with the time values. Since the voltage signal 360 in FIG. 6 does not exceed the threshold voltage $V_{TN}$, the corresponding comparator 370-N may not produce an edge signal. As a result, TDC 380-N may not produce a time value, or TDC 380-N may produce an output electrical signal indicating that no edge signal was received. The output electrical signal 145 produced by a receiver 140 may be used to determine a time associated with a peak, center, rising edge, or falling edge of a received pulse of light.

Figure 7:
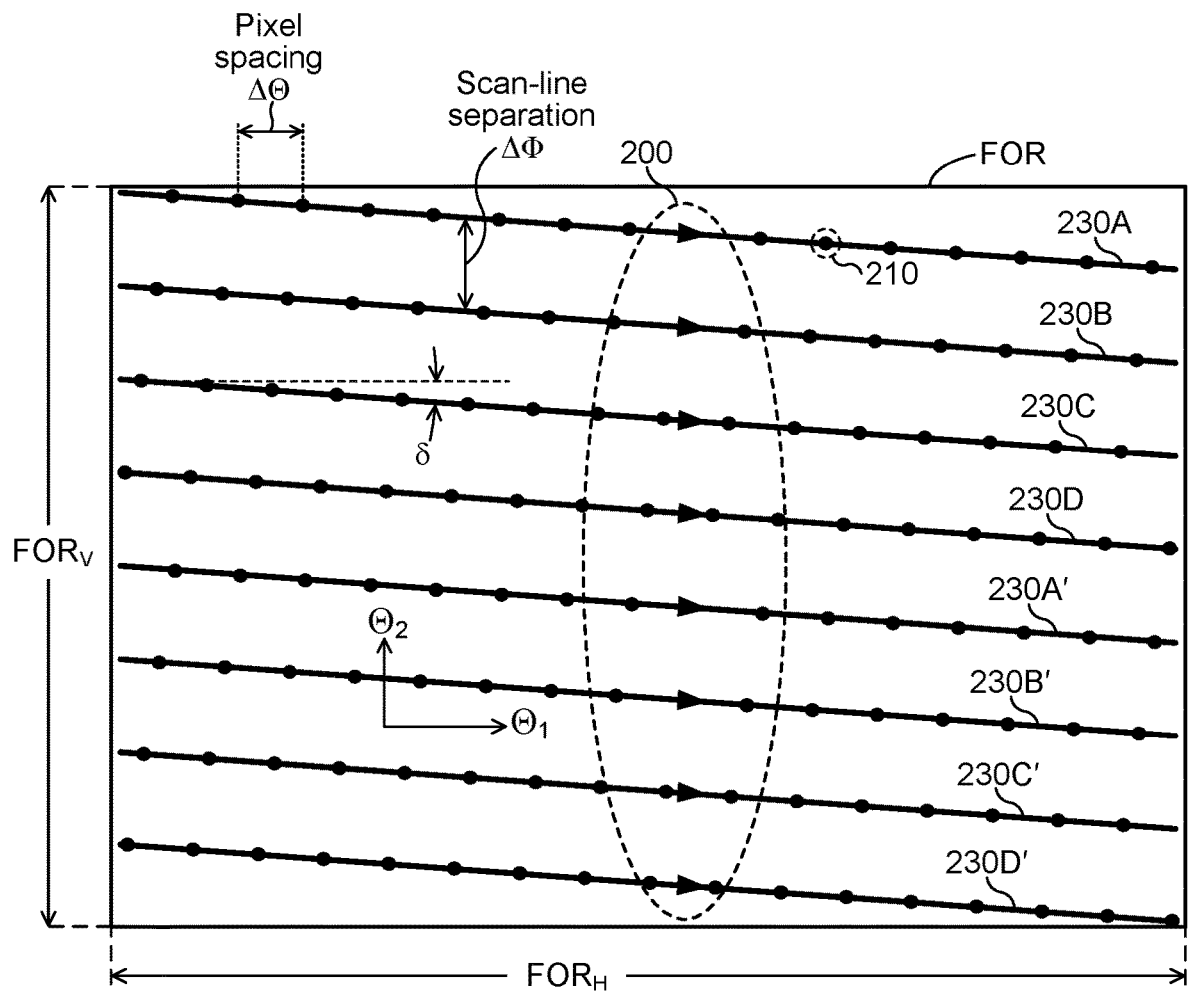
FIG. 7 illustrates an example unidirectional scan pattern that includes multiple pixels and multiple scan lines.

FIG. 7 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 7 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 7 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. Each scan line in FIG. 7 may be produced as the output beam 125 is scanned by the polygon mirror from edge 351a of the window 350 to edge 351b of the window 350, as illustrated in FIG. 3. Each scan line 230 may correspond to a reflection of the output beam 125 from one of the reflective surfaces 320 of the polygon mirror 301. As an example, reflective surface 320A of polygon mirror 301 in FIG. 3 may produce scan line 230A in FIG. 7. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, P successive scan lines 230 of a unidirectional scan pattern 200 may correspond to one full revolution of a P-sided polygon mirror. As an example, the four scan lines 230A, 230B, 230C, and 230D in FIG. 7 may correspond to one full revolution of the four-sided polygon mirror 301 in FIG. 3. Additionally, a subsequent revolution of the polygon mirror 301 may produce the next four scan lines 230A', 230B', 230C', and 230D' in FIG. 7.

In particular embodiments, scan lines 230 of a scan pattern 200 may be oriented along any suitable direction. For example, scan lines 230 may be oriented substantially along a horizontal direction or substantially along a vertical direction. As another example, scan lines 230 may be oriented at any suitable angle with respect to a horizontal or vertical axis, such as for example, at an angle of approximately 0°, 10°, 20°, 30°, 45°, 60°, 70°, 80°, or 90° with respect to a horizontal or vertical axis. In the example of FIG. 7, the scan lines 230 are oriented at an incline angle δ of approximately −4° with respect to the $\Theta_1$ axis, where the $\Theta_1$ axis may correspond to a horizontal direction. The $\Theta_1$ axis may correspond to an approximate direction along which the scan lines 230 are scanned or oriented, and the $\Theta_2$ axis may correspond to an approximate direction along which the scan lines 230 are distributed. In FIG. 3, the $\Theta_x$ axis about which the polygon mirror 301 rotates may correspond to the $\Theta_1$ axis in FIG. 7, and the $\Theta_y$ axis about which the scan mirror 302 pivots may correspond to the $\Theta_2$ axis.

The scan lines 230 in FIG. 7 are separated from one another by a scan-line separation angle $\Delta\Phi$. A scan-line separation angle $\Delta\Phi$ may be an angle that corresponds to the angular separation between two scan lines 230 (e.g., two adjacent scan lines 230 of a scan pattern 200). In the example of FIG. 7, the angular extent of the vertical FOR may be approximately 8 degrees ($FOR_V$=8°), and each of the eight scan lines 230 may be separated from one another along the $\Theta_2$ axis by a scan-line separation angle of approximately 1 degree. A scan-line separation angle $\Delta\Phi$ may be referred to as a scan-line separation, a separation angle, a scan-line spacing angle, or a scan-line spacing. A scan pattern 200 may include scan lines 230 having any suitable scan-line separation angle $\Delta\Phi$, such as for example a scan-line separation angle of approximately 0.01°, 0.02°, 0.05°, 0.1°, 0.2°, 0.5°, 1°, 2°, 5°, or 10°. A scan-line separation angle may be measured along the $\Theta_2$ axis or along a perpendicular between two scan lines 230. For example, in FIG. 7, the scan-line separation angle $\Delta\Phi$ is measured along the $\Theta_2$ axis and may have a value of 1°. Alternatively, a scan-line separation angle may be measured along a line that is perpendicular to two scan lines 230 and may have a value of $\Delta\Phi\cdot\cos\delta$, where δ is an incline angle of the scan lines. In either case, the $\Theta_2$ axis may correspond to an approximate direction along which the scan lines 230 are distributed.

In particular embodiments, a scan pattern 200 may include scan lines 230 having a scan-line separation angle $\Delta\Phi$ that is substantially constant across a horizontal field of regard. For example, the separation angle between scan lines 230 of a scan pattern 200 may vary across the $FOR_H$ by less than or equal to 10%, 5%, 2%, 1%, or 0.1%. Each of the scan lines 230 in the example of FIG. 7 may have a substantially constant scan-line separation angle (with respect to an adjacent scan line) of approximately 0.5° and a variation of the scan-line separation angle of less than 10% (e.g., the scan-line separation angle may vary across the $FOR_H$ between 0.48° and 0.52°). As another example, the scan lines 230 in FIG. 7 may be separated from one another by a separation angle that varies between 0.20° and 0.21° across the $FOR_H$, which corresponds to a scan-line separation angle variation of approximately 5%. Scan lines 230 with a substantially constant scan-line separation angle may be substantially straight or may be curved (e.g., scan lines 230 having some amount of curvature may result in some variation of the scan-line separation angle across the $FOR_H$). A scan pattern 200 in which the scan lines 230 all have a substantially constant scan-line separation angle may be achieved with a scan mirror that provides a substantially constant angular scan speed. For example, the angular scan speed of the scan mirror 302 in FIG. 3 may be substantially constant as the scan mirror $3\Theta_2$ scans the output beam 125 along the $\Theta_y$ axis (which may correspond to the $\Theta_2$ axis in FIG. 7).

In particular embodiments, a scan pattern 200 may have a non-uniform separation of scan lines 230 so that the scan-line separation angle $\Delta\Phi$ between the scan lines 230 varies across the vertical field of regard. For example, the angular scan speed of the scan mirror 302 in FIG. 3 may be adjusted to change the spacing between scan lines 230 along the $\Theta_2$ axis. Regions of a FOR where the scan mirror 302 has a higher scan speed may have scan lines 230 with a larger scan-line separation angle (e.g., the scan lines are farther apart from one another), and other regions where the scan mirror 302 is scanned with a slower scan speed may result in scan lines 230 with a smaller scan-line separation angle (e.g., the scan lines are more closely spaced). The scan-line separation angle $\Delta\Phi$ for a scan pattern 200 with a non-uniform separation of scan lines 230 may be expressed as (i) a range of angles or (ii) an average separation angle between scan lines across the FOR. For example, a scan pattern 200 may have scan lines 230 whose scan-line separation angle varies across the vertical FOR over a range from approximately 0.1° to approximately 1°. If the scan pattern 200 includes 10 scan lines 230 with a 0.1-degree separation, 10 scan lines 230 with a 0.4-degree separation, and 10 scan lines with a 1-degree separation, then the scan pattern 200 may be referred to as having an average scan-line separation angle of approximately 0.5°.

The pixels 210 in FIG. 7 are separated from one another by a pixel-spacing angle $\Delta\Theta$. A pixel-spacing angle $\Delta\Theta$ may be an angle that corresponds to the angular separation between two adjacent pixels 210 that are part of the same scan line 230. In the example of FIG. 7, the extent of the horizontal FOR may be approximately 16 degrees (FOR$_H$=16°), and each of the approximately 16 pixels of each scan line 230 may be separated from one another along the $\Theta_1$ axis by a pixel-spacing angle $\Delta\Theta$ of approximately 1 degree. A pixel-spacing angle $\Delta\Theta$ may be referred to as a pixel spacing, a pixel separation, or a pixel-separation angle. A scan pattern 200 may include pixels 210 having any suitable pixel-spacing angle $\Delta\Theta$, such as for example, a pixel-spacing angle of approximately 0.002°, 0.01°, 0.02°, 0.05°, 0.1°, 0.2°, 0.5°, or 1°. A pixel-spacing angle may be measured along the $\Theta_1$ axis or along a scan line 230 connecting two pixels 210. For example, in FIG. 7, the pixel-spacing angle $\Delta\Theta$ is measured along the $\Theta_1$ axis and may have a value of 0.1°. Alternatively, the pixel-spacing angle may be measured along a scan line 230 and may have a value of $\Delta\Theta/\cos\delta$, where $\delta$ is an incline angle of the scan line. In either case, the $\Theta_1$ axis may correspond to an approximate direction along which the scan lines 230 are scanned or oriented or along which the pixels 210 of a scan lines 230 are distributed.

In particular embodiments, adjacent pixels 210 on each scan line 230 of a scan pattern 200 may have a substantially constant pixel-spacing angle $\Delta\Theta$. For example, the pixel-spacing angle of a scan pattern 200 may vary across the FOR by less than or equal to 10%, 5%, 2%, 1%, or 0.1%. The pixels 210 in the example of FIG. 7 may have a substantially constant pixel-spacing angle $\Delta\Theta$ of approximately 0.05° with a variation across the FOR of less than 10%. The pixel-spacing angle $\Delta\Theta$ between the pixels 210 of a scan pattern 200 may be determined by (i) the angular scan speed of a scan mirror and (ii) the repetition rate of pulses of light emitted by a light source 110. A scan pattern 200 with a substantially constant pixel-spacing angle may be achieved with (i) a scan mirror that provides a substantially constant angular scan speed and (ii) a light source 110 with a substantially constant pulse repetition frequency. For example, the angular rotation speed of the polygon mirror 301 in FIG. 3 may be substantially constant as the polygon mirror 301 scans the output beam 125 along the $\Theta_x$ axis (which may correspond to the $\Theta_1$ axis in FIG. 7), and the light source 110 may emit pulses of light at a substantially constant pulse repetition frequency. The pixel-spacing angle $\Delta\Theta$ may be determined from the expression $\Delta\Theta=\omega_x/\text{PRF}$, where $\omega_x$ is the angular scan speed of the output beam 125 along the $\Theta_x$ scan axis and PRF is the pulse repetition frequency of the light source 110. For example, the polygon mirror 301 in FIG. 3 may provide an angular scan speed $\omega_x$ of 50,000 degrees per second, and the light source 110 may emit pulses of light with a PRF of 1 MHz, which corresponds to a pixel-spacing angle $\Delta\Theta$ of approximately 0.05°.

In particular embodiments, a scan pattern 200 may have pixels 210 with a non-uniform pixel-spacing angle $\Delta\Theta$ that may be varied across the FOR. A pixel-spacing angle $\Delta\Theta$ may be varied by (i) adjusting the angular rotation speed or angular scan speed of a scan mirror or (ii) changing the PRF of the light source 110. In the example of FIG. 3, the angular rotation speed of the polygon mirror 301 may be substantially constant, and the PRF of the light source 110 may be adjusted to vary the pixel-spacing angle (e.g., doubling the PRF may reduce the pixel-spacing angle by a factor of two). Alternatively, a galvanometer scanner may be used to scan the output beam 125 across the $\Theta_1$ scan axis, and the angular scan speed of the galvanometer scanner may be adjusted to vary the pixel-spacing angle.

In particular embodiments, a scan line 230 may have an incline angle $\delta$ with respect to a $\Theta_1$ axis. The incline angle $\delta$ may have any suitable value, such as for example, approximately 0°, 0.1°, 0.2°, 0.5°, 1°, 2°, 5°, or 10°. A scan pattern 200 with scan lines 230 having an incline angle of approximately zero degrees may correspond to a scan pattern in which the scan lines 230 are oriented substantially along the $\Theta_1$ axis. A nonzero incline angle may result from the output beam 125 being scanned simultaneously along the $\Theta_1$ and $\Theta_2$ axes. The incline angle $\delta$ of a scan line 230 may be directed upward or downward according to the direction the output beam 125 is scanned along the $\Theta_2$ scan axis. If the output beam 125 is scanned (e.g., by scan mirror 302 in FIG. 3) along the $\Theta_2$ scan axis from the bottom of the FOR to the top, then each scan line 230 may be angled upward with respect to the $\Theta_1$ axis. Conversely, if the output beam 125 is scanned along the $\Theta_2$ scan axis from top to bottom, then each scan line 230 may be angled downward with respect to the $\Theta_1$ axis. A scan line 230 with an upward orientation may be referred to as a scan line with a positive incline angle, and another scan line 230 with a downward orientation may be referred to as a scan line with a negative incline angle. In FIG. 7, each scan line 230 is angled downward (with respect to the $\Theta_1$ axis) at an incline angle $\delta$ of approximately 4°, which corresponds to the output beam 125 being scanned along the $\Theta_2$ scan axis from the upper part of the FOR to the lower part. The scan lines 230 in FIG. 7 may be referred to as having a downward incline angle of approximately 4° or an incline angle of approximately −4°. Although the example scan patterns 200 illustrated in FIGS. 13-19 and 22 illustrate scan lines 230 having a horizontal orientation with an incline angle of zero degrees, this disclosure also contemplates some or all of the scan lines 230 in FIGS. 13-19 and 22 as being oriented upward or downward with a nonzero incline angle.

In particular embodiments, an incline angle $\delta$ may depend on the angular scan speeds $\omega_x$ and $\omega_y$ of the output beam 125 along the respective scan axes $\Theta_1$ and $\Theta_2$ and may be expressed as $\delta=\arctan(\omega_y/\omega_x)$. As an example, if the output beam 125 is scanned along scan axis $\Theta_1$ at an angular scan speed $\omega_x$ of 72,000 degrees per second and along scan axis $\Theta_2$ at an angular scan speed $\omega_y$ of 300 degrees per second, then a scan line 230 may have an incline angle $\delta$ of approximately 0.24°. As another example, if $\omega_x$ is 10,000 degrees per second and $\omega_y$ is 350 degrees per second, then a scan line 230 may have an incline angle $\delta$ of approximately 2°. If each of the angular scan speeds $\omega_x$ and $\omega_y$ are approximately constant as the output beam 125 is scanned across the FOR, then the incline angles of each scan line 230 in a scan pattern 200 may be approximately the same. In FIG. 7, each scan line of the scan pattern 200 has approximately the same incline angle, which may indicate that the angular scan speeds $\omega_x$ and $\omega_y$ are each approximately constant. If one or both of the angular scan speeds $\omega_x$ and $\omega_y$ are varied as the output beam 125 is scanned across the FOR, then the scan angles of some of the scan lines of a scan pattern 200 may be different. For example, in FIG. 3, the polygon mirror 301 may be rotated at an approximately fixed rotation speed so that the angular scan speed $\omega_x$ is approximately constant, and the rotation speed of the scan mirror 302 may be varied so that the angular scan speed $\omega_y$ varies correspondingly. A region of the FOR in which the angular scan speed $\omega_y$ is faster may have larger incline angles than another region of the FOR in which the angular scan speed $\omega_y$ is slower. Additionally, the scan-line separation $\Delta\Phi$ may be larger in the region with the faster scan speed than the scan-line separation in the region with the slower scan speed.

In particular embodiments, a lidar system 100 may include: a light source configured to emit pulses of light; a scanner 120 configured to scan the emitted pulses of light along a high-resolution scan pattern 200 located within a FOR of the lidar system 100; and a receiver 140 configured to detect a received pulse of light that includes a portion of one of the emitted pulses of light scattered by a target 130 located a distance D from the lidar system 100. A lidar system 100 that includes a scanner 120 that produces a high-resolution scan pattern 200 may be referred to as a high-resolution lidar system, and the high-resolution scan pattern may include one or more of: interlaced scan lines 230, interlaced pixels 210, and locally retraced scan lines 230. The light source 110 of a high-resolution lidar system 100 may include: a direct-emitter laser diode that emits pulses of light; a laser diode followed by a semiconductor optical amplifier (SOA) that emits pulses of light; a laser diode followed by a fiber-optic amplifier that emits pulses of light; or a laser diode followed by a SOA, which in turn is followed by a fiber-optic amplifier that emits pulses of light. Additionally, the receiver 140 may include an APD 340 that produces a pulse of electrical current in response to a received pulse of light. The received pulse of light may include light from one of the emitted pulses of light that is scattered by a target 130 located a distance D from the lidar system 100. Based on a time at which the received pulse of light is detected by the receiver 140, the receiver 140 may determine a round-trip time for the corresponding emitted pulse of light to travel to the target 130 and back to the lidar system 100. A high-resolution lidar system 100 may also include a processor that determines the distance D from the lidar system 100 to the target 130 based on the round-trip time.

The scanner 120 of a lidar system 100 that produces a high-resolution scan pattern 200 may include one or more scan mirrors configured to (i) scan pulses of light emitted by the light source 110 along a first scan axis ($\Theta_1$ scan axis) to produce multiple scan lines 230 of a high-resolution scan pattern 200 and (ii) distribute the scan lines 230 of the high-resolution scan pattern 200 along a second scan axis ($\Theta_2$ scan axis). For example, a scanner 120 may include a single scan mirror that pivots or rotates about two axes to scan an output beam 125 (that includes the emitted pulses of light) along the first and second scan axes. As another example, the scanner 120 may include two scan mirrors that each pivots or rotates about one axis. The first scan mirror may scan the output beam 125 along the first scan axis to produce the scan lines 230 of the high-resolution scan pattern 200, and the second scan mirror may distribute the scan lines 230 along the second scan axis. The example scanner 120 illustrated in FIG. 3 includes two scan mirrors: polygon mirror 301 and scan mirror 302. The polygon mirror 301 may rotate to scan the output beam 125 along the first scan axis (which corresponds to the $\Theta_x$ axis in FIG. 3) to produce multiple scan lines (e.g., as the polygon mirror 301 rotates, each reflective surface 320 produces one scan line 230), and the scan mirror 302 may pivot to distribute the scan lines 230 along the second scan axis (which corresponds to the $\Theta_y$ axis in FIG. 3). Each scan mirror of a scanner 120 may be mechanically driven by a galvanometer scanner, a synchronous electric motor, a microelectromechanical systems (MEMS) device, a resonant scanner, a voice coil motor, or any other suitable actuator or mechanism.

Each scan line 230 of a high-resolution scan pattern 200 may be oriented substantially parallel to a first scan axis, and the scan lines 230 may be distributed along a second scan axis that is substantially orthogonal to the first scan axis. The first scan axis (which may be referred to as the $\Theta_1$ scan axis) may be oriented along a horizontal direction, a vertical direction, at 45 degrees to a horizontal direction, or along any other suitable direction, and the second scan axis (which may be referred to as the $\Theta_2$ scan axis) may be substantially orthogonal to the first scan axis. For example, the first scan axis may be along a substantially horizontal direction (e.g., within 10° of the horizontal direction), and the scan lines 230 may be distributed along a substantially vertical direction (e.g., within 10° of the vertical direction). Alternatively, the first scan axis may be along a substantially vertical direction, and the scan lines 230 may be distributed along a substantially horizontal direction. The scan lines 230 in FIG. 7 may be referred to as being (i) oriented along a substantially horizontal direction (which corresponds to the $\Theta_1$ scan axis) and (ii) distributed along a substantially vertical direction (which corresponds to the $\Theta_2$ scan axis). Scan lines 230 that are oriented within 10° of a $\Theta_1$ scan axis may be referred to as being oriented substantially along or substantially parallel to the $\Theta_1$ scan axis.

Each scan line 230 of a high-resolution scan pattern 200 may include or may be associated with multiple pixels 210. For a pulsed lidar system, each pixel 210 may correspond to one or more pulses of light emitted by the light source 110 or detected by the receiver 140. In the case of a FMCW lidar system, each pixel 210 may correspond to one or more frequency-modulated optical signals emitted by the light source or detected by the receiver. In the example of FIG. 7, scan line 230C is associated with 16 pixels 210, and each pixel 210 may correspond to a pulse of light emitted by the light source 110 or a corresponding received pulse of light that is detected by the receiver 140. A pixel 210 may refer to a data element that corresponds to an emitted pulse of light or a received pulse of light. A pixel 210 may include (i) distance information (e.g., a distance from the lidar system 100 to a target 130 from which the associated pulse of light was scattered) or (ii) an elevation angle and an azimuth angle associated with the pixel (e.g., the elevation and azimuth angles along which the associated pulse of light was emitted).

A light source 110 of a high-resolution lidar system 100 may be configured to emit an optical signal that includes pulses of light or frequency-modulated light. For example, a pulsed lidar system may include a light source that emits pulses of light, and a frequency-modulated continuous-wave (FMCW) lidar system may include a light source that emits frequency-modulated optical signals. Although this disclosure describes and illustrates pulsed lidar systems that operate with high-resolution scan patterns, this disclosure also contemplates FMCW lidar systems that operate with high-resolution scan patterns. For example, a high-resolution lidar system described and illustrated herein may be a FMCW lidar system that includes a light source 110 that emits frequency-modulated optical signals. A FMCW lidar system may include a scanner that scans the frequency-modulated optical signals along a high-resolution scan pattern that includes one or more of: interlaced scan lines 230, interlaced pixels 210, and locally retraced scan lines 230.

In particular embodiments, a high-resolution scan pattern 200 produced by a scanner 120 of a lidar system 100 may include one or more of: interlaced scan lines 230, interlaced pixels 210, and locally retraced scan lines 230. A scan pattern 200 that includes interlaced scan lines 230, interlaced pixels 210, or locally retraced scan lines 230 may be referred to as a high-resolution scan pattern 200. A lidar system 100 may operate with a high-resolution scan pattern 200 that includes interlaced scan lines 230, interlaced pixels 210, or locally retraced scan lines 230. For example, a lidar system 100 may operate with a high-resolution scan pattern 200 that includes one of the following: interlaced scan lines 230, interlaced pixels 210, and locally retraced scan lines 230. As another example, a lidar system 100 may operate with a high-resolution scan pattern 200 that includes both interlaced scan lines 230 and interlaced pixels 210. The lidar system 100 may employ interlaced scan lines and interlaced pixels at the same time while scanning a FOR, or the lidar system 100 may alternate between the two high-resolution scanning techniques (e.g., one scan of the FOR may employ interlaced scan lines and a subsequent scan may employ interlaced pixels). As another example, a lidar system 100 may operate with a high-resolution scan pattern 200 that includes locally retraced scan lines 230 along with interlaced scan lines 230 or interlaced pixels 210. As another example, a lidar system 100 may operate with a high-resolution scan pattern 200 that includes interlaced scan lines 230, interlaced pixels 210, and locally retraced scan lines 230. For a lidar system 100 that operates with two or more of interlaced scan lines 230, interlaced pixels 210, and locally retraced scan lines 230, the lidar system 100 may employ the two or more high-resolution scanning techniques at the same time while scanning a FOR, or the lidar system may alternate between the high-resolution scanning techniques.

Figure 8:
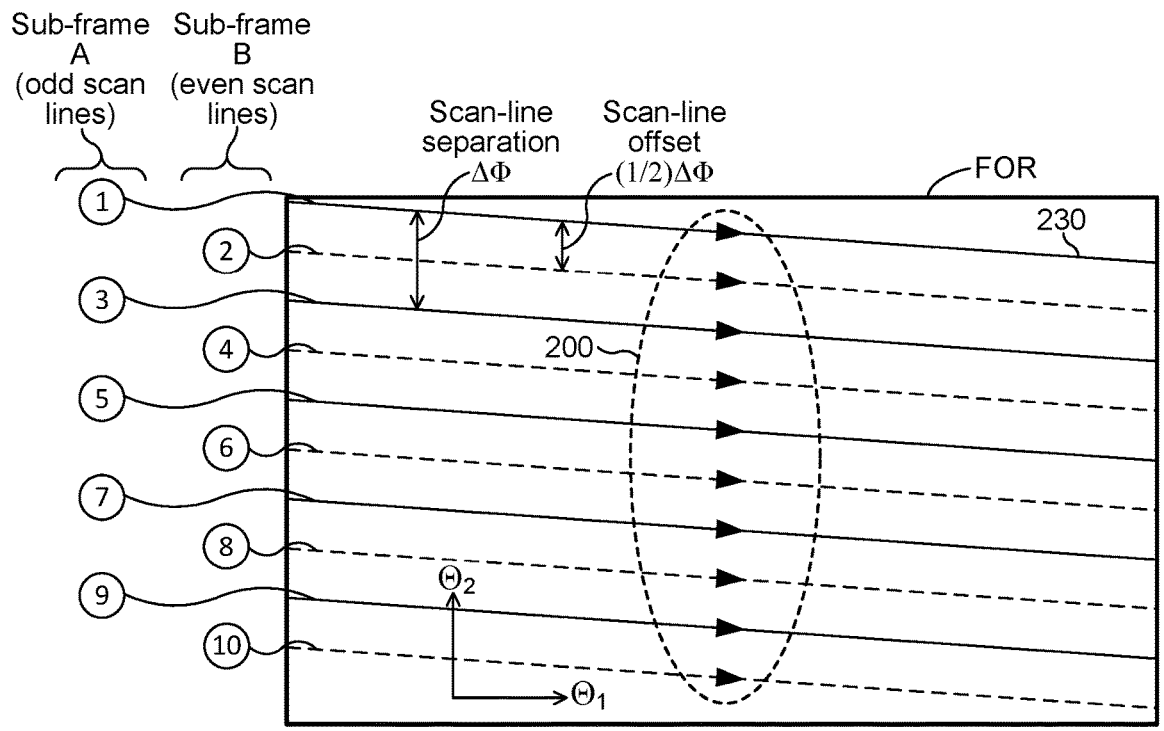
FIG. 8 illustrates an example scan pattern with interlaced scan lines.

FIG. 8 illustrates an example scan pattern 200 with interlaced scan lines 230. In particular embodiments, a high-resolution scan pattern 200 may include interlaced scan lines with two-fold interlacing. For a high-resolution scan pattern 200 with two-fold interlaced scan lines 230, the scan pattern may include two sets of scan lines, which may be referred to as a set of even scan lines and a set of odd scan lines. The even scan lines may be scanned after the odd scan lines are scanned, or vice versa. The even and odd scan lines are interlaced so that: (i) each pair of adjacent even scan lines is separated by one of the odd scan lines and (ii) each pair of adjacent odd scan lines is separated by one of the even scan lines.

The scan lines 230 in the example scan pattern 200 in FIG. 8 are two-fold interlaced. The full scan pattern 200 includes 10 scan lines (which are labeled from 1 to 10 to the left of the FOR in FIG. 8), and the scan pattern 200 is divided into two sub-frames. Sub-frame A includes the five odd scan lines labeled 1, 3, 5, 7, and 9, and sub-frame B includes the five even scan lines labeled 2, 4, 6, 8, and 10. In FIG. 8, each pair of adjacent even scan lines is separated by one of the odd scan lines, and each pair of adjacent odd scan lines is separated by one of the even scan lines. For example, scan lines 2 and 4 in FIG. 8 are adjacent even scan lines that are separated by odd scan line 3 (e.g., scan line 3 is located between scan lines 2 and 4). Similarly, scan lines 1 and 3 are adjacent odd scan lines that are separated by even scan line 2. The scan-line separation angle between adjacent odd scan lines is $\Delta\Phi$, and adjacent even scan lines may have approximately the same scan-line separation angle $\Delta\Phi$. An intervening even scan line located between two adjacent odd scan lines may be located halfway between the odd scan lines with a scan-line offset angle of approximately $\Delta\Phi/2$. Similarly, an intervening odd scan line located between two adjacent even scan lines may be located halfway between the even scan lines with approximately the same scan-line offset angle of $\Delta\Phi/2$.

Figure 9:
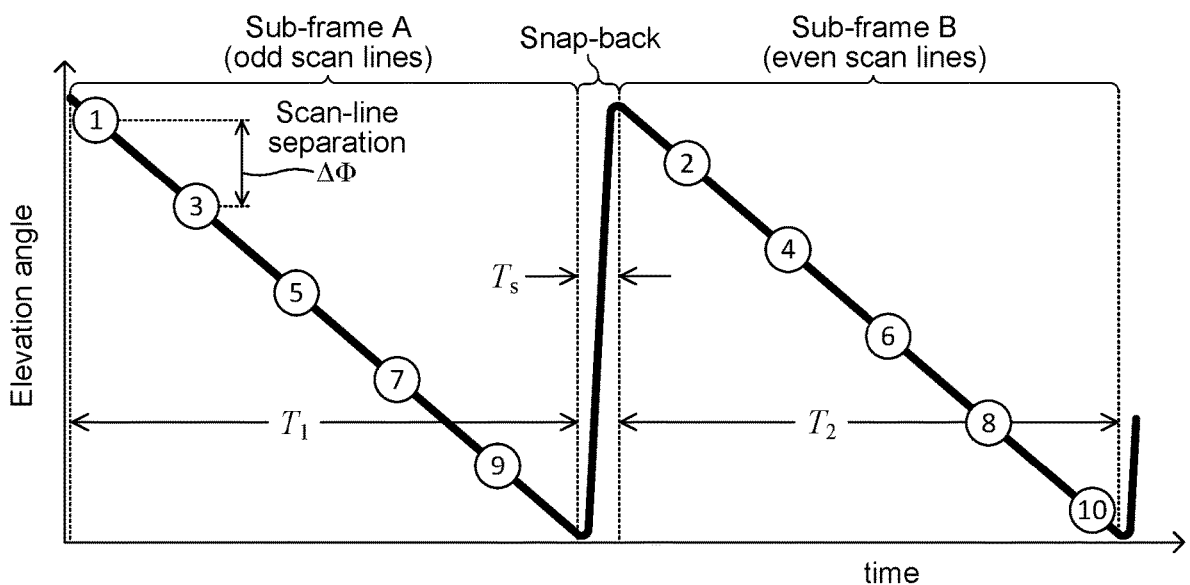
FIG. 9 illustrates an example graph of elevation angle versus time for the interlaced scan pattern of FIG. 8.

FIG. 9 illustrates an example graph of elevation angle versus time for the interlaced scan pattern of FIG. 8. The elevation angle may represent an angle of a scan mirror or an angle of an output beam 125. For example, the elevation angle in FIG. 9 may represent the angle of scan mirror 302 in FIG. 3 as the scan mirror pivots about the $\Theta_y$ scan axis while scanning across the scan pattern 200 in FIG. 8. Additionally or alternatively, the elevation angle in FIG. 9 may represent an elevation angle of the output beam 125 along the $\Theta_2$ scan axis as the output beam 125 is scanned across the scan pattern 200 in FIG. 8. The order in which the scan lines in FIGS. 8 and 9 are scanned is as follows: 1, 3, 5, 7, 9 (for the scan of sub-frame A) followed by 2, 4, 6, 8, 10 (for the scan of sub-frame B). As illustrated in FIG. 9, the lidar system 100 first scans the odd scan lines, executes a snap-back, and then scans the even scan lines.

A snap-back may refer to a rapid motion of a scan mirror that moves the output beam 125 from the end of one sub-frame or frame to the beginning of the next sub-frame or frame. For example, scan mirror 302 in FIG. 3 may scan sub-frame A in FIGS. 8 and 9 by scanning the output beam 125 from an elevation angle of +15° to an elevation angle of −15° over a time interval $T_1$. The scan mirror 302 may then rapidly move back, or "snap-back," from the −15° position to the +15° position over a time interval $T_s$ that is short relative to the forward-scan time $T_1$. For example, $T_s$ may be less than 20%, 10%, 5%, 2%, 1%, or 0.1% of $T_1$. As another example, the forward scan time $T_1$ may be approximately 40 ms, and the snap-back time $T_s$ may be approximately 2 ms. After the snap-back, the scan mirror 302 may scan sub-frame B over a time interval $T_2$, where the forward scan times $T_1$ and $T_2$ may be approximately equal.

A sub-frame may refer to a particular set of scan lines, and two or more sub-frames that are captured in a particular sequence may correspond to a frame or a scan. A scan of a sub-frame may be referred to as a sub-scan. Each sub-frame of a scan may include approximately the same number of scan lines. A sub-frame may include any suitable number of scan lines (e.g., 2, 4, 6, 10, 20, 50, or 100 scan lines), and a frame may include any suitable number of sub-frames (e.g., 2, 3, 4, 6, 8, 10, or 20 sub-frames). For example, a frame may include eight sub-frames captured in succession, and each sub-frame may include approximately 12 scan lines (for a total of approximately 96 scan lines in the frame). As another example, a frame may include four sub-frames, and each sub-frame may include approximately 16 scan lines (for a total of approximately 64 scan lines in the frame). Sub-frames A and B in FIGS. 8 and 9 each includes a particular set of scan lines, and the combination of sub-frames A and B may be referred to as a frame or a scan. After scanning one frame (which includes a scan of sub-frame A followed by a scan of sub-frame B), the lidar system may continue to scan subsequent frames. For example, after scanning along scan line 10 in FIGS. 8 and 9, the scanner may execute a snap-back, and the lidar system may perform another scan that includes scanning sub-frame A followed by sub-frame B.

Figure 10:
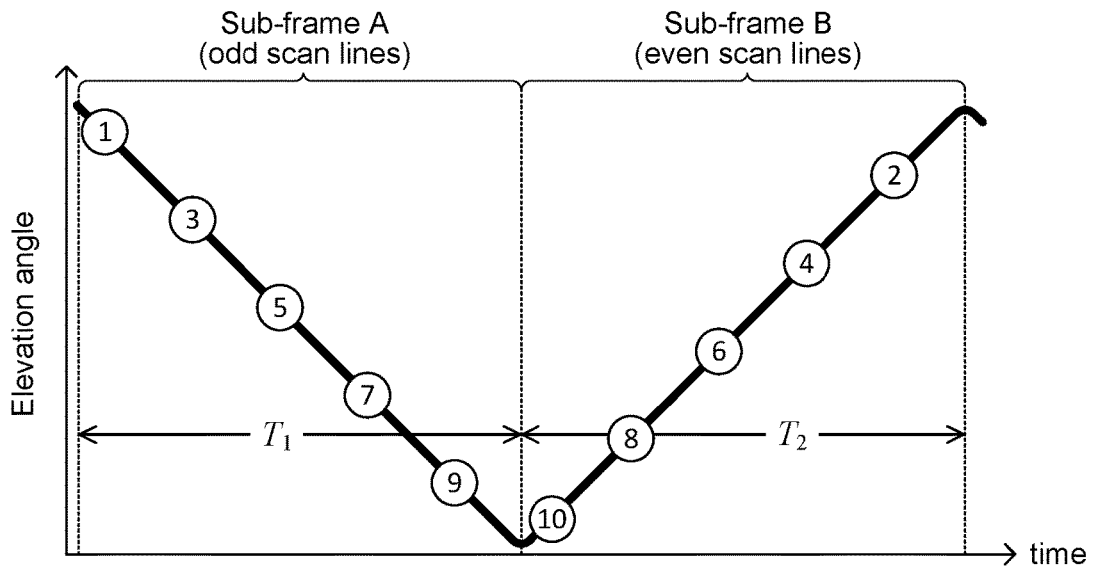
FIG. 10 illustrates an example graph of elevation angle versus time for a V-scan.

FIG. 10 illustrates an example graph of elevation angle versus time for a V-scan. In particular embodiments, a high-resolution scan pattern 200 may include interlaced scan lines that are interlaced using a V-scan. A V-scan may include (i) a first set or sub-frame of scan lines distributed along the $\Theta_2$ scan axis in a first direction and (ii) a second set or sub-frame of scan lines distributed along the $\Theta_2$ scan axis in a second direction opposite the first direction, where the second set of scan lines is distributed after the first set of scan lines. In FIG. 10, the odd scan lines of sub-frame A are distributed from top to bottom (which may be referred to as a forward or $-\Theta_2$ scan direction), and then the even scan lines of sub-frame B are distributed in the opposite direction, from bottom to top (which may be referred to as a reverse or $+\Theta_2$ scan direction). Since the scan lines of a V-scan may be distributed in both the forward and reverse directions, a V-scan may not include a snap-back. The order in which the scan lines in FIG. 10 are scanned is as follows: 1, 3, 5, 7, 9 (for the forward scan of sub-frame A) followed by 10, 8, 6, 4, 2 (for the reverse scan of sub-frame B). The time interval $T_1$ of the forward scan of sub-frame A may be approximately equal to the time interval $T_2$ of the reverse scan of sub-frame B.

Figure 11:
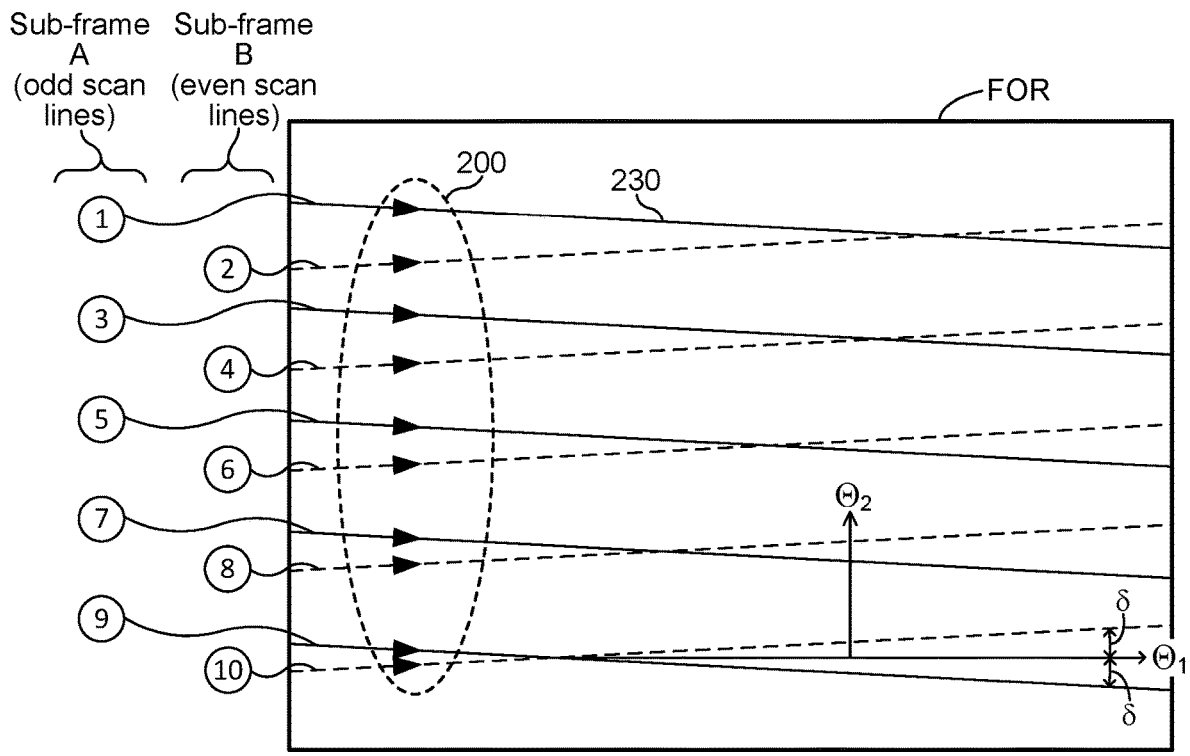
FIG. 11 illustrates an example scan pattern corresponding to the graph of FIG. 10, in which scan lines are interlaced using a V-scan.

FIG. 11 illustrates an example scan pattern 200 corresponding to the graph of FIG. 10, in which scan lines are interlaced using a V-scan. Each of the odd scan lines of sub-frame A has a negative incline angle $-\delta$, and each of the even scan lines of sub-frame B has a positive incline angle $+\delta$. In a V-scan with a relatively small incline angle, the odd scan lines and even scan lines may not cross one another. A V-scan in which the odd scan lines do not cross the even scan lines may have the scan lines interlaced so that: (i) each pair of adjacent even scan lines is separated by one of the odd scan lines and (ii) each pair of adjacent odd scan lines is separated by one of the even scan lines. In the example of FIG. 11, the incline angle is large enough that the some of the odd scan lines cross some of the even scan lines. For example, scan lines 1 and 2 cross one another towards the right side of the FOR, and scan lines 9 and 10 cross one another towards the left side of the FOR. A V-scan in which some of the odd scan lines cross some of the even scan lines may have the scan lines interlaced so that: (i) each pair of adjacent even scan lines is separated by one or more portions of one or more of the odd scan lines and (ii) each pair of adjacent odd scan lines is separated by one or more portions of one or more of the even scan lines. In FIG. 11, the even scan lines 2 and 4 are separated by a portion of odd scan line 3 and a portion of odd scan line 1. Similarly, the odd scan lines 1 and 3 are separated by a portion of even scan line 2 and even scan line 4.

Figure 12:
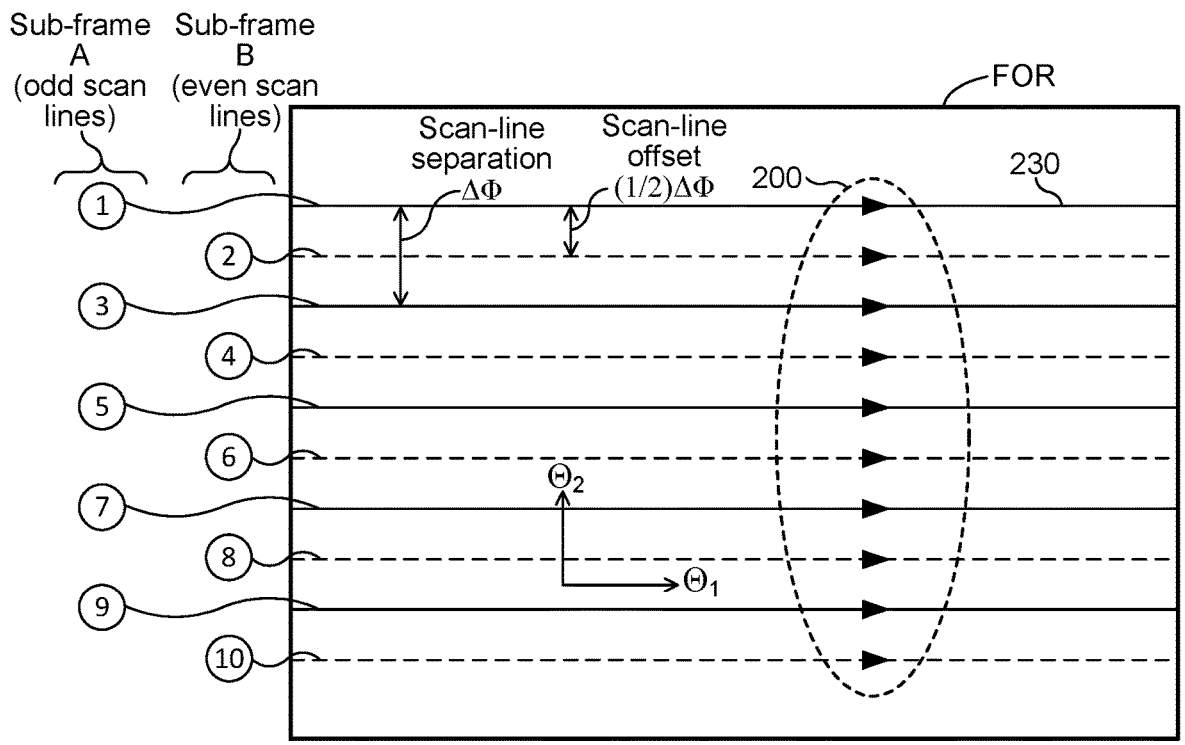
FIG. 12 illustrates an example scan pattern with two-fold interlaced scan lines.

FIG. 12 illustrates an example scan pattern 200 with two-fold interlaced scan lines 230. In particular embodiments, a high-resolution scan pattern 200 may include interlaced scan lines 230 with N-fold interlacing, where (i) the scan lines include N sets of scan lines (where N is a positive integer greater than or equal to 2) and (ii) the N sets of scan lines are scanned in sequence from a first set of scan lines to a N-th set of scan lines. Each of the N sets of scan lines may correspond to a particular sub-frame of a high-resolution scan pattern 200, and the scan pattern may include 2, 3, 4, 6, 8, 10, 20, or any other suitable number of sets of scan lines. The scan lines of a N-fold interlaced scan pattern may be interlaced such that each pair of adjacent scan lines from the first set of scan lines has (N−1) other scan lines located between the pair of scan lines, and the (N−1) other scan lines may include one scan line from each of the N sets of scan lines, excluding the first set of scan lines. Additionally, a N-fold interlaced scan pattern may further be interlaced so that any pair of adjacent scan lines from one of the sets has one scan line from each of the other (N−1) sets located in between.

The example high-resolution scan pattern 200 in FIG. 12 includes two sets of scan lines: sub-frame A (which includes the odd-numbered scan lines) and sub-frame B (which includes the even-numbered scan lines). Each pair of adjacent scan lines from sub-frame A has one of the scan lines from sub-frame B located in between the pair. Similarly, each pair of adjacent scan lines from sub-frame B has one of the scan lines from sub-frame A located in between. For the high-resolution scan pattern 200 in FIG. 12, the value of N is 2, and the scan pattern may be referred to as being two-fold interlaced. As another example, a four-fold interlaced scan pattern may include first, second, third, and fourth sets of scan lines. Each pair of adjacent scan lines from the first set of scan lines may have three scan lines located in between: one scan line from the second set, one scan line from the third set, and one scan line from the fourth set. Additionally, the four-fold interlaced scan pattern may further be interlaced so that any pair of adjacent scan lines from one set has one scan line from each of the other three sets located in between. For example, each pair of adjacent scan lines from the second set may have three scan lines located in between: one scan line from the first set, one scan line from the third set, and one scan line from the fourth set.

Figure 13:
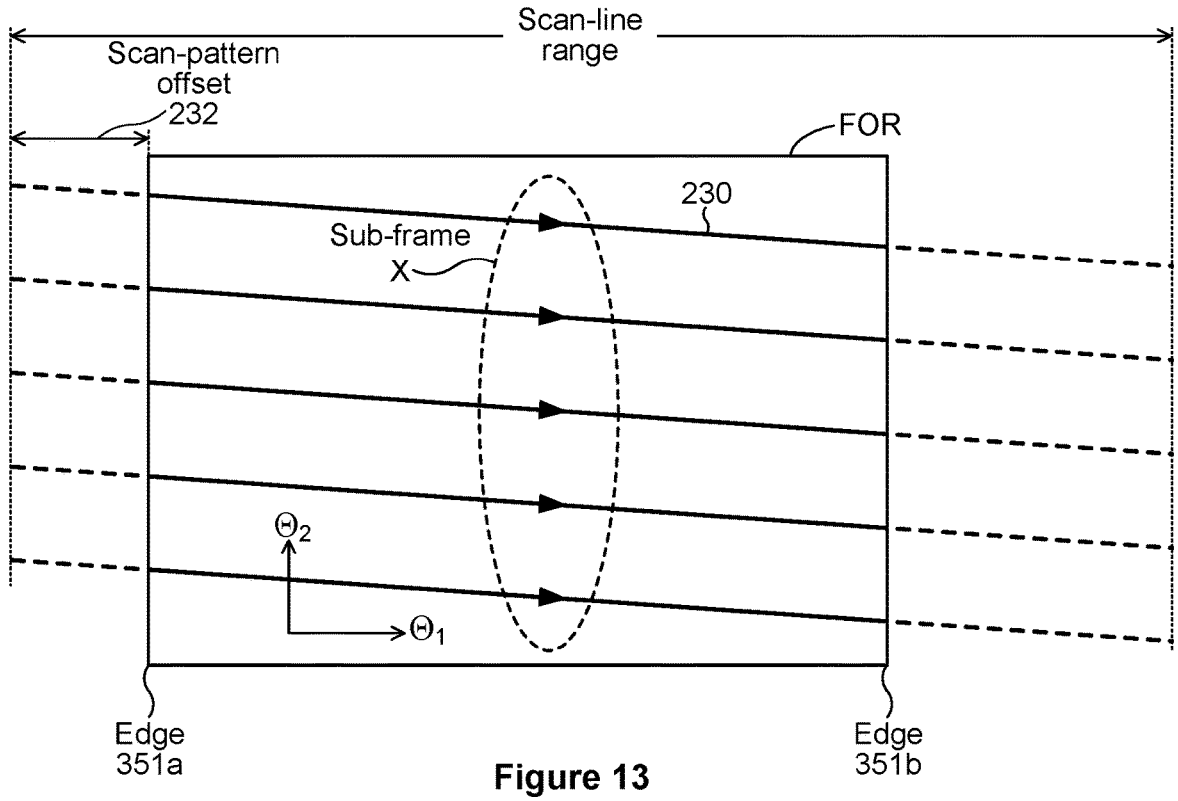
FIG. 13 illustrates an example scan pattern in which a scan-pattern offset is applied to a set of scan lines (sub-frame X).

FIG. 13 illustrates an example scan pattern 200 in which a scan-pattern offset 232 is applied to a set of scan lines (sub-frame X). The set of scan lines of sub-frame X may be one of N sets of interlaced scan lines. In particular embodiments, for a high-resolution scan pattern with N-fold interlaced scan lines, the scan lines may be distributed along the second scan axis (the $\Theta_2$ scan axis) by applying one of N different temporal offsets to each of the N sets of scan lines. In FIG. 13, the left edge 351*a* of the FOR corresponds to the edge 351*a* of the window 350 in FIG. 3, and the right edge 351*b* of the FOR corresponds to the edge 351*b* of the window 350 in FIG. 3. Each scan line may have a scan-line range that extends beyond the edges 351*a* and 351*b* of the FOR (as indicated by the dashed-line portions of each scan line in FIG. 13), and a temporal scan-pattern offset 232 applied to a set of scan lines may have the effect of shifting the scan lines in FIG. 13 left or right along the $\Theta_1$ axis. In FIG. 13, increasing the temporal scan-pattern offset 232 shifts the scan lines to the left, and decreasing the temporal scan-pattern offset 232 shifts the scan lines to the right. Since the scan lines in FIG. 13 have a negative incline angle, shifting the scan lines to the left causes a downward shift of the scan lines along the $\Theta_2$ scan axis, and shifting the scan lines to the right causes an upward shift of the scan lines. The distribution of a set of scan lines along the $\Theta_2$ scan axis may be adjusted by applying a particular temporal scan-pattern offset 232 to the set of scan lines which may result in a corresponding particular shift along the $\Theta_2$ scan axis. For a scan pattern with N-fold interlaced scan lines, a different temporal offset 232 may be applied to each of the N sets of scan lines so that each set of scan lines has a different starting point along the $\Theta_2$ scan axis. The different starting point along the $\Theta_2$ scan axis applied to each set of scan lines may result in the N sets of scan lines being interlaced. A temporal scan-pattern offset 232 may be applied to a set of scan lines by (i) applying a different duration of snap-back time $T_s$ between each set of scan lines or (iii) applying a different duration for each sub-scan (e.g., times $T_1$ and $T_2$ in FIG. 9 may have different values). For example, a four-fold interlaced scan pattern may apply three different snap-back times between the four sets of scan lines (e.g., 2 ms, 4 ms, and 6 ms).

In particular embodiments, for a high-resolution scan pattern with N-fold interlaced scan lines, the scan lines may be distributed along the second scan axis (the $\Theta_2$ scan axis) by applying one of N different angular offsets along the second scan axis to each of the N sets of scan lines. For example, a particular angular offset may be applied by a scan mirror that scans along the $\Theta_2$ scan axis. For each of the N sets of scan lines, a different angular offset may be applied at the beginning of each sub-scan, resulting in a different sub-scan starting point along the $\Theta_2$ scan axis. In the example of FIG. 3, the scan mirror 302 may begin each sub-scan of one of the N sets of scan lines with a different angular offset or starting point. For example, the scan pattern 200 in FIG. 12 may be produced by (i) applying an angular offset of 0° to the scan lines of sub-frame A and (ii) applying an angular offset of 0.5° to the scan lines of sub-frame B. The scan-line offset angle $\Delta\Phi/2$ in FIG. 12 may correspond to the 0.5-degree angular offset applied to the scan lines of sub-frame B. As another example, for a four-fold interlaced scan pattern that includes four sets of scan lines with a scan-line separation $\Delta\Phi$ of 1°, the four sets of scan lines may be interlaced by applying a respective angular offset to each set of scan lines of 0°, 0.25°, 0.5°, or 0.75°.

Figure 14:
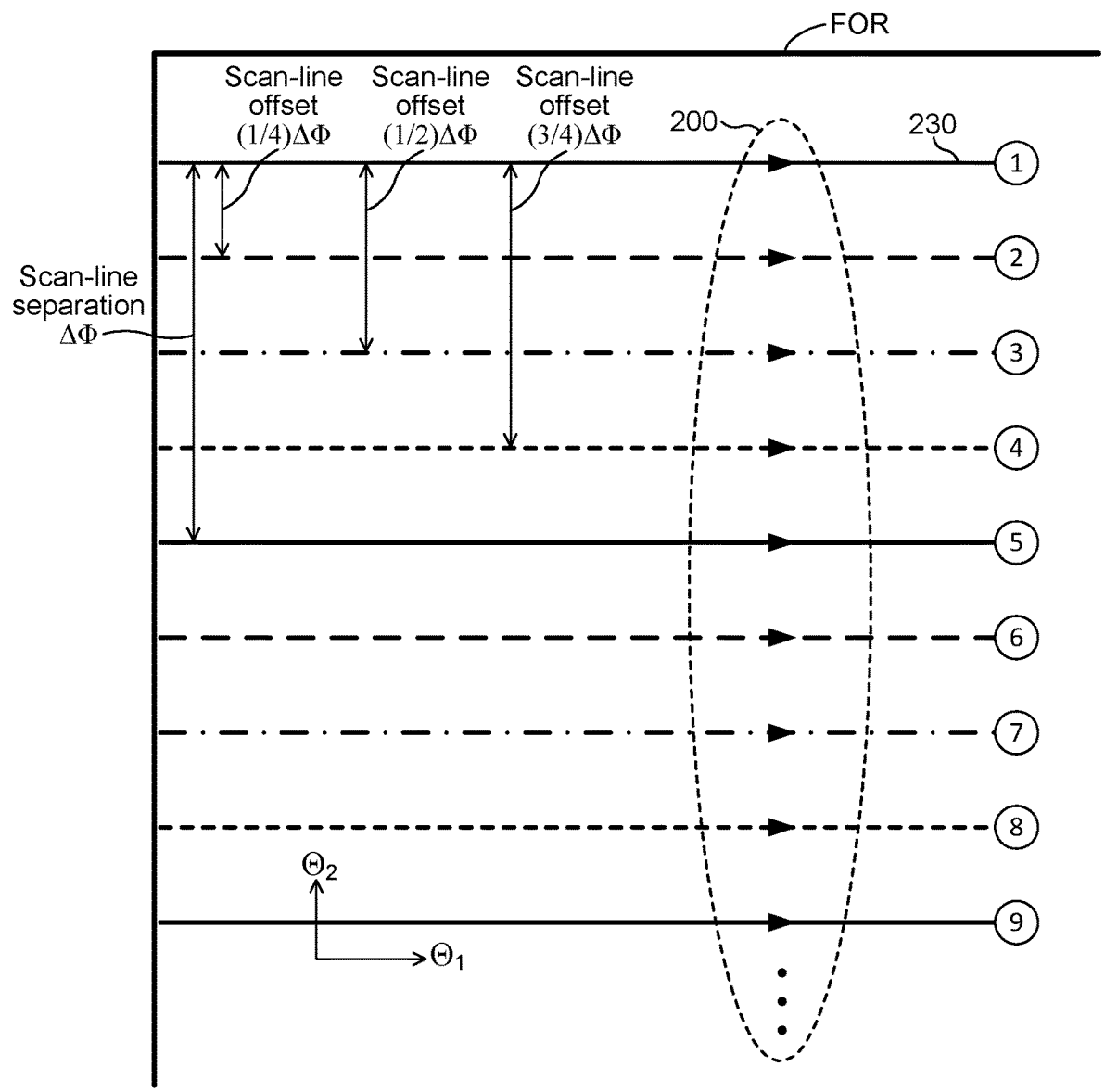
FIG. 14 illustrates an example scan pattern with four-fold interlaced scan lines.

FIG. 14 illustrates an example scan pattern 200 with four-fold interlaced scan lines 230. In particular embodiments, a high-resolution scan pattern 200 may include interlaced scan lines 230 with N-fold interlacing, where (i) the scan lines include N sets of scan lines (where N is a positive integer greater than or equal to 2) and (ii) the N sets of scan lines are scanned in sequence from a first set of scan lines to a N-th set of scan lines. In FIG. 14, N is equal to 4 so that the scan pattern 200 includes four sets of scan lines that may be grouped as follows: the first set includes scan lines 1, 5, and 9; the second set includes scan lines 2 and 6; the third set includes scan lines 3 and 7; and the fourth set includes scan lines 4 and 8. The scan pattern 200 in FIG. 14 may include additional scan lines not illustrated in FIG. 14, as indicated by the ellipsis mark. The scan lines of the four-fold interlaced scan pattern are interlaced such that each pair of adjacent scan lines from the first set of scan lines has three other scan lines located between the pair, where the three other scan lines include one scan line from each of the other three sets of scan lines. For example, scan lines 1 and 5 are an adjacent pair of scan lines from the first set, and scan lines 2, 3, and 4 (from the second, third, and fourth set of scan lines, respectively) are located between scan lines 1 and 5. Similarly, scan lines 5 and 9 are an adjacent pair of scan lines from the first set, and scan lines 6, 7, and 8 (from the second, third, and fourth set of scan lines, respectively) are located between scan lines 5 and 9. Additionally, the four-fold interlaced scan pattern in FIG. 14 is further interlaced so that any pair of adjacent scan lines from one of the sets has one scan line from each of the other three sets located in between. For example, scan lines 4 and 8 are an adjacent pair of scan lines from the fourth set of scan lines, and scan lines 5, 6, and 7 (from the first, second, and third set of scan lines, respectively) are located between scan lines 4 and 8.

Figure 15:
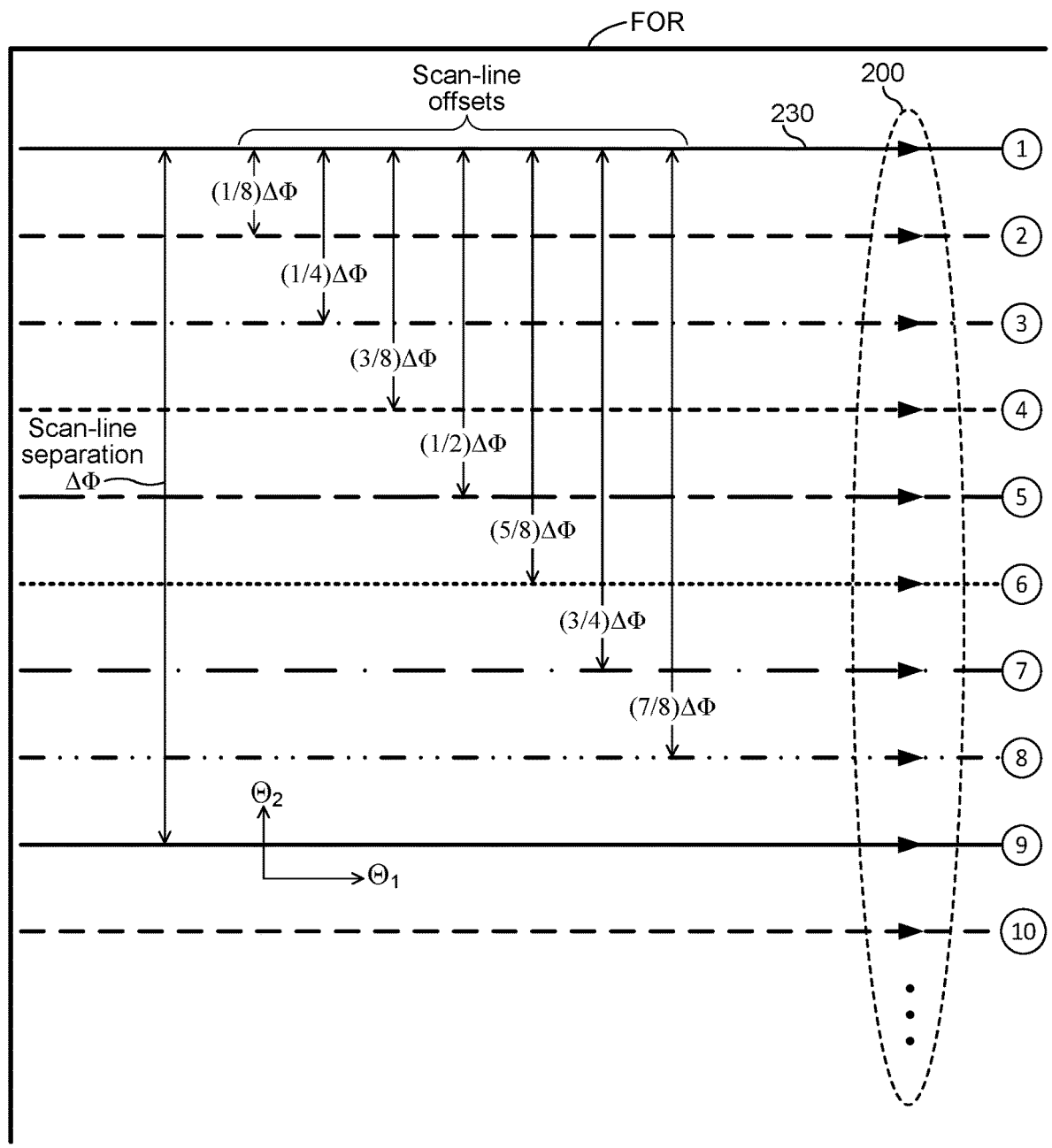
FIG. 15 illustrates an example scan pattern with eight-fold interlaced scan lines.

FIG. 15 illustrates an example scan pattern 200 with eight-fold interlaced scan lines 230. The high-resolution scan pattern in FIG. 15 includes interlaced scan lines 230 with N-fold interlacing where the value of N is 8. The eight sets of scan lines may be grouped as follows: the first set includes scan lines 1 and 9; the second set includes scan lines 2 and 10; the third set includes scan line 3; the fourth set includes scan line 4; the fifth set includes scan line 5; the sixth set includes scan line 6; the seventh set includes scan line 7; and the eighth set includes scan line 8. The scan pattern 200 in FIG. 15 may include additional scan lines not illustrated in FIG. 15, as indicated by the ellipsis mark. The scan lines of the eight-fold interlaced scan pattern are interlaced such that each pair of adjacent scan lines from the first set of scan lines has seven other scan lines located between the pair, where the seven other scan lines include one scan line from each of the other seven sets of scan lines. For example, scan lines 1 and 9 are an adjacent pair of scan lines from the first set, and seven scan lines 2, 3, 4, 5, 6, 7, and 8 (from the second through eighth set of scan lines, respectively) are located between scan lines 1 and 9. Additionally, the eight-fold interlaced scan pattern in FIG. 15 may be further interlaced so that any pair of adjacent scan lines from one of the sets has one scan line from each of the other seven sets located in between. For example, scan lines 2 and 10 are an adjacent pair of scan lines from the second set of scan lines, and scan lines 3, 4, 5, 6, 7, 8, and 9 (from the third, fourth, fifth, sixth, seventh, eighth, and first set of scan lines, respectively) are located between scan lines 2 and 10.

The N sets of scan lines of a N-fold interlaced scan pattern may be scanned in any suitable sequence. As used herein, scanning N sets of scan lines in sequence from a first set of scan lines to a N-th set of scan lines does not necessarily imply any particular spatial or numeric order in which the N sets of scan lines are scanned. For example, the N sets of scan lines may be scanned sequentially where one set follows another in a sequence that follows a spatial ordering of the first scan lines of each set with respect to the $\Theta_2$ scan axis. In FIG. 14, the four sets of scan lines may be scanned sequentially as follows: first set, second set, third set, fourth set, which corresponds to the spatial order in which the first scan lines of each set (scan lines 1, 2, 3, and 4) are arranged along the $\Theta_2$ scan axis. As another example, the four sets of scan lines may be scanned in a reverse-sequential order as follows: fourth set, third set, second set, first set. In FIG. 15, the eight sets of scan lines may be scanned sequentially as follows: first set, second set, third set, fourth set, fifth set, sixth set, seventh set, eighth set. As another example, the N sets of scan lines may be scanned in a non-sequential order in which the sets are scanned out of sequence with respect to the spatial ordering of the first scan lines of each set. In FIG. 14, the four sets of scan lines may be scanned non-sequentially as follows: first set, third set, second set, fourth set. Another example of a non-sequential scan order for FIG. 14 is as follows: third set, first set, fourth set, second set. In FIG. 15, the eight sets of scan lines may be scanned non-sequentially as follows: first set, sixth set, third set, eighth set, fifth set, second set, seventh set, fourth set. Another example of a non-sequential scan order for FIG. 15 is as follows: fifth set, first set, eighth set, third set, sixth set, second set, seventh set, fourth set.

In the case in which N sets of scan lines are scanned in a non-sequential order, the sets of scan lines may be labeled from 1 to N according to the spatial ordering of the first scan lines of each set (e.g., in FIG. 14 the four sets of scan lines may be labeled from 1 to 4 according to the spatial ordering respect to the $\Theta_2$ scan axis of the corresponding scan lines 1 to 4), and the N sets of scan lines may be scanned in a non-sequential order (e.g., first set, third set, second set, fourth set). Alternatively, the N sets of scan lines may be labeled in a non-sequential order, and the N sets of scan lines may be scanned in a numerical order as labeled. For example, instead of labeling the four sets of scan lines in spatial-order sequence in FIG. 14, the scan-line sets may be labeled as follows: first set (includes scan lines 3, 7), second set (includes scan lines 1, 5, 9), third set (includes scan lines 4, 8), fourth set (includes scan lines 2, 6). Then, the four sets of scan lines may be scanned in numerical order as labeled (first set, second set, third set, fourth set), resulting in the four sets of scan lines being scanned out of sequence with respect to the spatial order of the first scan lines of each set.

In particular embodiments, a high-resolution scan pattern 200 may include N sets of interlaced scan lines 230 with N-fold interlacing. The first set of scan lines may include an adjacent pair of scan lines (a first scan line and a subsequent scan line) that are separated by a scan-line separation angle $\Delta\Phi$ along the second scan axis (the $\Theta_2$ scan axis), and (N−1) other scan lines may be located between the adjacent pair of scan lines, where the (N−1) other scan lines include one scan line from each of the N sets of scan lines, excluding the first set of scan lines. The scan lines may be interlaced such that a k-th scan line of the (N−1) other scan lines is offset from the first scan line along the second scan axis by an angular amount [((k−1)×n/N) mod 1]×ΔΦ, where k is an integer that is incremented from 2 to N, n is a fixed integer from 1 to (N−1), the k-th scan line is part of a k-th set of scan lines, and the k-th set of scan lines is scanned after the (k−1)-th set of scan lines. The parameter k corresponds to each of the (N−1) other scan lines as well as each of the (N−1) other sets of scan lines that excludes the first set of scan lines. The scan pattern is scanned in order from the first set of scan lines to the N-th set of scan lines, and the parameter k is incremented as each of the (N−1) other sets of scan lines is scanned after the first set of scan lines. The angular offset of each set of the (N−1) other sets of scan lines with respect to the first set of scan lines is determined by the expression [((k−1)×n/N) mod 1]×ΔΦ, where "mod" represents the modulo operation that returns the remainder when ((k−1)×n/N) is divided by 1 (e.g., [(9/4) mod 1]×ΔΦ evaluates to (1/4)ΔΦ).

As an example, in the four-fold interlaced scan pattern of FIG. 14, N is 4, k is incremented from 2 to 4, and the fixed parameter n may be set to 1. In this case, as the parameter k is incremented to the values 2, 3, and 4, the angular scan-line offsets progress through the following values: (1/4)ΔΦ (for k=2), (1/2)ΔΦ (for k=3), and (3/4)ΔΦ (for k=4). Setting the fixed parameter n to 1 corresponds to the four sets of scan lines being scanned sequentially. After the first set of scan lines (scan lines 1, 5, and 9) is scanned, the second set of scan lines (scan lines 2 and 6) is scanned with an angular offset (with respect to the first set of scan lines) of (1/4)ΔΦ. Then, the third set of scan lines (scan lines 3 and 7) is scanned with an angular offset of (1/2)ΔΦ. Finally, the fourth set of scan lines (scan lines 4 and 8) is scanned with an angular offset of (3/4)ΔΦ.

As another example, in FIG. 14, the fixed parameter n may be set to 3, which corresponds to the four sets of scan lines being scanned in a non-sequential order. In this case, as the parameter k is incremented to the values 2, 3, and 4, the angular scan-line offsets progress through the following values: (3/4)ΔΦ (for k=2), (1/2)ΔΦ (for k=3), and (1/4)ΔΦ (for k=4). After the first set of scan lines (scan lines 1, 5, and 9) is scanned, scan lines 4 and 8 (which, in this example, may be referred to as the second set of scan lines) are scanned with an angular offset of (3/4)ΔΦ. Then, scan lines 3 and 7 (which may be referred to as the third set of scan lines) are scanned with an angular offset of (1/2)ΔΦ. Finally, scan lines 2 and 6 (which may be referred to as the fourth set of scan lines) are scanned with an angular offset of (1/4)ΔΦ.

As another example, in the eight-fold interlaced scan pattern of FIG. 15, N is 8, k is incremented from 2 to 8, and the fixed parameter n may be set to 1. In this case, as the parameter k is incremented from 2 to 8, the angular scan-line offsets progress through the following values: (1/8)ΔΦ (for k=2), (1/4)ΔΦ (for k =3), (3/8)ΔΦ (for k=4), (1/2)ΔΦ (for k=5), (5/8)ΔΦ (for k=6), (3/4)ΔΦ (for k=7), and (7/8)ΔΦ (for k=8). Setting the fixed parameter n to 1 corresponds to the eight sets of scan lines being scanned sequentially. After the first set of scan lines (scan lines 1 and 9) is scanned, the second set of scan lines (scan lines 2 and 8) is scanned with an angular offset with respect to the first set of scan lines of (1/8)ΔΦ. Thereafter, the third through eighth sets of scan lines are scanned in sequence with respective angular offsets with respect to the first set of scan lines of (1/4)ΔΦ, (3/8)ΔΦ, (1/2)ΔΦ, (5/8)ΔΦ, (3/4)ΔΦ, and (7/8)ΔΦ.

As another example, in FIG. 15, the fixed parameter n may be set to 5, which corresponds to the eight sets of scan lines being scanned in a non-sequential order. In this case, as the parameter k is incremented from 2 to 8, the angular scan-line offsets progress through the following values: (5/8)ΔΦ (for k=2), (1/4)ΔΦ (for k=3), (7/8)ΔΦ (for k=4), (1/2)ΔΦ (for k=5), (1/8)ΔΦ (for k=6), (3/4)ΔΦ (for k=7), and (3/8)ΔΦ (for k=8). The first set of scan lines includes scan lines 1 and 9 (which correspond to an adjacent pair of scan lines from the first set), and seven other scan lines are located between scan lines 1 and 9. After the first set of scan lines is scanned, scan line 6 (which may be referred to as being part of the second set of scan lines) is scanned with an angular offset of (5/8)ΔΦ with respect to scan line 1. Thereafter, the following scan lines (along with their associated scan-line offsets) are scanned in the following sequence as part of the third through eighth respective sets of scan lines: scan line 3 (with a (1/4)ΔΦ angular offset), scan line 8 (with a (7/8)ΔΦ angular offset), scan line 5 (with a (1/2)ΔΦ angular offset), scan line 2 (with a (1/8)ΔΦ angular offset), scan line 7 (with a (3/4)ΔΦ angular offset), and scan line 4 (with a (3/8)ΔΦ angular offset).

The values of the scan-line offsets in FIGS. 8, 12, 14, and 15 may be expressed as (q/N)ΔΦ, where q is an integer from 1 to (N−1). This expression produces scan lines that are evenly spaced apart. For example, in FIG. 14, the scan-line offsets are (1/4)ΔΦ, (1/2)ΔΦ, and (3/4)ΔΦ, which produces scan lines that are uniformly spaced apart by (1/4)ΔΦ. Although this disclosure describes and illustrates scan patterns with scan lines that are substantially uniformly spaced apart, this disclosure also contemplates scan patterns with scan lines that are non-uniformly spaced apart. For a scan pattern with N-fold interlaced scan lines, the (N−1) other scan lines located between a pair of adjacent scan lines from the first set of scan lines may be uniformly spaced apart or may be non-uniformly spaced apart. For example, the scan-line offset values may be expressed as f×ΔΦ, where the parameter f is any number between 0 and 1. In the example of FIG. 14, instead of having uniform scan-line offsets of (1/4)ΔΦ, (1/2)ΔΦ, and (3/4)ΔΦ, the respective scan-line offsets may be (0.2)×ΔΦ, (0.5)×ΔΦ, and (0.8)×ΔΦ, where the parameter f has the values 0.2, 0.5, and 0.8, respectively.

The value of ΔΦ, which corresponds to the angular separation between adjacent scan lines of a set of scan lines, may be uniform across a FOR. For example, in FIG. 12, each pair of adjacent scan lines in sub-frame A may have approximately the same scan-line separation angle ΔΦ (e.g., the angle between scan lines 1 and 3 may be approximately the same as the angles between scan lines 3 and 5, scan lines 5 and 7, and scan lines 7 and 9). Alternatively, the angular separation between adjacent scan lines of a set of scan lines may vary along the second scan axis. For example, at the outer edges of a FOR, the scan lines may be spaced farther apart, and near the center of the FOR, the scan lines may be more closely spaced. In FIG. 12, the angular separation between scan lines 1 and 3 (as well as scan lines 8 and 10) may be approximately 1°, while the angular separation between scan lines 5 and 7 (as well as scan lines 4 and 6) may be approximately 0.2°. Having a non-uniform scan-line separation angle ΔΦ that varies across the FOR may allow for a higher density of scan lines or pixels in particular regions of interest (e.g., near the middle of the FOR where objects of interest are likely to appear) and a lower density of scan lines or pixels in regions of less interest (e.g., an upper portion of the FOR that includes the sky). For a scan pattern with a non-uniform scan-line separation angle, the scan lines within each pair of adjacent scan lines may be interlaced as described herein.

As compared to a conventional scan pattern, a high-resolution scan pattern 200 with N-fold interlaced scan lines may provide a more diverse temporal distribution of scan lines 230 within all or a portion of a FOR. A conventional scan pattern (which may be referred to as a uniform scan pattern, sequential scan pattern, or progressive scan pattern) may include scan lines that are scanned in a uniform sequence (e.g., the scan lines of a frame are scanned in spatial order from one edge of the FOR to the opposite edge) and may not include interlaced scan lines. Additionally, a conventional scan pattern may repeatedly scan the same set of scan lines in a uniform sequence with each scan line located in approximately the same angular position. For a conventional scan applied to the scan pattern 200 of FIG. 12, a single frame may be captured by scanning lines 1 through 10 in numerical order from the top of the FOR to the bottom with no interlacing of the scan lines. If a frame is captured over a 100-ms time interval, then for a conventional scan of the scan pattern 200 in FIG. 12, scan lines 1 and 2 may be captured at capture times of approximately 0 ms and 10 ms, respectively, while scan lines 9 and 10 may be captured at the approximate times 90 ms and 100 ms, respectively. For a two-fold interlaced scan of FIG. 12, scan lines 1 and 2 may be captured at approximately 0 ms and 50 ms, respectively, while scan lines 9 and 10 may be captured at approximately 40 ms and 100 ms, respectively. For the conventional scan, an object that appears in the FOR at the location of scan lines 1 and 2 may not be captured by the lidar system 100 for approximately 90 ms. For the interlaced scan, an object that appears at the location of scan lines 1 and 2 may be captured within approximately 50 ms of its appearance. By scanning the FOR with two-fold interlaced scan lines, the time at which an object is captured by the lidar system 100 may be approximately one-half of that for a conventional scan. For a scan pattern with four-fold interlaced scan lines, the time at which an object is captured by the lidar system 100 may be approximately one-fourth of that for a conventional scan. Generally, a high-resolution scan pattern 200 with N-fold interlaced scan lines may provide a more diverse temporal distribution of scan lines 230 which may result in a reduction in capture time by approximately 1/N, as compared to a conventional scan.

The frame rate of a conventional scan pattern in which the scan lines are scanned in a uniform sequence may be fixed to a particular value based on the time required to scan all the scan lines of the scan pattern. For example, a conventional scan pattern may have a fixed frame rate of 10 Hz, corresponding to a 100-ms time interval to scan the full scan pattern. A high-resolution scan pattern 200 with N-fold interlaced scan lines 230 may allow for the use of higher effective frame rates, as compared to a conventional scan pattern. For example, the two-fold interlaced scan pattern 200 of FIG. 12 may have a frame rate of 10 Hz, which corresponds to a total time of 100 ms to scan across sub-frames A and B. A lidar system 100 may produce point clouds and perform perception (e.g., identification of objects within the point clouds) at the 10-Hz frame rate. Additionally, since sub-frames A and B may each be scanned over a time interval of approximately 50-ms, the lidar system 100 may produce partial point clouds at an effective sub-frame scan rate of approximately 20 Hz. For example, the lidar system 100 may produce one partial point cloud based on a scan of sub-frame A and a subsequent partial point cloud based on a subsequent scan of sub-frame B. A partial point cloud may include only the pixels 210 associated with one or more particular sub-frames and may not include pixels associated with all the sub-frames of a scan pattern 200. For example, a partial point cloud may include the pixels 210 associated with 1 to (N−1) of the most recently scanned sub-frames. Additionally or alternatively, the lidar system 100 may produce full point clouds at an effective frame rate of approximately 20 Hz by updating the point cloud each time a sub-frame is scanned. For example, an updated point cloud may be produced at 50-ms intervals by discarding the pixel data from a previous scan of sub-frame A and replacing it with pixel data from a current scan of sub-frame A. Similarly, after scanning sub-frame B, the pixel data from the previous scan of sub-frame B may be discarded and replaced with updated pixel data from the current scan of sub-frame B to produce another updated point cloud.

In particular embodiments, a high-resolution scan pattern 200 with N-fold interlaced scan lines 230 and a frame rate F may allow for N particular effective frame rates from F up to approximately N×F, where the frame rate F (which may be referred to as a full frame rate) is associated with a full scan that includes all N sub-frames. The reciprocal of the full frame rate, 1/F, corresponds to a duration of time to scan all N sub-frames (e.g., a 10-Hz frame rate corresponds to a 100-ms time interval to scan all N sub-frames of a scan pattern 200). For a full frame-rate F of 10 Hz, the two-fold interlaced scan pattern 200 of FIG. 12 may allow for an effective frame rate of approximately 20 Hz. Similarly, the four-fold interlaced scan pattern 200 of FIG. 14 may allow for an effective frame rate up to approximately 40 Hz, and the eight-fold scan pattern 200 of FIG. 15 may allow for an effective frame rate up to approximately 80 Hz.

In particular embodiments, a high-resolution scan pattern 200 with N-fold interlaced scan lines 230 and a frame rate F may allow for effective frame rates of approximately N×F/n, where n is an integer from 1 to N. In this case, each point cloud that is produced may be a full point cloud that includes pixels 210 associated with each of the N sets of scan lines. When the parameter n is equal to N, a point cloud may be produced only after all N sub-frames are scanned. When the parameter n is set to 1, the resulting frame rate is the highest, and a point cloud may be produced after each sub-frame is scanned. For example, if the full frame-rate F is 10 Hz, the four-fold interlaced scan pattern 200 of FIG. 14 may allow for the following effective frame rates: 10 Hz (for n=4), 13.3 Hz (for n=3), 20 Hz (for n=2), and 40 Hz (for n=1). The parameter n corresponds to the number of older sub-frames that are discarded and replaced with newly scanned sub-frames to produce each point cloud. The 10-Hz frame rate corresponds to a scan (with a 100-ms duration) of all four sets of scan lines 230 of the scan pattern 200 in FIG. 14. The 13.3-Hz frame rate corresponds to updating the point cloud at 75-ms intervals by discarding the pixel data from the three oldest sub-frames and updating the point cloud with pixel data from three newly captured sub-frames. The 20-Hz frame rate corresponds to updating the point cloud at 50-ms intervals with data from the two most recent sub-frames, and the 40-Hz frame rate corresponds to updating the point cloud at 25-ms intervals, after each sub-frame is captured. If the full frame-rate F is 10 Hz, the eight-fold interlaced scan pattern 200 of FIG. 15 may allow for the following effective frame rates: 10 Hz (for n=8), 11.4 Hz (for n=7), 13.3 Hz (for n=6), 16 Hz (for n=5), 20 Hz (for n=4), 26.7 Hz (for n=3), 40 Hz (for n=2), and 80 Hz (for n=1).

The N sets of scan lines 230 of a high-resolution scan pattern 200 with N-fold interlaced scan lines may be partitioned into two groups: (i) n sets of scan lines and (ii) (N−n) sets of scan lines. A previously produced point cloud may include (i) older pixels 210 associated with the n sets of scan lines and (ii) more recent pixels 210 associated with the (N−n) sets of scan lines, where the more recent pixels were captured after the older pixels. A subsequently produced point cloud may include (i) newer pixels associated with the n sets of scan lines and (ii) the more recent pixels associated with the (N−n) sets of scan lines, where the newer pixels are captured after the more recent pixels. For example, if the parameter n is set to 2, then for the four-fold interlaced scan pattern 200 of FIG. 14, the lidar system may produce a point cloud after each scan of two sets of scan lines. A previous point cloud may include (i) older pixels associated with scan-line sets 1 and 2 and (ii) more recent pixels associated with scan-line sets 3 and 4. After a subsequent scan of scan-line sets 1 and 2, the older pixels associated with scan-line sets 1 and 2 may be discarded and replaced with the newer pixels from the subsequent scan of scan-line sets 1 and 2. The more recent pixels associated with scan-line sets 3 and 4 may be retained, and a subsequent point cloud may be produced that includes (i) the newer pixels from the subsequent scan of scan-line sets 1 and 2 and (ii) the more recent pixels associated with scan-line sets 3 and 4. This process of discarding and replacing pixels 210 after scanning n sets of scan lines 230 may continue in a cyclical manner. For example, after a subsequent scan of scan-line sets 3 and 4 that produces newer pixels associated with scan-line sets 3 and 4, another subsequent point cloud may be produced that includes (i) the newer pixels from the subsequent scan of scan-line sets 1 and 2 and (ii) the newer pixels from the subsequent scan of scan-line sets 3 and 4.

Figure 16:
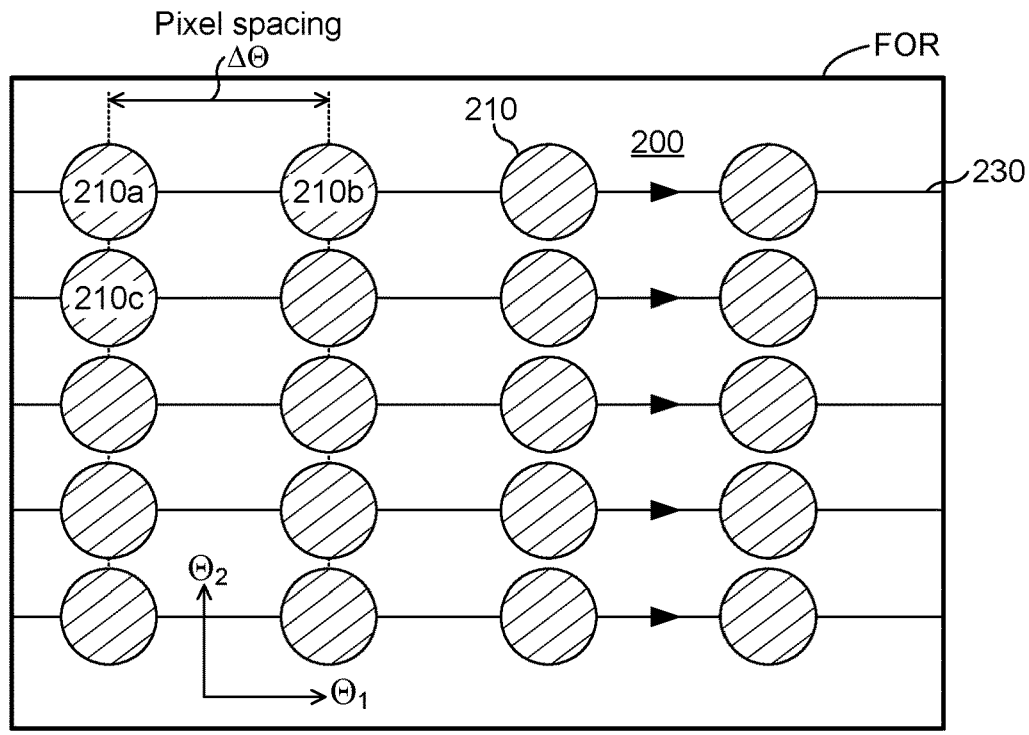
FIG. 16 illustrates an example scan pattern with non-interlaced pixels.

FIG. 16 illustrates an example scan pattern 200 with non-interlaced pixels 210. Adjacent pixels 210 associated with the same scan line 230 are separated from one another along the first scan axis (the $\Theta_1$ scan axis) by the pixel-spacing angle $\Delta\Theta$. For example, pixels 210a and 210b are adjacent pixels associated with the same scan line 230, and the two pixels are offset along the $\Theta_1$ scan axis by the pixel-spacing angle $\Delta\Theta$. The pixels 210 in FIG. 16 are non-interlaced, as indicated by the pixels from adjacent scan lines 230 having approximately zero angular offset along the $\Theta_1$ scan axis with respect to one another. For example, pixels 210a and 210c are associated with two adjacent scan lines, and the two pixels are located in approximately the same position along the $\Theta_1$ scan axis, which corresponds to the two pixels having approximately zero angular offset along the $\Theta_1$ scan axis.

Figure 17:
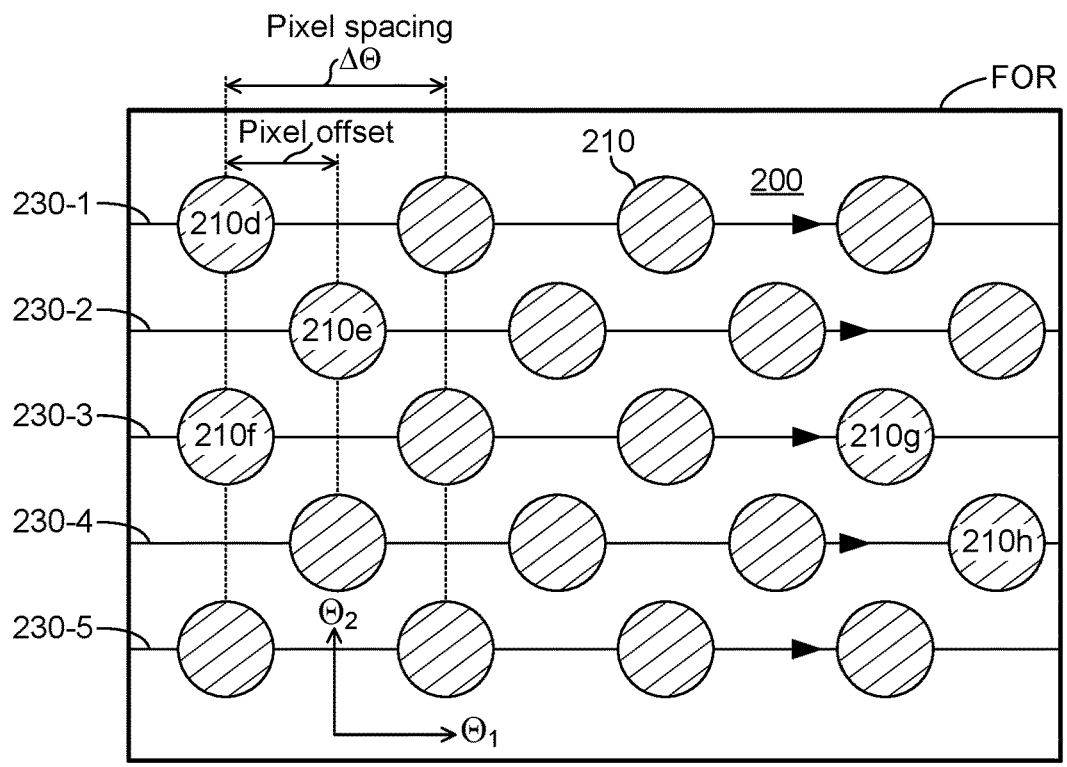
FIG. 17 illustrates an example scan pattern with interlaced pixels.

FIG. 17 illustrates an example scan pattern 200 with interlaced pixels 210. In particular embodiments, a high-resolution scan pattern 200 may include interlaced pixels 210 in which the pixels associated with two adjacent scan lines 230 are offset along the first scan axis with respect to one another by a pixel-offset angle d×$\Delta\Theta$, where d is a number between 0 and 1. In FIG. 17, the pixels 210 associated with each scan line 230 are offset from one another along the $\Theta_1$ scan axis by the pixel-spacing angle $\Delta\Theta$. Additionally, pixels associated with adjacent scan lines 230 are offset along the $\Theta_1$ scan axis by a pixel-offset angle, where the pixel-offset angle is less than the pixel-spacing angle $\Delta\Theta$. For example, pixels 210d and 210e are associated with adjacent scan lines 230-1 and 230-2, respectively, and the two pixels may be referred to as being offset along the $\Theta_1$ scan axis by the pixel-offset angle. Similarly, pixels 210e and 210f may be referred to as being offset along the $\Theta_1$ scan axis by the pixel-offset angle. The pixel-offset angle may be expressed as d×$\Delta\Theta$, where d is a number between 0 and 1. For example, the parameter d may be 0.1, 0.25, 0.5, 0.75, or any other suitable value between 0 and 1. If the pixel-spacing angle $\Delta\Theta$ is 0.1°, and the parameter d is 0.5, then the pixel-offset angle may be approximately 0.05°.

In particular embodiments, a high-resolution scan pattern 200 may include interlaced pixels 210 with two-fold interlacing, where the scan lines 230 of the high-resolution scan pattern include a set of even scan lines and a set of odd scan lines. Each pair of adjacent even scan lines may be separated by one of the odd scan lines, and each pair of adjacent odd scan lines may be separated by one of the even scan lines. Adjacent pixels 210 associated with each scan line 230 may be separated from one another along the first scan axis by a pixel-spacing angle $\Delta\Theta$, and the pixels associated with the even scan lines may be offset along the first scan axis with respect to the pixels associated with the odd scan lines by a pixel-offset angle of $\Delta\Theta/2$. The high-resolution scan pattern in FIG. 17 may be referred to as having two-fold interlaced pixels 210. Scan lines 230-1, 230-3, and 230-5 may be referred to as odd scan lines, and scan lines 230-2 and 230-4 may be referred to as even scan lines. Pixel 210e (which is associated with even scan line 230-2) is offset along the $\Theta_1$ scan axis with respect to pixel 210d (which is associated with the adjacent odd scan line 230-1) by the pixel-offset angle of $\Delta\Theta/2$. Similarly, pixel 210e is offset along the $\Theta_1$ scan axis with respect to pixel 210f by the pixel-offset angle of $\Delta\Theta/2$. Additionally, the other pixels associated with adjacent scan lines may be offset from one another by the $\Delta\Theta/2$ pixel-offset angle (e.g., pixels 210g and 210h are offset from one another along the $\Theta_1$ scan axis by $\Delta\Theta/2$). In a high-resolution scan pattern with two-fold interlaced pixels 210, the pixels associated with two adjacent scan lines 230 may be referred to as being offset along the $\Theta_1$ scan axis by a pixel-offset angle d×$\Delta\Theta$, where d is 0.5. In addition to having interlaced pixels 210, the even and odd scan lines 230 may be interlaced where the even scan lines are scanned after the odd scan lines are scanned. Alternatively, the even and odd scan lines 230 may be scanned in a non-interlaced uniform sequence (e.g., the scan lines may be scanned in order from the top of the FOR to the bottom).

Figure 18:
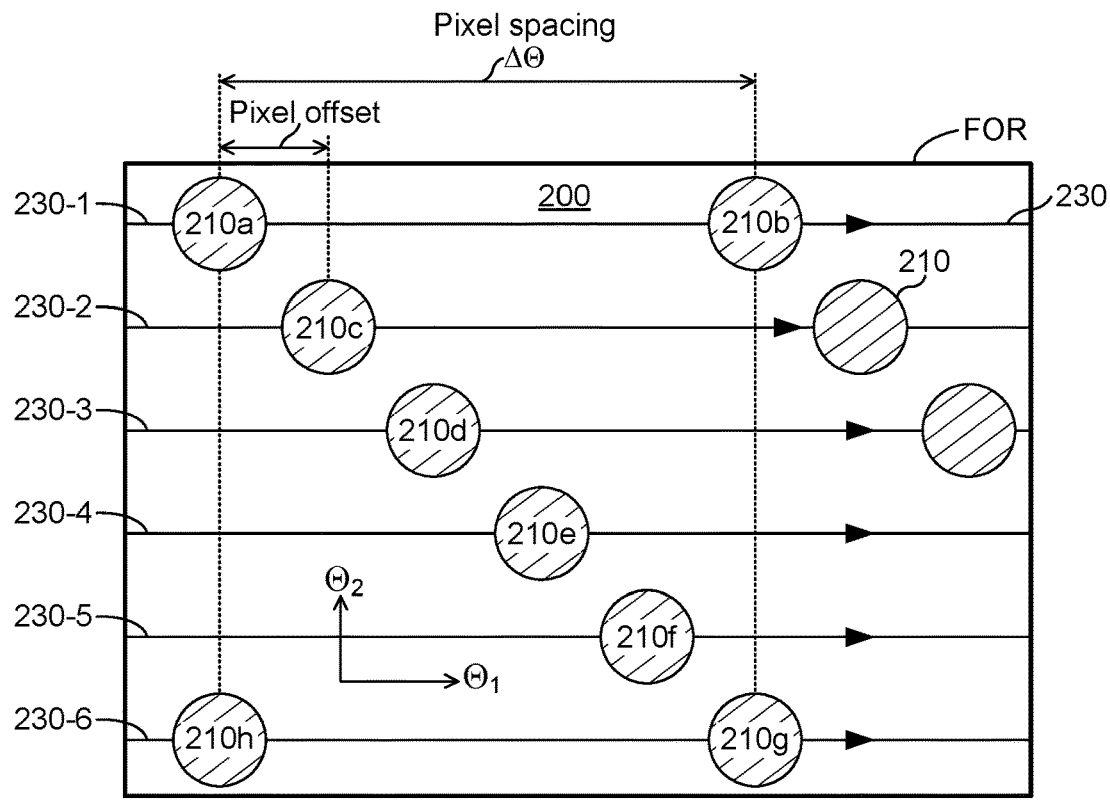
FIG. 18 illustrates an example scan pattern with sequentially interlaced pixels.

FIG. 18 illustrates an example scan pattern 200 with sequentially interlaced pixels 210. In particular embodiments, a high-resolution scan pattern 200 may include interlaced pixels 210 with M-fold sequential interlacing. In a high-resolution scan pattern 200 with M-fold sequential pixel interlacing, M is a positive integer greater than or equal to 2, and adjacent pixels 210 associated with each scan line 230 may be separated from one another along the $\Theta_1$ scan axis by a pixel-spacing angle $\Delta\Theta$. Additionally, the pixels 210 associated with two adjacent scan lines may be offset along the $\Theta_1$ scan axis by a pixel-offset angle $\Delta\Theta/M$. The high-resolution scan pattern 200 in FIG. 17 may be referred to as having M-fold sequential pixel interlacing, where the parameter M is 2. The high-resolution scan pattern 200 in FIG. 18 may be referred to as having M-fold sequential pixel interlacing, where the parameter M is 5, and the pixel-offset angle is $\Delta\Theta/5$. For example, the pixel-spacing angle $\Delta\Theta$ in FIG. 18 may be approximately 0.5°, and the pixel-offset angle may be approximately 0.1°. Pixels 210a and 210b are adjacent pixels associated with the same scan line 230, and the two pixels are offset along the $\Theta_1$ scan axis by the pixel-spacing angle $\Delta\Theta$. Additionally, pixels 210 associated with adjacent scan lines 230 are offset along the $\Theta_1$ scan axis by the pixel-offset angle $\Delta\Theta/5$. The pixel-offset angle between pixels 210a and 210c is $\Delta\Theta/5$. Similarly, the pixel-offset angle between pixels 210c and 210d (as well as pixels 210d and 210e, pixels 210e and 210f, and pixels 210f and 210g) is also $\Delta\Theta/5$. In a high-resolution scan pattern 200 with M-fold sequential pixel interlacing, the pattern of pixel interlacing may repeat every M scan lines 230, and pixels 210 that are located M scan lines apart (or, equivalently, are separated by (M−1) scan lines) may have approximately zero angular offset along the $\Theta_1$ scan axis. In FIG. 18, pixels 210a and 210h are located 5 scan lines apart (e.g., the two pixels are separated by 4 scan lines), and the two pixels have approximately zero angular offset with respect to one another along the $\Theta_1$ scan axis. Similarly, pixels 210b and 210g have approximately zero angular offset with respect to one another along the $\Theta_1$ scan axis.

Figure 19:
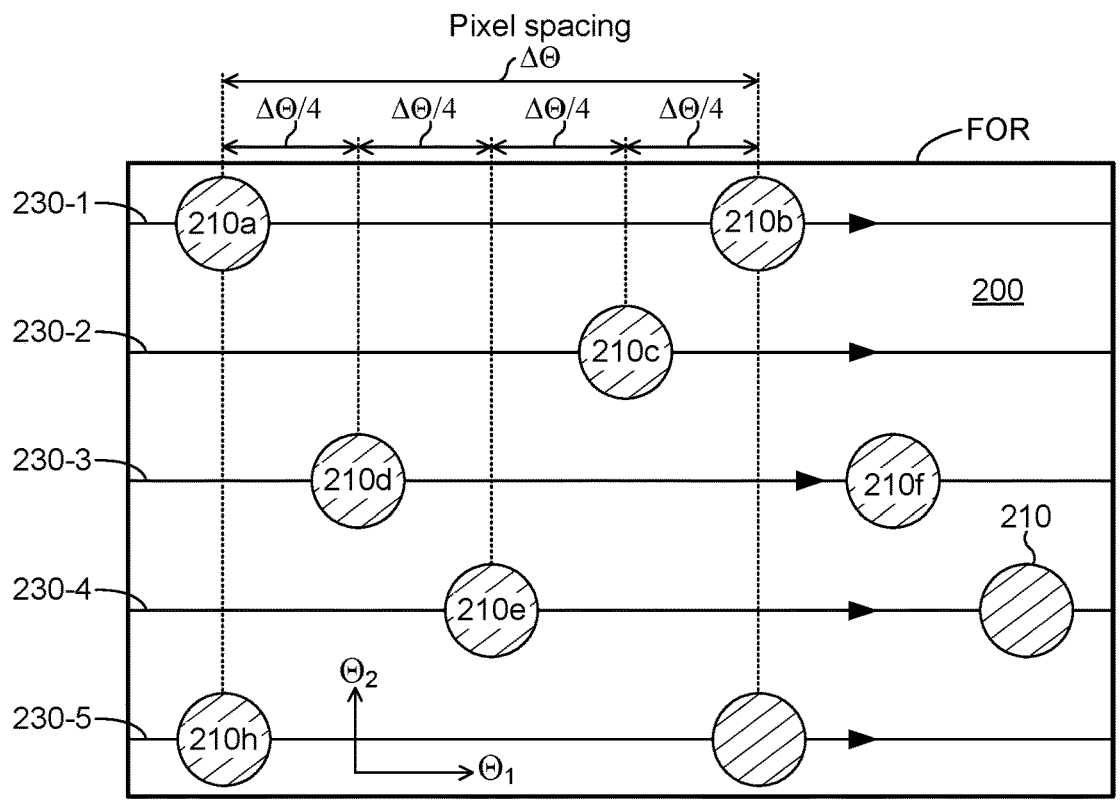
FIG. 19 illustrates an example scan pattern with non-sequentially interlaced pixels.

FIG. 19 illustrates an example scan pattern 200 with non-sequentially interlaced pixels 210. In a high-resolution scan pattern 200 with non-sequential pixel interlacing, adjacent pixels 210 associated with each scan line 230 may be separated from one another along the $\Theta_1$ scan axis by a pixel-spacing angle $\Delta\Theta$. Additionally, the high-resolution scan pattern 200 may include three adjacent scan lines 230 (a first, second, and third scan line), where the second scan line is located between the first and third scan lines. The pixels 210 associated with the second scan line may be offset along the $\Theta_1$ scan axis with respect to the pixels 210 associated with the first scan line by a pixel-offset angle $d_1 \times \Delta\Theta$, where $d_1$ is a number between 0 and 1. Additionally, the pixels 210 associated with the third scan line may be offset along the $\Theta_1$ scan axis with respect to the pixels 210 associated with the first scan line by a pixel-offset angle $d_2 \times \Delta\Theta$, where $d_2$ is a number between 0 and $d_1$. A high-resolution scan pattern 200 with non-sequential pixel interlacing may produce pixels 210 that are offset from one scan line to the next in a non-uniform or non-sequential manner.

In the high-resolution scan pattern 200 in FIG. 19, adjacent pixels 210 associated with each scan line 230 are separated from one another along the $\Theta_1$ scan axis by the pixel-spacing angle $\Delta\Theta$. For example, pixels 210a and 210b are associated with scan line 230-1 and are separated from one another along the $\Theta_1$ scan axis by the pixel-spacing angle $\Delta\Theta$. Similarly, pixels 210d and 210f are associated with scan line 230-3 and are separated from one another along the $\Theta_1$ scan axis by the pixel-spacing angle 40. The high-resolution scan pattern 200 includes three adjacent scan lines (230-1, 230-2, and 230-3), where scan line 230-2 is located between scan lines 230-1 and 230-3. The three scan lines 230-1, 230-2, and 230-3 may be referred to as having pixels 210 that are non-sequentially interlaced. The pixels associated with scan line 230-2 are offset along the $\Theta_1$ scan axis with respect to the pixels associated with scan line 230-1 by a pixel-offset angle of $d_1 \times \Delta\Theta$, where $d_1$ is approximately 0.75 (e.g., pixel 210c is offset with respect to pixel 210a by $(\frac{3}{4})\Delta\Theta$). Additionally, the pixels associated with scan line 230-3 are offset along the $\Theta_1$ scan axis with respect to the pixels associated with scan line 230-1 by a pixel-offset angle of $d_2 \times \Delta\Theta$, where $d_2$ is approximately 0.25, and $d_2$ is between 0 and $d_1$ (e.g., pixel 210d is offset with respect to pixel 210a by $(\frac{1}{4})\Delta\Theta$).

In particular embodiments, a high-resolution scan pattern 200 with non-sequential pixel interlacing may include multiple instances of three adjacent scan lines with non-sequentially interlaced pixels. For example, scan lines 230-3, 230-4, and 230-5 in FIG. 19 are another three adjacent scan lines that also include non-sequentially interlaced pixels. The pixels associated with scan line 230-4 are offset along the $\Theta_1$ scan axis with respect to the pixels associated with scan line 230-5 by a pixel-offset angle of $d_1 \times \Delta\Theta$, where $d_1$ is approximately 0.5 (e.g., pixel 210e is offset with respect to pixel 210h by $(\frac{1}{2})\Delta\Theta$). Additionally, the pixels associated with scan line 230-3 are offset along the $\Theta_1$ scan axis with respect to the pixels associated with scan line 230-5 by a pixel-offset angle of $d_2 \times \Delta\Theta$, where $d_2$ is approximately 0.25, and $d_2$ is between 0 and $d_1$ (e.g., pixel 210d is offset with respect to pixel 210h by $(\frac{1}{4})\Delta\Theta$).

In particular embodiments, the non-sequentially interlaced pixels 210 of a high-resolution scan pattern 200 may be interlaced with pixel-offset angles that repeat in a particular sequence. For example, the scan pattern 200 in FIG. 19 may include three additional scan lines located below scan line 230-5, and the three additional scan lines 230 may have the same respective pixel-offset angles as scan lines 230-2, 230-3, and 230-4. A high-resolution scan pattern 200 with non-sequentially interlaced pixels 210 in which the pixel-offset angles repeat every M scan lines may be referred to as a scan pattern with M-fold non-sequential pixel interlacing. The scan pattern 200 in FIG. 19 may be referred to as having four-fold non-sequential pixel interlacing, and the scan pattern 200 may include additional scan lines with the same sequence of pixel-offset angles as scan lines 230-1 through 230-4. For example, scan-line 230-5 may have a pixel-offset angle of 0, which matches that of scan line 230-1, and the scan pattern 200 may include three additional scan lines below scan line 230-5 with respective pixel-offset angles $(\frac{3}{4})\Delta\Theta$, $(\frac{1}{4})\Delta\iota$, and $(\frac{1}{2})\Delta\Theta$). In particular embodiments, the non-sequentially interlaced pixels 210 of a high-resolution scan pattern 200 may be interlaced with pixel-offset angles that change or are varied in a pseudo-random or non-repeating manner. For example, the scan pattern 200 in FIG. 19 may include additional scan lines 230 located below scan line 230-5, and the additional scan lines 230 may have pixels that are non-sequentially interlaced with values of the parameters $d_1$ and $d_2$ that are different from the parameters exhibited by scan lines 230-1 through 230-5.

In particular embodiments, for a high-resolution scan pattern 200 with M-fold pixel interlacing, the pixels 210 may be interlaced by applying a temporal offset of M different temporal offsets at the beginning of each scan line 230. A lidar system 100 may include a light source 110 that emits pulses of light, and each pixel 210 may be associated with a pulse of light emitted by the light source 110. At the beginning of each scan line 230, the light source 110 may apply a particular temporal offset to the portion of the emitted pulses of light associated with that scan line. The temporal offset applied to the emitted pulses of light associated with each scan line 230 may correspond to a temporal delay between two or more emitted pulses of light. For example, for the high-resolution scan pattern 200 with two-fold pixel interlacing in FIG. 17, a temporal delay may be applied to the pulses of light associated with the even scan lines with respect to the pulses of light associated with the odd scan lines. As an example, a relative temporal offset of 1 µs may be applied at the beginning of each even scan line (with respect to the odd scan lines) so that the pixels of the even scan lines are offset with respect to the pixels of the odd scan lines. If the pulse period τ between successive pulses of light is 2 µs, then the 1-µs temporal offset may be achieved by including a 3-µs delay between two pulses of light (e.g., the second pulse of light may correspond to the first pixel in one of the even scan lines).

For a high-resolution scan pattern 200 in which the pixels 210 have a substantially constant pixel-spacing angle $\Delta\Theta$ along the $\Theta_1$ scan axis, the pulses of light may be emitted with an approximately constant pulse repetition frequency (PRF), which corresponds to an approximately constant pulse period τ between successive pulses of light. Additionally, the angular scan speed of the output beam 125 along the $\Theta_1$ scan axis may be substantially constant. The pixel-spacing angle $\Delta\Theta$ may be related to the pulse period τ by the expression $\Delta\Theta = \omega_x \times \tau$, where $\omega_x$ is the angular scan speed of the output beam 125 along the $\Theta_1$ scan axis. For example, a pulse period of 2 µs and an angular scan speed of 60,000 degrees per second correspond to a pixel-spacing angle of approximately 0.12°. In the example of FIG. 17, the even scan lines may be offset by $\Delta\Theta/2$ (or, 0.06°) with respect to the odd scan lines by inserting a temporal delay of $\tau/2$ (or, 1 µs) before emitting the pulses of light associated with each of the even scan lines. In this case, a relative temporal offset of 0 µs may be applied at the beginning of the odd scan lines, while a relative temporal offset of 1 µs may be applied at the beginning of the even scan lines. In the example of FIG. 18, in which the pixels 210 are five-fold sequentially interlaced, the light source may apply one of five different temporal offsets at the beginning of each scan line 230. The temporal offsets may be expressed in terms of pulse period as follows: 0 (for scan lines 230-1 and 230-6), $\tau/5$ (for scan line 230-2), $2\tau/5$ (for scan line 230-3), $3\tau/5$ (for scan line 230-4), and $4\tau/5$ (for scan line 230-5). If the pulse period is 2 µs, then the corresponding temporal offsets are 0 µs, 0.4 µs, 0.8 µs, 1.2 µs, and 1.6 µs.

In particular embodiments, for a high-resolution scan pattern 200 with M-fold pixel interlacing, the pixels 210 may be interlaced by applying an angular offset of M different angular offsets along the $\Theta_1$ scan axis to each scan line 230. In the example of FIG. 17, an angular offset of zero degrees may be applied to the odd scan lines, while an angular offset of $\Delta\Theta/2$ along the $\Theta_1$ scan axis may be applied to the even scan lines with respect to the odd scan lines. In the example of FIG. 18, the following five angular offsets may be applied to the scan lines: 0 degrees (for scan lines 230-1 and 230-6), $\Delta\Theta/5$ (for scan line 230-2), $2\Delta\Theta/5$ (for scan line 230-3), $3\Delta\Theta/5$ (for scan line 230-4), and $4\Delta\Theta/5$ (for scan line 230-5). If the pixel-spacing angle $\Delta\Theta$ is 0.2°, then the five angular offset may be approximately 0°, 0.04°, 0.08°, 0.12°, and 0.16°. The angular offsets may be applied to the scan lines 230 of a high-resolution scan pattern 200 by a scanner 120 that scans the output beam 125 along the $\Theta_1$ and $\Theta_2$ scan axes. For example, the scanner 120 may include a galvanometer scanner that scans the output beam 125 along the $\Theta_1$ scan axis, and the galvanometer may be configured to apply a particular angular offset to each scan line 230.

In particular embodiments, a high-resolution scan pattern 200 may include both interlaced scan lines 230 and interlaced pixels 210. For example, in addition to including interlaced scan lines 230, any of the high-resolution scan patterns 200 illustrated in FIGS. 8, 11, 12, 14, and 15 may also include interlaced pixels 210. As another example, in addition to including interlaced pixels 210, any of the high-resolution scan patterns 200 illustrated in FIGS. 17-19 may also include interlaced scan lines 230.

Figure 20:
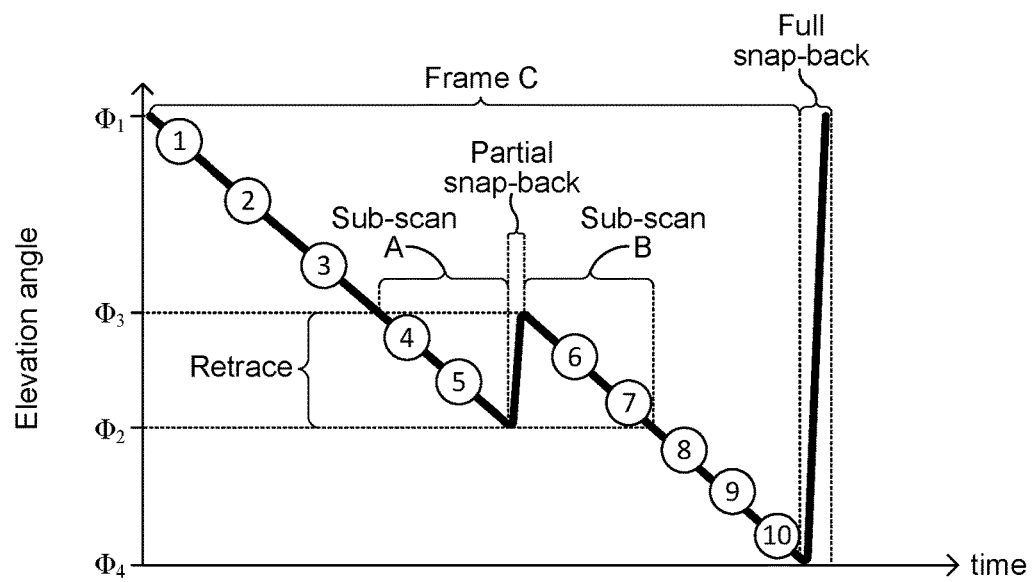
FIGS. 20 and 21 each illustrates an example graph of elevation angle versus time for a scan pattern with local retracing.
Figure 21:
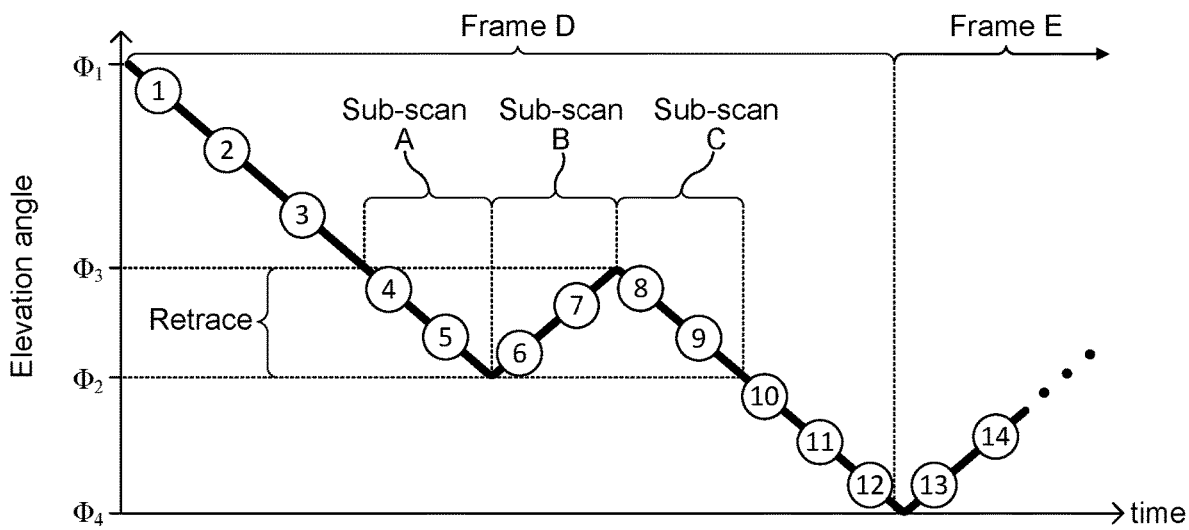

FIGS. 20 and 21 each illustrates an example graph of elevation angle versus time for a scan pattern with local retracing. In particular embodiments, a lidar system 100 may include a scanner 120 that scans emitted pulses of light along a high-resolution scan pattern 200 that includes locally retraced scan lines 230. The scanner 120 may include one or more scan mirrors that (i) scan the emitted pulses of light along a first scan axis (the $\Theta_1$ scan axis) to produce the scan lines 230 and (ii) distribute the scan lines 230 along a second scan axis (the $\Theta_2$ scan axis) to produce the high-resolution scan pattern 200 with locally retraced scan lines 230. For example, the polygon mirror 301 in FIG. 3 may scan the emitted pulses of light along the $\Theta_x$ scan axis to produce the scan lines 230, and the scan mirror 302 may distribute the scan lines 230 along the $\Theta_y$ scan axis to produce a high-resolution scan pattern 200 with locally retraced scan lines 230. The elevation-angle graphs in FIGS. 20 and 21 may each represent an elevation angle along the $\Theta_2$ scan axis along which the scan lines 230 are distributed.

A high-resolution scan pattern 200 with locally retraced scan lines 230 may include a local-retrace region that is scanned two or more times by locally retraced scan lines 230. In the example of FIG. 20, the retrace region is scanned two times (a first time by sub-scan A and a second time by sub-scan B), and a partial snap-back is executed during the scan of frame C to allow the lidar system 100 to perform the second scan of the retrace region. Scan lines 4 and 5 are produced during sub-scan A of the retrace region, and scan lines 6 and 7 are produced during the subsequent sub-scan B of the retrace region. In the example of FIG. 21, the retrace region is scanned three times during the scan across frame D: a first time by sub-scan A (which includes scan lines 4 and 5), a second time by sub-scan B (which includes scan lines 6 and 7), and a third time by sub-scan C (which includes scan lines 8 and 9). The retrace region may have an angular extent along the $\Theta_2$ scan axis that is less than the full extent of the scan pattern. In each of FIGS. 20 and 21, the high-resolution scan pattern 200 extends along the $\Theta_2$ scan axis between elevation angles $\Phi_1$ and $\Phi_4$, and the retrace region is located within a smaller portion of that range between elevation angles $\Phi_2$ and $\Phi_3$. As compared to a conventional scan pattern, a high-resolution scan pattern 200 with locally retraced scan lines 230 may provide a scan pattern with a higher density of scan lines 230 or pixels 210 within a particular region of interest. For example, a retrace region that includes locally retraced scan lines may be located near the middle of the FOR where objects of interest are likely to appear, and the scan-line density may be lower in other regions of the FOR (e.g., an upper portion of the FOR that includes the sky). Additionally, the size or location of a retrace region with a FOR may be dynamically adjusted to allow the lidar system 100 to focus on a particular region of interest.

The elevation-angle graph in FIG. 20 corresponds to a high-resolution scan pattern 200 that includes a local-retrace region with two sub-scans (sub-scan A and sub-scan B) and a partial snap-back. The scan pattern includes scan lines 1 through 10, where scan lines 4 through 7 are located in the local-retrace region (with scan lines 4 and 5 being part of sub-scan A, and scan lines 6 and 7 being part of sub-scan B). For the high-resolution scan pattern represented by FIG. 20, a scanner 120 may begin a scan of frame C at an elevation angle $\Phi_1$, and scan lines 1, 2, 3, 4, and 5 are produced while scanning in a forward-scan direction from elevation angle $\Phi_1$ to elevation angle $\Phi_2$. Then, a partial snap-back is executed (in a backward-scan direction, opposite the forward-scan direction) to change the elevation angle from $\Phi_2$ to $\Phi_3$, at which point the scan continues with scan lines 6, 7, 8, 9, and 10 being produced while scanning in the forward-scan direction from elevation angle $\Phi_3$ to elevation angle $\Phi_4$. After the scan of frame C is complete, the scanner 120 may execute a full snap-back from elevation angle $\Phi_4$ to elevation angle $\Phi_1$, at which point the scan of a subsequent frame may begin. Alternatively, instead of executing a full snap-back after the scan of frame C is complete, the scanner 120 may begin a subsequent scan of the next frame by scanning in the backward-scan direction from elevation angle $\Phi_4$ to elevation angle $\Phi_1$.

The elevation-angle graph in FIG. 21 corresponds to a high-resolution scan pattern 200 that includes a local-retrace region with three sub-scans (sub-scans A, B, and C). The scan pattern includes scan lines 1 through 12, where scan lines 4 through 9 are located in the local-retrace region (with scan lines 4 and 5 being part of sub-scan A, scan lines 6 and 7 being part of sub-scan B, and scan lines 8 and 9 being part of sub-scan C). For the high-resolution scan pattern represented by FIG. 21, a scanner 120 may begin a scan of frame D at an elevation angle $\Phi_1$, and scan lines 1, 2, 3, 4, and 5 are produced while scanning in a forward-scan direction from elevation angle $\Phi_1$ to elevation angle $\Phi_2$. Then, instead of executing a partial snap-back, the scanner 120 may reverse direction and produce scan lines 6 and 7 while scanning in a backward-scan direction from elevation angle $\Phi_2$ to elevation angle $\Phi_3$. Sub-scans A and B in FIG. 21 may be similar to the V-scan illustrated in FIG. 10 and described herein, with the difference being that sub-scans A and B are part of a local-retrace region that covers only the portion of the FOR between elevation angles $\Phi_2$ and $\Phi_3$. After sub-scan B, the scanner 120 may reverse direction again to produce scan lines 8, 9, 10, 11, and 12 while scanning in the forward-scan direction from elevation angle $\Phi_3$ to elevation angle $\Phi_4$. After the scan of frame D is complete, the scanner 120 may begin a subsequent scan of the next frame, frame E, which includes scan lines 13 and 14. Frame E may be scanned in the backward-scan direction from elevation angle $\Phi_4$ to elevation angle $\Phi_1$, and frame E may be a high-resolution scan pattern 200 that includes one or more of: interlaced scan lines 230, interlaced pixels 210, and locally retraced scan lines 230. Alternatively, after the scan of frame D is complete, the scanner 120 may execute a full snap-back from elevation angle $\Phi_4$ to elevation angle $\Phi_1$, at which point the scan of a subsequent frame may begin. The scan lines of the high-resolution scan pattern represented by FIG. 20 or FIG. 21 may be distributed along the $\Theta_2$ scan axis by scan mirror 302 in FIG. 3 rotating in forward-scan and backward-scan directions between particular angles that correspond to the elevation angles $\Phi_1$, $\Phi_2$, $\Phi_3$, and $\Phi_4$.

The scan of frame C in FIG. 20 includes a partial snap-back, and after the scan of frame C is complete, a snap-back (which may be referred to as a full snap-back to distinguish from the partial snap-back) is executed. The elevation angles $\Phi_1$, $\Phi_2$, $\Phi_3$, and $\Phi_4$ may correspond to the elevation of the output beam 125 as it is scanned across the FOR of the lidar system 100. In FIG. 20, the scan of frame C begins at the maximum elevation angle $\Phi_1$ and ends at the minimum elevation angle $\Phi_4$, at which point a full snap-back is executed. A full snap-back may refer to a rapid motion of a scan mirror that moves the output beam 125 from an ending elevation angle to a beginning elevation angle (e.g., from $\Phi_4$ to $\Phi_1$, or vice versa). For example, the maximum and minimum elevation angles ($\Phi_1$ and $\Phi_4$) may be +15° and −15°, respectively, and the angles $\Phi_3$ and $\Phi_2$ that correspond to the retrace region may be +5° and −5°, respectively. The output beam 125 may be scanned from +15° to −5°, and after a partial snap-back from −5° to +5°, the output beam may then be scanned from +5° to −15°. The partial snap-back in FIG. 20 moves the output beam 125 from elevation angle $\Phi_2$ to elevation angle $\Phi_3$. A partial snap-back may refer to a rapid motion of a scan mirror that is executed during the scan of a frame and that moves the output beam 125 between two elevation angles located within the maximum and minimum elevation angles of the scan.

In particular embodiments, a high-resolution scan pattern 200 may include locally retraced scan lines 230 in which the scan lines 230 are distributed along the $\Theta_2$ scan axis by: (i) distributing a first portion of the scan lines across a first region of the FOR and (ii) distributing, after the first portion of the scan lines is distributed, a second portion of the scan lines across a second region of the field of regard, where the first and second regions are partially overlapped in a retrace region. In the example of FIG. 20, the region of the field of regard between elevation angles $\Phi_1$ and $\Phi_2$ may be referred to as the first region of the FOR, and the region between elevation angles $\Phi_3$ and $\Phi_4$ may be referred to as the second region. The elevation angles $\Phi_1$ and $\Phi_4$ may represent the full angular range of the scan pattern along the $\Theta_2$ scan axis, and the elevation angles $\Phi_2$ and $\Phi_3$ are located within that range, where (i) $\Phi_3$ is located between $\Phi_1$ and $\Phi_2$ and (ii) $\Phi_2$ is located between $\Phi_3$ and $\Phi_4$ (e.g., $\Phi_1 > \Phi_3 > \Phi_2 > \Phi_4$). The first portion of the scan lines that are distributed across the first region includes scan lines 1 through 5, and the second portion of the scan lines that are distributed after the first portion and across the second region includes scan lines 6 through 10. The first and second regions are partially overlapped in the local-retrace region between elevation angles $\Phi_3$ and $\Phi_2$. Scan lines 4-7, which are located in the retrace region, may be referred to as the locally retraced scan lines 230 of the high-resolution scan pattern 200. In the example of FIG. 21, the region of the field of regard between elevation angles $\Phi_1$ and $\Phi_2$ may be referred to as the first region of the FOR, and the region between elevation angles $\Phi_3$ and $\Phi_4$ may be referred to as the second region. The first portion of the scan lines that are distributed across the first region may include scan lines 1 through 7, and the second portion of the scan lines that are distributed after the first portion and across the second region may include scan lines 8 through 12. Scan lines 4-9, which are located in the retrace region (which corresponds to the overlap between the first and second regions), may be referred to as locally retraced scan lines 230.

In particular embodiments, a high-resolution scan pattern 200 may include locally retraced scan lines 230 in which the scan lines 230 are distributed along the $\Theta_2$ scan axis by: (i) distributing a first portion of the scan lines across a first region of the FOR, (ii) distributing a second portion of the scan lines across a second region of the FOR, and (iii) distributing a third portion of the scan lines across a third region of the FOR, where the first and third regions are partially overlapped in the retrace region, and the retrace region contains the second region. In the example of FIG. 21, the region of the field of regard between elevation angles $\Phi_1$ and $\Phi_2$ may be referred to as the first region of the FOR, and the region between elevation angles $\Phi_3$ and $\Phi_4$ may be referred to as the third region. The second region, which corresponds to the retrace region, is located between elevation angles $\Phi_2$ and $\Phi_3$ and corresponds to the region where the first and third regions are overlapped. The first portion of scan lines includes scan lines 1 through 5, the second portion of scan lines includes scan lines 6 and 7, and the third portion includes scan lines 8 through 12. Scan lines 4-9 are located in the retrace region (which corresponds to the overlap between the first and third regions) and may be referred to as locally retraced scan lines 230.

In particular embodiments, a high-resolution scan pattern 200 may include K-fold locally retraced scan lines 230, wherein K is a positive integer greater than or equal to 3. Distributing the scan lines of a K-fold locally retraced scan pattern along the $\Theta_2$ scan axis may include: (i) distributing a first portion of the scan lines across a first region of the FOR, (ii) distributing second through (K−1)-th portions of the scan lines across a second region of the FOR, and (iii) distributing a K-th portion of the scan lines across a third region of the field of regard, where the first and third regions are partially overlapped in a retrace region, where the retrace region contains the second region. The high-resolution scan pattern 200 represented by FIG. 21 may be referred to as including three-fold locally retraced scan lines 230. The first portion of scan lines includes scan lines 1 through 5, and the first region is located between elevation angles $\Phi_1$ and $\Phi_2$. The second portion of scan lines includes scan lines 6 and 7, and the second region, which corresponds to the retrace region, is located between elevation angles $\Phi_2$ and $\Phi_3$. The third portion of scan lines includes scan lines 8 through 12, and the third region is located between elevation angles $\Phi_3$ and $\Phi_4$. The parameter K may represent the number of sub-scans of the retrace region. In FIG. 21, the parameter K is 3, and the scan pattern includes three sub-scans of the retrace region. For a high-resolution scan pattern 200 with five-fold locally retraced scan lines 230, the retrace region may be scanned five times by five respective sub-scans.

In particular embodiments, scan lines 230 located in the retrace region of a high-resolution scan pattern 200 may be interlaced. For example, the retrace region in FIG. 20 may have two-fold interlaced scan lines in which scan lines 4 and 5 from the first portion of scan lines are interlaced with scan lines 6 and 7 from the second portion of scan lines. In the example of FIG. 21, scan lines 4 through 9 may be interlaced in any suitable manner. For example, the scan lines in the retrace region may be three-fold interlaced with three sets of interlaced scan lines formed by scan lines 4 and 5, scan lines 6 and 7, and scan lines 8 and 9, respectively.

In particular embodiments, pixels 210 associated with scan lines 230 located in the retrace region of a high-resolution scan pattern 200 may be interlaced. In the retrace region in FIG. 20, the pixels 210 associated with scan lines 4 through 7 may be interlaced. In the retrace region in FIG. 21, the pixels 210 associated with scan lines 4 through 9 may be interlaced. Additionally, for scan lines 230 located in the retrace region of a high-resolution scan pattern 200, both the scan lines 230 as well as their associated pixels 210 may be interlaced.

In particular embodiments, after scanning across a high-resolution scan pattern 200, the scanner 120 of a lidar system 100 may execute a snap-back or may begin a subsequent scan of another scan pattern. In the example of FIG. 20, the scan lines are distributed along the $\Theta^2$ scan axis beginning at elevation angle $\Phi_1$ and ending at elevation angle $\Phi_4$, at which point a full snap-back is executed to move to the output beam 125 from the elevation angle $\Phi_4$ to the elevation angle $\Phi_1$. Then, a subsequent scan that begins at elevation angle $\Phi_1$ may be performed. In the example of FIG. 21, after the scan lines are distributed along the $\Theta_2$ scan axis beginning at elevation angle $\Phi_1$ and ending at elevation angle $\Phi_4$, a subsequent scan of frame E is performed, where the subsequent scan begins at elevation angle $\Phi_4$ and may end at the elevation angle $\Phi_1$.

In particular embodiments, the speed of a target 130 may be determined using a high-resolution scan pattern 200 with locally retraced scan lines 230. The lidar system 100 may detect pulses of light scattered from a target 130 that is moving at a relative speed with respect to the lidar system 100. The speed of the target 130 relative to the lidar system 100 may be determined based on (i) a first distance ($D_1$) from the lidar system 100 to the target 130 at a first time ($t_1$) and (ii) a second distance ($D_2$) from the lidar system 100 to the target 130 at a second time ($t_2$). For example, the speed (s) of the target 130 may be determined from the expression $s=(D_2-D_1)/(t_2-t_1)$. Alternatively, if the motion of the target 130 with respect to the lidar system 100 includes a significant amount of lateral movement, then the speed of the target 130 may be determined from the expression $s=(D_2^2+D_1^2-2D_2D_1 \cos \gamma)^{1/2}/(t_2-t_1)$, where $\gamma$ is the angle (from the perspective of the lidar system 100) between the two positions of the target at the two times $t_1$ and $t_2$. The first distance may be determined from one or more pixels 210 associated with a first portion of the scan lines that are located in the retrace region, and the second distance may be determined from one or more pixels 210 associated with a second portion of the scan lines that are located in the retrace region. In the example of FIG. 20, the first distance and time may be determined from a pixel associated with scan line 4, and the second distance and time may be determined from a pixel associated with scan line 6. In the example of FIG. 21, the first distance and time may be determined from a pixel associated with scan line 5, and the second distance and time may be determined from a pixel associated with scan line 9.

A conventional scan pattern may be used to determine the speed of a target 130. However, the two times ($t_2$ and $t_1$) at which the distances are measured may be fixed based on the frame rate of the conventional scan pattern. For example, if the frame rate of a conventional scan pattern is 10 Hz, then the speed of a target may be determined based on two pixels from two consecutive frames, in which case the time difference ($t_2-t_1$) may be approximately 100 ms. Using a high-resolution scan pattern 200 with locally retraced scan lines may allow for values of the time difference ($t_2-t_1$) that are not fixed based on the frame rate and that are less than the time to scan a frame. For example, in FIG. 21, the frame rate may be 10 Hz, and the time difference ($t_2-t_1$) between a pixel associated with scan line 5 and another pixel associated with scan line 9 may be approximately 30 ms. Using a high-resolution scan pattern 200 with locally retraced scan lines may allow for the times at which the two distance values are sampled to be optimized to particular values that are not dependent on the frame rate.

In particular embodiments, in response to determining that a distance to a target 130 exceeds a particular threshold distance, a lidar system 100 may be configured to increase a density of scan lines 230 or a density of pixels 210 in a region associated with the target 130. For example, the lidar system 100 may receive one or more scattered pulses of lights from a target 130 and may determine the distance to the target 130 (e.g., based on a round-trip time for a portion of an emitted pulse of light to travel to the target 130 and back to the lidar system 100). If the distance to the target 130 is greater than a threshold distance (e.g., 50 m, 100 m, 200 m, 250 m, or any other suitable threshold distance), then the lidar system 100 may perform one or more scans that include increased scan-line or pixel density in the region where the target 130 is located. Increasing the scan-line or pixel density in a particular region may be accomplished by one or more of: scanning using a high-resolution scan pattern 200; increasing the repetition rate of the pulses of light emitted by the light source 110; and decreasing an angular scan speed of the output beam 125 along the 01 or $\Theta_2$ scan axis. For example, the scans may include a high-resolution scan pattern 200 that includes, at least in the region where the target is located, one or more of: interlaced scan lines 230, interlaced pixels 210, and locally retraced scan lines 230. In the example of FIG. 21, the target 130 may be determined to be located in the region between elevation angles $\Phi_2$ and $\Phi_3$, and a scan pattern with locally retraced scan lines may provide increased scan-line or pixel density in that region. By increasing the density of scan lines 230 or pixels 210 in a particular region, the resolution of a point cloud may be increased so that additional information about a remote target 130 may be determined (e.g., size, shape, speed, or classification of the target 130).

Figure 22:
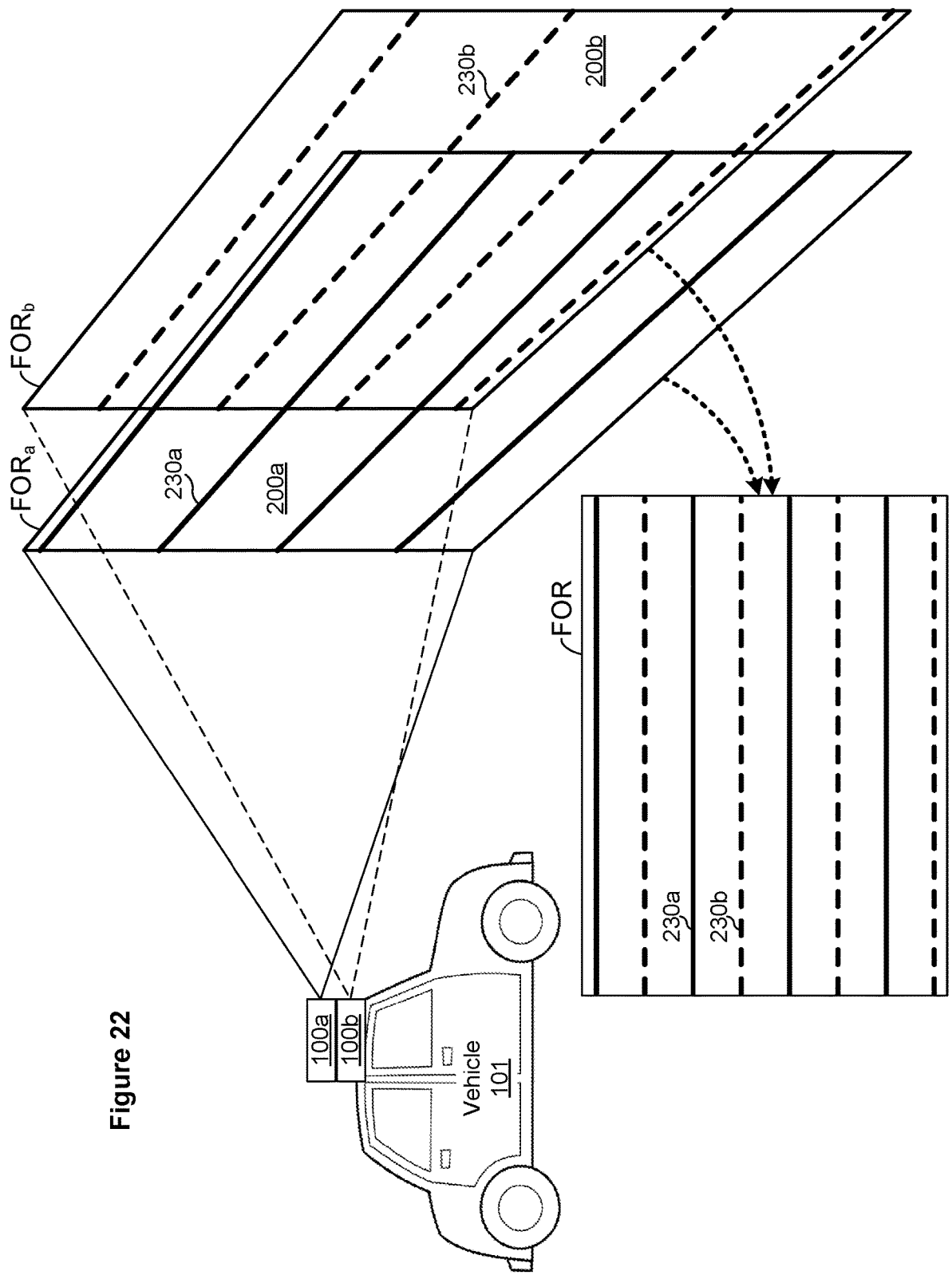
FIG. 22 illustrates an example vehicle that includes two lidar systems.

FIG. 22 illustrates an example vehicle 101 that includes two lidar systems 100*a* and 100*b*. In particular embodiments, a sensor system may include two lidar systems that are configured to scan a field of regard synchronously, where multiple scan lines 230 or pixels 210 associated with the first lidar system may be interlaced with multiple scan lines 230 or pixels 210 associated with the second lidar system. The two lidar systems may be located in close proximity to one another (e.g., stacked one on top of the other, or located side by side) so that their respective fields of regard are substantially overlapped. In FIG. 22, lidar system 100a is stacked on top of lidar system 100b, and the fields of regard $FOR_a$ and $FOR_b$ of the two lidar systems are substantially overlapped. Both lidar system 100a and lidar system 100b may be configured to produce high-resolution scan patterns 200. Additionally, the scan lines 230 or pixels 210 of their respective scan patterns may be interlaced with one another. In the example of FIG. 22, scan lines 230a produced by lidar system 100a are interlaced with scan lines 230b produced by lidar system 100b. The data from the two lidar systems may be combined to produce point clouds with higher resolution or higher frame rates than would be available with a single lidar system.

Figure 23:
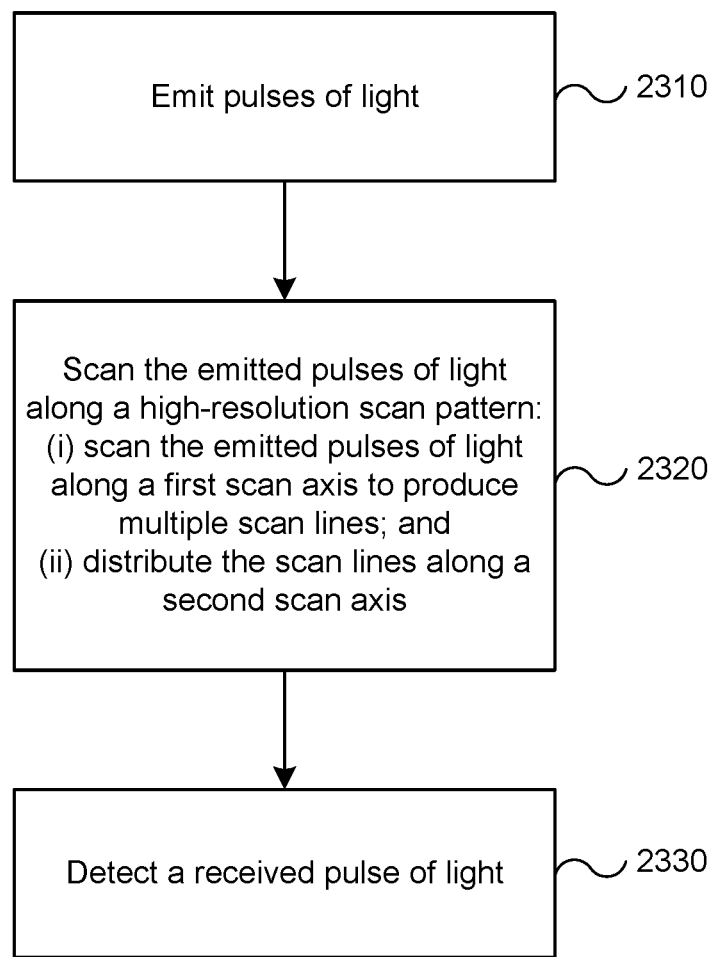
FIG. 23 illustrates an example method for scanning pulses of light along a high-resolution scan pattern.

FIG. 23 illustrates an example method 2300 for scanning pulses of light along a high-resolution scan pattern 200. The method 2300 may begin at step 2310, where pulses of light are emitted. For example, a light source 110 of a lidar system 100 may emit pulses of light that are directed to a scanner 120 of the lidar system 100. At step 2320, the emitted pulses of light may be scanned along a high-resolution scan pattern 200, including: (i) scan the emitted pulses of light along a first scan axis to produce multiple scan lines of the high-resolution scan pattern, and (ii) distribute the scan lines along a second scan axis. For example, a scanner 120 that includes one or more scan mirrors may scan the emitted pulses of light along a high-resolution scan pattern 200 located within a field of regard of the lidar system 100. The high-resolution scan pattern 200 may include one or more of: interlaced scan lines 230, interlaced pixels 210, and locally retraced scan lines 230. Each scan line 230 may be associated with multiple pixels 210, where each pixel 210 corresponds to one of the emitted pulses of light. At step 2330, a received pulse of light may be detected. For example, a receiver 140 of the lidar system 100 may detect a received pulse of light that includes a portion of one of the emitted pulses of light scattered by a target 130 located a distance from the lidar system 100.

Various example aspects described below are directed to a lidar system 100 with a scanner 120 that produces a high-resolution scan pattern 200 with interlaced scan lines 230 or interlaced pixels 210.

Aspect 1. A lidar system comprising: a light source configured to emit pulses of light; a scanner configured to scan the emitted pulses of light along a high-resolution scan pattern located within a field of regard of the lidar system, wherein the scanner comprises one or more scan mirrors configured to: scan the emitted pulses of light along a first scan axis to produce a plurality of scan lines of the high-resolution scan pattern, wherein each scan line is associated with a plurality of pixels, each pixel corresponding to one of the emitted pulses of light; and distribute the scan lines of the high-resolution scan pattern along a second scan axis, wherein the high-resolution scan pattern comprises one or more of: interlaced scan lines and interlaced pixels; and a receiver configured to detect a received pulse of light, the received pulse of light comprising a portion of one of the emitted pulses of light scattered by a target located a distance from the lidar system.

Aspect 2. The lidar system of Aspect 1, wherein the high-resolution scan pattern comprises interlaced scan lines with two-fold interlacing, wherein: the scan lines of the high-resolution scan pattern comprise a set of even scan lines and a set of odd scan lines, wherein the even scan lines are scanned after the odd scan lines are scanned; and the even and odd scan lines are interlaced, wherein: each pair of adjacent even scan lines is separated by one of the odd scan lines; and each pair of adjacent odd scan lines is separated by one of the even scan lines.

Aspect 3. The lidar system of Aspect 1, wherein the high-resolution scan pattern comprises interlaced scan lines with N-fold interlacing, wherein: the scan lines of the high-resolution scan pattern comprise N sets of scan lines, wherein N is a positive integer greater than or equal to 2; the N sets of scan lines are scanned in sequence from a first set of scan lines to a N-th set of scan lines; and each pair of adjacent scan lines from the first set of scan lines has (N−1) other scan lines located between the pair of scan lines, the (N−1) other scan lines comprising one scan line from each of the N sets of scan lines, excluding the first set of scan lines.

Aspect 4. The lidar system of Aspect 3, wherein the lidar system further comprises a processor configured to produce a partial point cloud comprising pixels associated with from 1 to (N−1) most recently scanned sets of scan lines of the N sets of scan lines.

Aspect 5. The lidar system of Aspect 3, wherein the lidar system further comprises a processor configured to produce point clouds at a frame rate of N×F/n, wherein: each point cloud comprises pixels associated with each of the N sets of scan lines; F is a full frame rate, wherein a reciprocal of the full frame rate, 1/F, corresponds to a time interval to scan the N sets of scan lines; and n is an integer from 1 to N.

Aspect 6. The lidar system of Aspect 5, wherein: the N sets of scan lines comprise (i) n sets of scan lines and (ii) (N−n) sets of scan lines; a previous point cloud comprises (i) older pixels associated with the n sets of scan lines and (ii) more recent pixels associated with the (N−n) sets of scan lines, the more recent pixels captured after the older pixels; and a subsequent point cloud produced after the previous point cloud comprises (i) newer pixels associated with the n sets of scan lines and (ii) the more recent pixels associated with the (N−n) sets of scan lines, the newer pixels captured after the more recent pixels.

Aspect 7. The lidar system of Aspect 1, wherein the high-resolution scan pattern comprises interlaced scan lines with N-fold interlacing, wherein: the scan lines of the high-resolution scan pattern comprise N sets of scan lines, wherein N is a positive integer greater than or equal to 2; the N sets of scan lines are scanned in sequence from a first set of scan lines to a N-th set of scan lines; an adjacent pair of scan lines from the first set of scan lines comprises a first scan line and a subsequent scan line separated by a scan-line separation angle $\Delta\Phi$ along the second scan axis, wherein (N−1) other scan lines are located between the first and the subsequent scan lines, the (N−1) other scan lines comprising one scan line from each of the N sets of scan lines, excluding the first set of scan lines; and a k-th scan line of the (N−1) other scan lines is offset from the first scan line along the second scan axis by an angular amount $[((k-1)\times n/N) \bmod 1]\times\Delta\Phi$, wherein k is an integer incremented from 2 to N, n is a fixed integer from 1 to (N−1), the k-th scan line is part of a k-th set of scan lines and the k-th set of scan lines is scanned after a (k−1)-th set of scan lines.

Aspect 8. The lidar system of Aspect 7, wherein: N equals 8 so that the interlaced scan lines are 8-fold interlaced; n equals 5; and the (N−1) other scan lines comprise seven scan lines, the seven scan lines comprising: a second scan line from a second set of scan lines, the second scan line scanned after the first set of scan lines and offset from the first scan line along the second scan axis by an angular amount (5/8)×ΔΦ; a third scan line from a third set of scan lines, the third scan line scanned after the second set of scan lines and offset from the first scan line along the second scan axis by an angular amount (1/4)×ΔΦ; a fourth scan line from a fourth set of scan lines, the fourth scan line scanned after the third set of scan lines and offset from the first scan line along the second scan axis by an angular amount (7/8)×ΔΦ; a fifth scan line from a fifth set of scan lines, the fifth scan line scanned after the fourth set of scan lines and offset from the first scan line along the second scan axis by an angular amount (1/2)×ΔΦ; a sixth scan line from a sixth set of scan lines, the sixth scan line scanned after the fifth set of scan lines and offset from the first scan line along the second scan axis by an angular amount (1/8)×ΔΦ; a seventh scan line from a seventh set of scan lines, the seventh scan line scanned after the sixth set of scan lines and offset from the first scan line along the second scan axis by an angular amount (3/4)×ΔΦ; and an eighth scan line from an eighth set of scan lines, the eighth scan line scanned after the seventh set of scan lines and offset from the first scan line along the second scan axis by an angular amount (3/8)×ΔΦ.

Aspect 9. The lidar system of Aspect 1, wherein the high-resolution scan pattern comprises interlaced scan lines with N-fold interlacing, wherein: the scan lines of the high-resolution scan pattern comprise N sets of scan lines, wherein N is a positive integer greater than or equal to 2; the N sets of scan lines are scanned in sequence from a first set of scan lines to a N-th set of scan lines; and distributing the scan lines along the second scan axis comprises applying one of N different temporal offsets to each set of scan lines.

Aspect 10. The lidar system of Aspect 1, wherein the high-resolution scan pattern comprises interlaced scan lines with N-fold interlacing, wherein: the scan lines of the high-resolution scan pattern comprise N sets of scan lines, wherein N is a positive integer greater than or equal to 2; the N sets of scan lines are scanned in sequence from a first set of scan lines to a N-th set of scan lines; and distributing the scan lines along the second scan axis comprises applying one of N different angular offsets along the second scan axis to each set of scan lines.

Aspect 11. The lidar system of Aspect 1, wherein the high-resolution scan pattern comprises interlaced scan lines that are interlaced using a V-scan wherein the scan lines of the high-resolution scan pattern comprise: a first set of scan lines distributed along the second scan axis in a first direction; and a second set of scan lines distributed along the second scan axis in a second direction opposite the first direction, wherein the second set of scan lines is distributed after the first set of scan lines.

Aspect 12. The lidar system of Aspect 11, wherein each of the first set of scan lines has a negative incline angle, and each of the second set of scan lines has a positive incline angle.

Aspect 13. The lidar system of Aspect 1, wherein the high-resolution scan pattern comprises interlaced pixels, wherein: adjacent pixels associated with each scan line of the plurality of scan lines are separated from one another along the first scan axis by a pixel-spacing angle $\Delta\Theta$; and pixels associated with two adjacent scan lines are offset along the first scan axis with respect to one another by a pixel-offset angle $d \times \Delta\Theta$, wherein d is a number between 0 and 1.

Aspect 14. The lidar system of Aspect 1, wherein the high-resolution scan pattern comprises interlaced pixels with two-fold interlacing, wherein: the scan lines of the high-resolution scan pattern comprise a set of even scan lines and a set of odd scan lines, wherein each pair of adjacent even scan lines is separated by one of the odd scan lines, and each pair of adjacent odd scan lines is separated by one of the even scan lines; adjacent pixels associated with each scan line of the plurality of scan lines are separated from one another along the first scan axis by a pixel-spacing angle $\Delta\Theta$; and pixels associated with the even scan lines are offset along the first scan axis with respect to pixels associated with the odd scan lines by a pixel-offset angle of $\Delta\Theta/2$.

Aspect 15. The lidar system of Aspect 1, wherein the high-resolution scan pattern comprises interlaced pixels with M-fold sequential interlacing, wherein: M is a positive integer greater than or equal to 2; adjacent pixels associated with each scan line of the plurality of scan lines are separated from one another along the first scan axis by a pixel-spacing angle $\Delta\Theta$; and pixels associated two adjacent scan lines are offset along the first scan axis with respect to one another by a pixel-offset angle $\Delta\Theta/M$.

Aspect 16. The lidar system of Aspect 1, wherein the high-resolution scan pattern comprises interlaced pixels with non-sequential interlacing, wherein: adjacent pixels associated with each scan line of the plurality of scan lines are separated from one another along the first scan axis by a pixel-spacing angle $\Delta\Theta$; the scan lines of the high-resolution scan pattern comprise a first scan line, a second scan line adjacent to the first scan line, and a third scan line adjacent to the second scan line, wherein the second scan line is located between the first and third scan lines; pixels associated with the second scan line are offset along the first scan axis with respect to pixels associated with the first scan line by a pixel-offset angle $d_1 \times \Delta\Theta$, wherein $d_1$ is a number between 0 and 1; and pixels associated with the third scan line are offset along the first scan axis with respect to the pixels associated with the first scan line by a pixel-offset angle $d_2 \times \Delta\Theta$, wherein $d_2$ is a number between 0 and $d_1$.

Aspect 17. The lidar system of Aspect 1, wherein the high-resolution scan pattern comprises interlaced pixels with M-fold interlacing, wherein: M is a positive integer greater than or equal to 2; and the light source is further configured to apply a temporal offset of M different temporal offsets to a portion of the emitted pulses of light at a beginning of each scan line.

Aspect 18. The lidar system of Aspect 1, wherein the high-resolution scan pattern comprises interlaced pixels with M-fold interlacing, wherein: M is a positive integer greater than or equal to 2; and scanning the emitted pulses of light along the first scan axis to produce the plurality of scan lines comprises applying one of M different angular offsets along the first scan axis to each scan line.

Aspect 19. The lidar system of Aspect 1, wherein the lidar system is a first lidar system that is part of a sensor system that further comprises a second lidar system, wherein the first and second lidar systems are configured to scan synchronously, wherein a plurality of the scan lines or pixels produced by the first lidar system is interlaced with a plurality of scan lines or pixels produced by the second lidar system.

Aspect 20. The lidar system of Aspect 1, wherein the lidar system further comprises a processor configured to: determine the distance from the lidar system to the target based at least in part on a round-trip time for the portion of the emitted pulse of light to travel to the target and back to the lidar system; and increase, in response to determining that the distance to the target exceeds a particular threshold distance, a density of scan lines or pixels in a region of the field of regard associated with the target.

Aspect 21. A method comprising: emitting, by a light source of a lidar system, pulses of light; scanning, by a scanner of the lidar system, the emitted pulses of light along a high-resolution scan pattern located within a field of regard of the lidar system, comprising: scanning the emitted pulses of light along a first scan axis to produce a plurality of scan lines of the high-resolution scan pattern, wherein each scan line is associated with a plurality of pixels, each pixel corresponding to one of the emitted pulses of light; and distributing the scan lines of the high-resolution scan pattern along a second scan axis, wherein the high-resolution scan pattern comprises one or more of: interlaced scan lines and interlaced pixels; and detecting, by a receiver of the lidar system, a received pulse of light, the received pulse of light comprising a portion of one of the emitted pulses of light scattered by a target located a distance from the lidar system.

Aspect 22. A lidar system comprising: a light source configured to emit optical signals; a scanner configured to scan the emitted optical signals along a high-resolution scan pattern located within a field of regard of the lidar system, wherein the scanner comprises one or more scan mirrors configured to: scan the emitted optical signals along a first scan axis to produce a plurality of scan lines of the high-resolution scan pattern, wherein each scan line is associated with a plurality of pixels, each pixel corresponding to one or more of the emitted optical signals; and distribute the scan lines of the high-resolution scan pattern along a second scan axis, wherein the high-resolution scan pattern comprises one or more of: interlaced scan lines and interlaced pixels; and a receiver configured to detect a received optical signal, the received optical signal comprising a portion of one of the emitted optical signals scattered by a target located a distance from the lidar system.

Aspect 23. The lidar system of Aspect 22, wherein the lidar system is a pulsed lidar system, and the emitted optical signals comprise pulses of light.

Aspect 24. The lidar system of Aspect 22, wherein the lidar system is a frequency-modulated continuous-wave (FMCW) lidar system, and the emitted optical signals comprise frequency-modulated optical signals.

Various example aspects described below are directed to a lidar system 100 with a scanner 120 that produces a high-resolution scan pattern 200 with locally retraced scan lines 230.

Aspect 1. A lidar system comprising: a light source configured to emit pulses of light; a scanner configured to scan the emitted pulses of light along a high-resolution scan pattern located within a field of regard of the lidar system, wherein the scanner comprises one or more scan mirrors configured to: scan the emitted pulses of light along a first scan axis to produce a plurality of scan lines of the high-resolution scan pattern, wherein each scan line is associated with a plurality of pixels, each pixel corresponding to one of the emitted pulses of light; and distribute the scan lines along a second scan axis to produce the high-resolution scan pattern, wherein the high-resolution scan pattern comprises locally retraced scan lines; and a receiver configured to detect a received pulse of light, the received pulse of light comprising a portion of one of the emitted pulses of light scattered by a target located a distance from the lidar system.

Aspect 2. The lidar system of Aspect 1, wherein distributing the scan lines along the second scan axis to produce the locally retraced scan lines comprises: distributing a first portion of the scan lines across a first region of the field of regard of the lidar system; and distributing, after the first portion of the scan lines is distributed, a second portion of the scan lines across a second region of the field of regard, wherein the first and second regions are partially overlapped in a retrace region.

Aspect 3. The lidar system of Aspect 2, wherein the scan lines from the first portion located in the retrace region are interlaced with the scan lines from the second portion located in the retrace region.

Aspect 4. The lidar system of Aspect 2, wherein pixels associated with scan lines located in the retrace region are interlaced.

Aspect 5. The lidar system of Aspect 2, wherein the lidar system further comprises a processor configured to determine a speed of the target based at least in part on (i) a first distance from the lidar system to the target at a first time and (ii) a second distance from the lidar system to the target at a second time, wherein: the first distance is determined from one or more pixels associated with the first portion of the scan lines that are located in the retrace region; and the second distance is determined from one or more pixels associated with the second portion of the scan lines that are located in the retrace region.

Aspect 6. The lidar system of Aspect 1, wherein the one or more scan mirrors comprise a scan mirror configured to distribute the scan lines along the second scan axis to produce the locally retraced scan lines, comprising: rotating in a forward-scan direction from a first angle to a second angle to distribute a first portion of the scan lines across a first region of the field of regard of the lidar system; executing a partial snap-back by rotating rapidly in a backward-scan direction opposite the forward-scan direction from the second angle to a third angle located between the first and second angles; and rotating in the forward-scan direction from the third angle to a fourth angle to distribute a second portion of the scan lines across a second region of the field of regard, wherein the second angle is located between the third and fourth angles, and the first and second regions are partially overlapped in a retrace region corresponding to a region of the field of regard between the second and third angles.

Aspect 7. The lidar system of Aspect 6, wherein the scan mirror is further configured to execute a full snap-back by rotating rapidly in the backward-scan direction from the fourth angle to the first angle.

Aspect 8. The lidar system of Aspect 6, wherein the scan mirror is further configured to perform a subsequent scan comprising rotating in the backward-scan direction to distribute additional scan lines along the second scan axis to produce another scan pattern comprising the additional scan lines.

Aspect 9. The lidar system of Aspect 1, wherein distributing the scan lines along the second scan axis to produce the locally retraced scan lines comprises: distributing a first portion of the scan lines across a first region of the field of regard of the lidar system; distributing a second portion of the scan lines across a second region of the field of regard; and distributing a third portion of the scan lines across a third region of the field of regard, wherein the first and third regions are partially overlapped in a retrace region, wherein the retrace region contains the second region.

Aspect 10. The lidar system of Aspect 1, wherein the high-resolution scan pattern comprises K-fold locally retraced scan lines, wherein K is a positive integer greater than or equal to 3, and distributing the scan lines along the second scan axis comprises: distributing a first portion of the scan lines across a first region of the field of regard of the lidar system; distributing second through (K−1)-th portions of the scan lines across a second region of the field of regard; and distributing a K-th portion of the scan lines across a third region of the field of regard, wherein the first and third regions are partially overlapped in a retrace region, wherein the retrace region contains the second region.

Aspect 11. The lidar system of Aspect 1, wherein: the scan lines are distributed along the second scan axis beginning at a first elevation angle and ending at a second elevation angle; and the one or more scan mirrors are further configured to execute, after distributing the scan lines along the second scan axis, a snap-back from the second elevation angle to the first elevation angle.

Aspect 12. The lidar system of Aspect 1, wherein: the scan lines are distributed along the second scan axis beginning at a first elevation angle and ending at a second elevation angle; and the one or more scan mirrors are further configured to perform, after distributing the scan lines along the second scan axis, a subsequent scan beginning at the second elevation angle and ending at the first elevation angle.

Aspect 13. The lidar system of Aspect 1, wherein the lidar system is a first lidar system that is part of a sensor system that further comprises a second lidar system, wherein the first and second lidar systems are configured to scan synchronously, wherein a plurality of the scan lines or pixels produced by the first lidar system is interlaced with a plurality of scan lines or pixels produced by the second lidar system.

Aspect 14. The lidar system of Aspect 1, wherein the lidar system further comprises a processor configured to: determine the distance from the lidar system to the target based at least in part on a round-trip time for the portion of the emitted pulse of light to travel to the target and back to the lidar system; and increase, in response to determining that the distance to the target exceeds a particular threshold distance, a density of scan lines or pixels in a region of the field of regard associated with the target.

Aspect 15. A method comprising: emitting, by a light source of a lidar system, pulses of light; scanning, by a scanner of the lidar system, the emitted pulses of light along a high-resolution scan pattern located within a field of regard of the lidar system, comprising: scanning the emitted pulses of light along a first scan axis to produce a plurality of scan lines of the high-resolution scan pattern, wherein each scan line is associated with a plurality of pixels, each pixel corresponding to one of the emitted pulses of light; and distributing the scan lines along a second scan axis to produce the high-resolution scan pattern, wherein the high-resolution scan pattern comprises locally retraced scan lines; and detecting, by a receiver of the lidar system, a received pulse of light, the received pulse of light comprising a portion of one of the emitted pulses of light scattered by a target located a distance from the lidar system.

Aspect 16. A lidar system comprising: a light source configured to emit optical signals; a scanner configured to scan the emitted optical signals along a high-resolution scan pattern located within a field of regard of the lidar system, wherein the scanner comprises one or more scan mirrors configured to: scan the emitted optical signals along a first scan axis to produce a plurality of scan lines of the high-resolution scan pattern, wherein each scan line is associated with a plurality of pixels, each pixel corresponding to one or more of the emitted optical signals; and distribute the scan lines along a second scan axis to produce the high-resolution scan pattern, wherein the high-resolution scan pattern comprises locally retraced scan lines; and a receiver configured to detect a received optical signal, the received optical signal comprising a portion of one of the emitted optical signals scattered by a target located a distance from the lidar system.

Aspect 17. The lidar system of Aspect 16, wherein the lidar system is a pulsed lidar system, and the emitted optical signals comprise pulses of light.

Aspect 18. The lidar system of Aspect 16, wherein the lidar system is a frequency-modulated continuous-wave (FMCW) lidar system, and the emitted optical signals comprise frequency-modulated optical signals.

Figure 24:
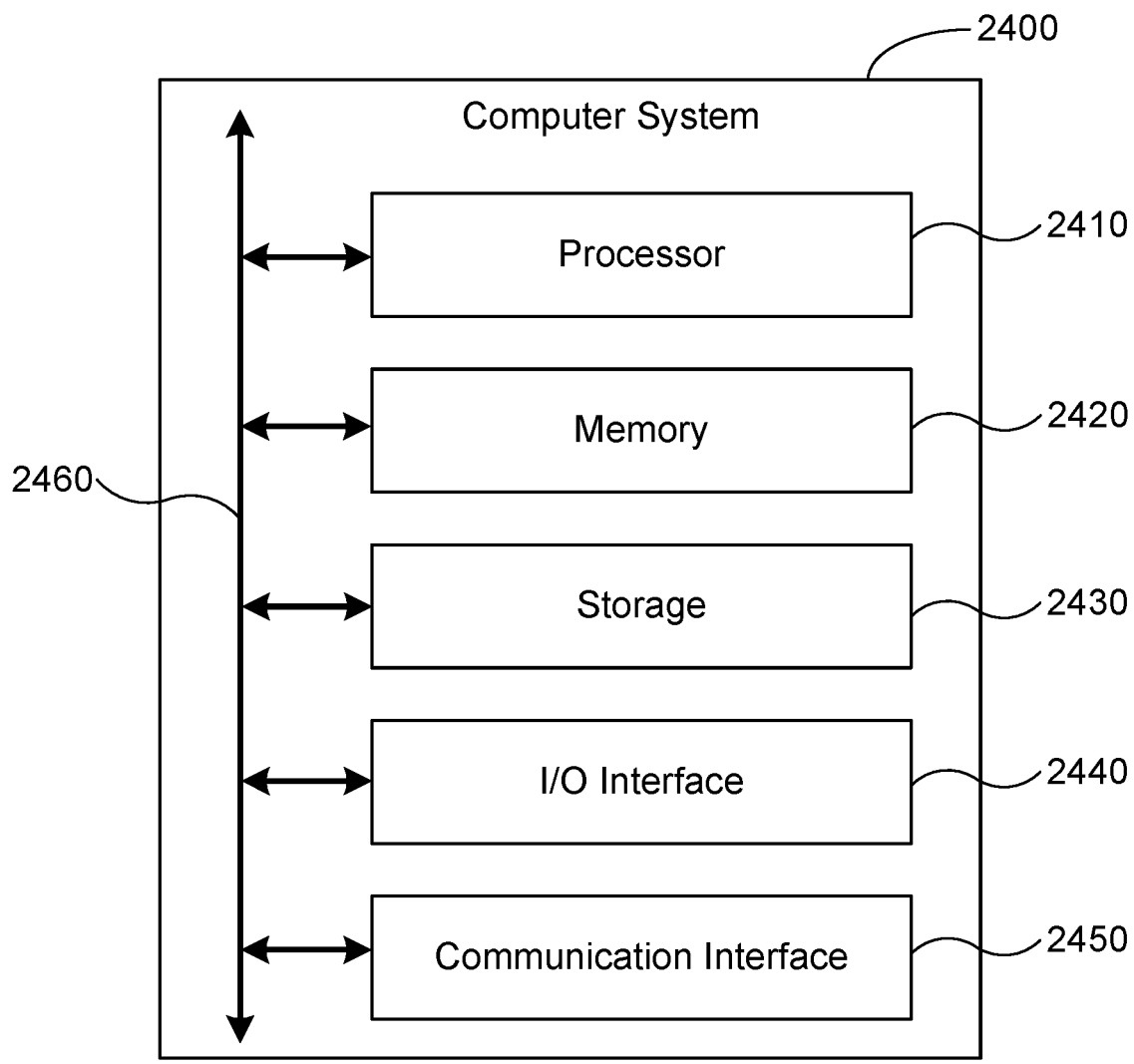
FIG. 24 illustrates an example computer system.

FIG. 24 illustrates an example computer system 2400. In particular embodiments, one or more computer systems 2400 may perform one or more steps of one or more methods described or illustrated herein. In particular embodiments, one or more computer systems 2400 may provide functionality described or illustrated herein. In particular embodiments, software running on one or more computer systems 2400 may perform one or more steps of one or more methods described or illustrated herein or may provide functionality described or illustrated herein. Particular embodiments may include one or more portions of one or more computer systems 2400. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 2400 may take any suitable physical form. As an example, computer system 2400 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 2400 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 2400 may include one or more computer systems 2400; be unitary or distributed; span multiple locations; span multiple machines; span multiple data centers; or reside in a cloud, which may include one or more cloud components in one or more networks. Where appropriate, one or more computer systems 2400 may perform without substantial spatial or temporal limitation one or more steps of one or more methods described or illustrated herein. As an example, one or more computer systems 2400 may perform in real time or in batch mode one or more steps of one or more methods described or illustrated herein. One or more computer systems 2400 may perform at different times or at different locations one or more steps of one or more methods described or illustrated herein, where appropriate.

As illustrated in the example of FIG. 24, computer system 2400 may include a processor 2410, memory 2420, storage 2430, an input/output (I/O) interface 2440, a communication interface 2450, or a bus 2460. Computer system 2400 may include any suitable number of any suitable components in any suitable arrangement.

In particular embodiments, processor 2410 may include hardware for executing instructions, such as those making up a computer program. As an example, to execute instructions, processor 2410 may retrieve (or fetch) the instructions from an internal register, an internal cache, memory 2420, or storage 2430; decode and execute them; and then write one or more results to an internal register, an internal cache, memory 2420, or storage 2430. In particular embodiments, processor 2410 may include one or more internal caches for data, instructions, or addresses. Processor 2410 may include any suitable number of any suitable internal caches, where appropriate. As an example, processor 2410 may include one or more instruction caches, one or more data caches, or one or more translation lookaside buffers (TLBs). Instructions in the instruction caches may be copies of instructions in memory 2420 or storage 2430, and the instruction caches may speed up retrieval of those instructions by processor 2410. Data in the data caches may be copies of data in memory 2420 or storage 2430 for instructions executing at processor 2410 to operate on; the results of previous instructions executed at processor 2410 for access by subsequent instructions executing at processor 2410 or for writing to memory 2420 or storage 2430; or other suitable data. The data caches may speed up read or write operations by processor 2410. The TLBs may speed up virtual-address translation for processor 2410. In particular embodiments, processor 2410 may include one or more internal registers for data, instructions, or addresses. Processor 2410 may include any suitable number of any suitable internal registers, where appropriate. Where appropriate, processor 2410 may include one or more arithmetic logic units (ALUs); may be a multi-core processor; or may include one or more processors 2410.

In particular embodiments, memory 2420 may include main memory for storing instructions for processor 2410 to execute or data for processor 2410 to operate on. As an example, computer system 2400 may load instructions from storage 2430 or another source (such as, for example, another computer system 2400) to memory 2420. Processor 2410 may then load the instructions from memory 2420 to an internal register or internal cache. To execute the instructions, processor 2410 may retrieve the instructions from the internal register or internal cache and decode them. During or after execution of the instructions, processor 2410 may write one or more results (which may be intermediate or final results) to the internal register or internal cache. Processor 2410 may then write one or more of those results to memory 2420. One or more memory buses (which may each include an address bus and a data bus) may couple processor 2410 to memory 2420. Bus 2460 may include one or more memory buses. In particular embodiments, one or more memory management units (MMUs) may reside between processor 2410 and memory 2420 and facilitate accesses to memory 2420 requested by processor 2410. In particular embodiments, memory 2420 may include random access memory (RAM). This RAM may be volatile memory, where appropriate. Where appropriate, this RAM may be dynamic RAM (DRAM) or static RAM (SRAM). Memory 2420 may include one or more memories 2420, where appropriate.

In particular embodiments, storage 2430 may include mass storage for data or instructions. As an example, storage 2430 may include a hard disk drive (HDD), a floppy disk drive, flash memory, an optical disc, a magneto-optical disc, magnetic tape, or a Universal Serial Bus (USB) drive or a combination of two or more of these. Storage 2430 may include removable or non-removable (or fixed) media, where appropriate. Storage 2430 may be internal or external to computer system 2400, where appropriate. In particular embodiments, storage 2430 may be non-volatile, solid-state memory. In particular embodiments, storage 2430 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 2430 may include one or more storage control units facilitating communication between processor 2410 and storage 2430, where appropriate. Where appropriate, storage 2430 may include one or more storages 2430.

In particular embodiments, I/O interface 2440 may include hardware, software, or both, providing one or more interfaces for communication between computer system 2400 and one or more I/O devices. Computer system 2400 may include one or more of these I/O devices, where appropriate. One or more of these I/O devices may enable communication between a person and computer system 2400. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 2440 may include one or more device or software drivers enabling processor 2410 to drive one or more of these I/O devices. I/O interface 2440 may include one or more I/O interfaces 2440, where appropriate.

In particular embodiments, communication interface 2450 may include hardware, software, or both providing one or more interfaces for communication (such as, for example, packet-based communication) between computer system 2400 and one or more other computer systems 2400 or one or more networks. As an example, communication interface 2450 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 2400 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 2400 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 2400 may communicate using fiber-optic communication based on 100 Gigabit Ethernet (100 GbE), 10 Gigabit Ethernet (10 GbE), or Synchronous Optical Networking (SONET). Computer system 2400 may include any suitable communication interface 2450 for any of these networks, where appropriate. Communication interface 2450 may include one or more communication interfaces 2450, where appropriate.

In particular embodiments, bus 2460 may include hardware, software, or both coupling components of computer system 2400 to each other. As an example, bus 2460 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 2460 may include one or more buses 2460, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 2400. As an example, computer software may include instructions configured to be executed by processor 2410. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A high-resolution lidar system configured to scan pulses of light along a high-resolution scan pattern with N-fold interlaced scan lines, the lidar system comprising:
   a light source configured to emit pulses of light;
   a scanner configured to scan the emitted pulses of light along a high-resolution scan pattern located within a field of regard of the lidar system, wherein the scanner comprises one or more scan mirrors configured to:
      scan the emitted pulses of light along a first scan axis to produce a plurality of scan lines of the high-resolution scan pattern, wherein each scan line is associated with a plurality of pixels, each pixel corresponding to one of the emitted pulses of light; and
      distribute the scan lines of the high-resolution scan pattern along a second scan axis,
   wherein the high-resolution scan pattern comprises interlaced scan with N-fold interlacing, wherein:
      the scan lines of the high-resolution scan pattern comprise N sets of scan lines, wherein N is a positive integer greater than or equal to 2;
      the N sets of scan lines are scanned in sequence from a first set of scan lines to a N-th set of scan lines;
      an adjacent pair of scan lines from the first set of scan lines comprises a first scan line and a subsequent scan line separated by a scan-line separation angle $\Delta\Phi$ along the second scan axis, wherein (N−1) other scan lines are located between the first and the subsequent scan lines, the (N−1) other scan lines comprising one scan line from each of the N sets of scan lines, excluding the first set of scan lines; and
      a k-th scan line of the (N−1) other scan lines is offset from the first scan line along the second scan axis by an angular amount $[((k-1)\times n/N) \bmod 1]\times\Delta\Phi$, wherein k is an integer incremented from 2 to N, n is a fixed integer from 1 to (N−1), the k-th scan line is part of a k-th set of scan lines, and the k-th set of scan lines is scanned after a (k−1)-th set of scan lines; and
   a receiver configured to detect a received pulse of light, the received pulse of light comprising a portion of one of the emitted pulses of light scattered by a target located a distance from the lidar system.

2. The lidar system of claim 1, wherein the lidar system further comprises a processor configured to produce a partial point cloud comprising pixels associated with from 1 to (N−1) most recently scanned sets of scan lines of the N sets of scan lines.

3. The lidar system of claim 1, wherein the lidar system further comprises a processor configured to produce point clouds at a frame rate of N×F/r, wherein:
   each point cloud comprises pixels associated with each of the N sets of scan lines;
   F is a full frame rate, wherein a reciprocal of the full frame rate, 1/F, corresponds to a time interval to scan the N sets of scan lines; and
   r is an integer from 1 to N.

4. The lidar system of claim 3, wherein:
   the N sets of scan lines comprise (i) r sets of scan lines and (ii) (N−r) sets of scan lines;
   a previous point cloud comprises (i) older pixels associated with the r sets of scan lines and (ii) more recent pixels associated with the (N−r) sets of scan lines, the more recent pixels captured after the older pixels; and
   a subsequent point cloud produced after the previous point cloud comprises (i) newer pixels associated with the r sets of scan lines and (ii) the more recent pixels associated with the (N−r) sets of scan lines, the newer pixels captured after the more recent pixels.

5. The lidar system of claim 1, wherein:
   N equals 8 so that the interlaced scan lines are 8-fold interlaced;
   n equals 5; and
   the (N−1) other scan lines comprise seven scan lines, the seven scan lines comprising:
      a second scan line from a second set of scan lines, the second scan line scanned after the first set of scan lines and offset from the first scan line along the second scan axis by an angular amount $(5/8)\times\Delta\Phi$;
      a third scan line from a third set of scan lines, the third scan line scanned after the second set of scan lines and offset from the first scan line along the second scan axis by an angular amount $(1/4) \times \Delta\Phi$;

a fourth scan line from a fourth set of scan lines, the fourth scan line scanned after the third set of scan lines and offset from the first scan line along the second scan axis by an angular amount $(7/8) \times \Delta\Phi$;

a fifth scan line from a fifth set of scan lines, the fifth scan line scanned after the fourth set of scan lines and offset from the first scan line along the second scan axis by an angular amount $(1/2) \times \Delta\Phi$;

a sixth scan line from a sixth set of scan lines, the sixth scan line scanned after the fifth set of scan lines and offset from the first scan line along the second scan axis by an angular amount $(1/8) \times \Delta\Phi$;

a seventh scan line from a seventh set of scan lines, the seventh scan line scanned after the sixth set of scan lines and offset from the first scan line along the second scan axis by an angular amount $(3/4) \times \Delta\Phi$; and an eighth scan line from an eighth set of scan lines, the eighth scan line scanned after the seventh set of scan lines and offset from the first scan line along the second scan axis by an angular amount $(3/8) \times \Delta\Phi$.

6. The lidar system of claim 1, wherein distributing the scan lines along the second scan axis comprises applying one of N different temporal offsets to each set of scan lines.

7. The lidar system of claim 1, wherein distributing the scan lines along the second scan axis comprises applying one of N different angular offsets along the second scan axis to each set of scan lines.

8. The lidar system of claim 1, wherein the high-resolution scan pattern comprises interlaced scan lines that are interlaced using a V-scan wherein:

the first set of scan lines is distributed along the second scan axis in a first direction; and a second set of scan lines of the N sets of scan lines is distributed along the second scan axis in a second direction opposite the first direction, wherein the second set of scan lines is distributed after the first set of scan lines.

9. The lidar system of claim 8, wherein each of the first set of scan lines has a negative incline angle, and each of the second set of scan lines has a positive incline angle.

10. The lidar system of claim 1, wherein the high-resolution scan pattern further comprises interlaced pixels, wherein:

adjacent pixels associated with each scan line of the plurality of scan lines are separated from one another along the first scan axis by a pixel-spacing angle $\Delta\Theta$; and pixels associated with two adjacent scan lines are offset along the first scan axis with respect to one another by a pixel-offset angle $d \times \Delta\Theta$, wherein d is a number between 0 and 1.

11. The lidar system of claim 1, wherein the high-resolution scan pattern further comprises interlaced pixels with M-fold sequential interlacing, wherein:

M is a positive integer greater than or equal to 2;

adjacent pixels associated with each scan line of the plurality of scan lines are separated from one another along the first scan axis by a pixel-spacing angle $\Delta\Theta$; and pixels associated with two adjacent scan lines are offset along the first scan axis with respect to one another by a pixel-offset angle $\Delta\Theta/M$.

12. The lidar system of claim 1, wherein the high-resolution scan pattern further comprises interlaced pixels with non-sequential interlacing, wherein:

adjacent pixels associated with each scan line of the plurality of scan lines are separated from one another along the first scan axis by a pixel-spacing angle $\Delta\Theta$;

the scan lines of the high-resolution scan pattern comprise a m-th scan line, a (m+1)-th scan line adjacent to the m-th scan line, and a (m+2)-th scan line adjacent to the (m+1)-th scan line, wherein the (m+1)-th scan line is located between the m-th and (m+2)-th scan lines, wherein m is a positive integer;

pixels associated with the second (m+1)-th scan line are offset along the first scan axis with respect to pixels associated with the m-th scan line by a pixel-offset angle $d_1 \times \Delta\Phi$, wherein $d_1$ is a number between 0 and 1; and pixels associated with the (m+2)-th scan line are offset along the first scan axis with respect to the pixels associated with the m-th scan line by a pixel-offset angle $d_2 \times \Delta\Phi$, wherein $d_2$ is a number between 0 and $d_1$.

13. The lidar system of claim 1, wherein the high-resolution scan pattern further comprises interlaced pixels with M-fold interlacing, wherein:

M is a positive integer greater than or equal to 2; and the light source is further configured to apply a temporal offset of M different temporal offsets to a portion of the emitted pulses of light at a beginning of each scan line.

14. The lidar system of claim 1, wherein the high-resolution scan pattern further comprises interlaced pixels with M-fold interlacing, wherein:

M is a positive integer greater than or equal to 2; and scanning the emitted pulses of light along the first scan axis to produce the plurality of scan lines comprises applying one of M different angular offsets along the first scan axis to each scan line.

15. The lidar system of claim 1, wherein the lidar system is a first lidar system that is part of a sensor system that further comprises a second lidar system, wherein the first and second lidar systems are configured to scan synchronously, wherein a plurality of the scan lines or pixels produced by the first lidar system is interlaced with a plurality of scan lines or pixels produced by the second lidar system.

16. The lidar system of claim 1, wherein the lidar system further comprises a processor configured to:

determine the distance from the lidar system to the target based at least in part on a round-trip time for the portion of the emitted pulse of light to travel to the target and back to the lidar system; and increase, in response to determining that the distance to the target exceeds a particular threshold distance, a density of scan lines or pixels in a region of the field of regard associated with the target.

17. The lidar system of claim 1, wherein:

each scan line is oriented substantially parallel to the first scan axis; and the second scan axis is substantially orthogonal to the first scan axis.

18. The lidar system of claim 1, wherein the scanner comprises:

a first scan mirror comprising a polygon mirror, the polygon mirror configured to scan the emitted pulses of light along the first scan axis to produce the plurality of scan lines; and a second scan mirror configured to distribute the scan lines along the second scan axis.

19. The lidar system of claim 1, wherein each of the one or more scan mirrors is mechanically driven by a galvanometer scanner, a synchronous electric motor, a microelectromechanical systems (MEMS) device, a resonant scanner, or a voice coil motor.

20. The lidar system of claim 1, further comprising a processor configured to determine the distance from the lidar system to the target based at least in part on a round-trip time for the portion of the emitted pulse of light to travel to the target and back to the lidar system.

21. The lidar system of claim 1, wherein the emitted pulses of light have optical characteristics comprising:
   a wavelength between 900 nanometers and 1700 nanometers;
   a pulse energy between 0.1 µJ and 100 µJ;
   a pulse repetition frequency between 80 kHz and 10 MHz; and
   a pulse duration between 1 ns and 100 ns.

22. The lidar system of claim 1, wherein the light source comprises a direct-emitter laser diode configured to produce the emitted pulses of light.

23. The lidar system of claim 1, wherein the light source comprises:
   a seed laser diode configured to produce seed light; and
   a semiconductor optical amplifier (SOA) configured to amplify the seed light to produce the emitted pulses of light.

24. The lidar system of claim 1, wherein the lidar system is part of a vehicle comprising an advanced driver assistance system (ADAS) configured to assist a driver of the vehicle in operating the vehicle, wherein the lidar system is configured to provide information about a surrounding environment of the vehicle to the ADAS.

25. The lidar system of claim 1, wherein the lidar system is part of an autonomous vehicle comprising an autonomous-vehicle driving system configured to guide the autonomous vehicle through a surrounding environment toward a destination, wherein the lidar system is configured to provide information about the surrounding environment to the autonomous-vehicle driving system.

26. A method for scanning pulses of light along a high-resolution scan pattern with N-fold interlaced scan lines, the method comprising:
   emitting, by a light source of a lidar system, pulses of light;
   scanning, by a scanner of the lidar system, the emitted pulses of light along a high-resolution scan pattern located within a field of regard of the lidar system, comprising:
      scanning the emitted pulses of light along a first scan axis to produce a plurality of scan lines of the high-resolution scan pattern, wherein each scan line is associated with a plurality of pixels, each pixel corresponding to one of the emitted pulses of light; and
      distributing the scan lines of the high-resolution scan pattern along a second scan axis,
      wherein the high-resolution scan pattern comprises interlaced scan lines and with N-fold interlacing, wherein:
         the scan lines of the high-resolution scan pattern comprise N sets of scan lines, wherein N is a positive integer greater than or equal to 2;
         the N sets of scan lines are scanned in sequence from a first set of scan lines to a N-th set of scan lines;
         an adjacent pair of scan lines from the first set of scan lines comprises a first scan line and a subsequent scan line separated by a scan-line separation angle $\Delta\Phi$ along the second scan axis, wherein (N−1) other scan lines are located between the first and the subsequent scan lines, the (N−1) other scan lines comprising one scan line from each of the N sets of scan lines, excluding the first set of scan lines; and
         a k-th scan line of the (N−1) other scan lines is offset from the first scan line along the second scan axis by an angular amount $[((k-1) \times n/N) \bmod 1] \times \Delta\Phi$, wherein k is an integer incremented from 2 to N, n is a fixed integer from 1 to (N−1), the k-th scan line is part of a k-th set of scan lines, and the k-th set of scan lines is scanned after a (k−1)-th set of scan lines; and
   detecting, by a receiver of the lidar system, a received pulse of light, the received pulse of light comprising a portion of one of the emitted pulses of light scattered by a target located a distance from the lidar system.

* * * * *

UNITED STATES PATENT AND TRADEMARK OFFICE
CERTIFICATE OF CORRECTION

| | | |
|---|---|---|
| PATENT NO. | : 11,194,048 B1 | Page 1 of 1 |
| APPLICATION NO. | : 17/318506 | |
| DATED | : December 7, 2021 | |
| INVENTOR(S) | : Istvan Peter Burbank et al. | |

It is certified that error appears in the above-identified patent and that said Letters Patent is hereby corrected as shown below:

In the Claims

At Column 62, Lines 1 and 2 should read:
- wherein the high-resolution scan pattern comprises interlaced scan lines with N-fold interlacing, wherein: -

At Column 64, Lines 10-12 should read:
- pixels associated with the (m+1)-th scan line are offset along the first scan axis with respect to pixels associated with the m-th scan line by a pixel-offset -

At Column 66, Lines 13-15 should read:
- wherein the high-resolution scan pattern comprises interlaced scan lines with N-fold interlacing, wherein: -

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*